United States Patent
Ko et al.

(10) Patent No.: US 12,101,814 B2
(45) Date of Patent: Sep. 24, 2024

(54) WIRELESS COMMUNICATION METHOD USING SHARED TXOP, AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Geonjung Ko, Gyeonggi-do (KR);
Juhyung Son, Gyeonggi-do (KR);
Sanghyun Kim, Gyeonggi-do (KR);
Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 18/544,403

(22) Filed: Dec. 18, 2023

(65) Prior Publication Data
US 2024/0129953 A1    Apr. 18, 2024

Related U.S. Application Data

(63) Continuation of application No. PCT/KR2022/008860, filed on Jun. 22, 2022.

(30) Foreign Application Priority Data

Jun. 22, 2021  (KR) .......................... 10-2021-0081205
Aug. 27, 2021  (KR) .......................... 10-2021-0114240
(Continued)

(51) Int. Cl.
*H04W 4/00*       (2018.01)
*H04W 24/10*     (2009.01)
(Continued)

(52) U.S. Cl.
CPC ....... *H04W 74/0816* (2013.01); *H04W 24/10* (2013.01); *H04W 74/0866* (2013.01)

(58) Field of Classification Search
CPC ............. H04W 74/0816; H04W 24/10; H04W 74/0866
(Continued)

(56) References Cited

U.S. PATENT DOCUMENTS 10,708,958 B2 *   7/2020  Ryu ..................... H04W 74/085
10,904,121 B2 *   1/2021  Yu ......................... H04L 1/0061
(Continued)

FOREIGN PATENT DOCUMENTS

KR     10-2019-0073455        6/2019
KR        10-2054189         12/2019
(Continued)

OTHER PUBLICATIONS

International Search Report for PCT/KR2022/008860 mailed on Oct. 4, 2022 and its English translation from WIPO (now published as WO2022/270896).
(Continued)

*Primary Examiner* — Marceau Milord
(74) *Attorney, Agent, or Firm* — Womble Bond Dickinson (US) LLP

(57) ABSTRACT

A station in a wireless communication system is disclosed. The station includes: a transceiver; and a processor for controlling the transceiver. The processor receives a trigger frame for triggering uplink transmission from an access point (AP), and the trigger frame allocates, to the station, a part of a transmission opportunity (TXOP) acquired by the AP, as a shared TXOP, transmits a CTS frame as a response to the trigger frame, and switches a first enhanced distributed channel access (EDCA) parameter set used for channel
(Continued)

access to a second EDCA parameter set based on transmission for the AP within the shared TXOP.

18 Claims, 36 Drawing Sheets

(30) Foreign Application Priority Data

Oct. 29, 2021 (KR) .................. 10-2021-0147400
Dec. 7, 2021 (KR) .................. 10-2021-0174275

(51) Int. Cl.
*H04W 74/08* (2009.01)
*H04W 74/0816* (2024.01)

(58) Field of Classification Search
USPC ........................................... 370/329
See application file for complete search history.

(56) References Cited

U.S. PATENT DOCUMENTS

| | | | | |
|---|---|---|---|---|
| 10,952,216 | B2* | 3/2021 | Chu | H04W 8/24 |
| 11,095,416 | B2* | 8/2021 | Ahn | H04W 28/065 |
| 11,606,232 | B2* | 3/2023 | Adachi | H04L 5/0007 |
| 11,683,774 | B2* | 6/2023 | Oteri | H04W 60/04 |
| | | | | 370/329 |
| 11,696,344 | B2* | 7/2023 | Chu | H04W 72/0446 |
| | | | | 370/329 |
| 11,825,460 | B2* | 11/2023 | Seok | H04W 74/0808 |
| 11,832,313 | B2* | 11/2023 | Lanante | H04W 72/21 |
| 11,923,926 | B2* | 3/2024 | Adachi | H04W 84/12 |
| 2011/0188424 | A1* | 8/2011 | Ramamurthy | H04W 28/065 |
| | | | | 370/311 |
| 2018/0206143 | A1* | 7/2018 | Patil | H04L 45/245 |
| 2018/0338325 | A1* | 11/2018 | Ryu | H04W 72/23 |
| 2019/0132107 | A1* | 5/2019 | Ahn | H04W 74/006 |
| 2019/0274171 | A1* | 9/2019 | Viger | H04W 28/0268 |
| 2020/0037325 | A1* | 1/2020 | Chu | H04W 24/02 |
| 2020/0196350 | A1* | 6/2020 | Adachi | H04L 12/189 |
| 2021/0204315 | A1* | 7/2021 | Chu | H04W 72/0453 |
| 2021/0377928 | A1* | 12/2021 | Seok | H04L 69/14 |
| 2022/0263550 | A1* | 8/2022 | Adachi | H04W 72/04 |
| 2022/0353910 | A1 | 11/2022 | Lu et al. | |
| 2022/0407622 | A1* | 12/2022 | Kim | H04L 1/1896 |
| 2023/0135332 | A1* | 12/2022 | Kim | H04W 74/0816 |
| | | | | 370/329 |
| 2023/0164857 | A1* | 5/2023 | Hwang | H04W 74/0866 |
| | | | | 370/329 |
| 2023/0180047 | A1 | 6/2023 | Ajami et al. | |

FOREIGN PATENT DOCUMENTS

| | | |
|---|---|---|
| KR | 10-2021-0007881 | 1/2021 |
| WO | 2021/010663 | 1/2021 |
| WO | 2021/091199 | 5/2021 |
| WO | 2022/270896 | 12/2022 |

OTHER PUBLICATIONS

Written Opinion of the International Searching Authority for PCT/KR2022/008860 mailed on Oct. 4, 2022 and its English translation by Google Translate (now published as WO2022/270896).
LAN/MAN Standards Committee of the IEEE Computer Society.: "IEEE P802.11be™M/D1.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)", doc.: IEEE P802.11be™M/D1.0, May 2021, pp. 1-635.
Huang, Po-Kai: "11be D2.0 CR for 4.3 and 4.5 Part I", IEEE P802.11 Wireless LANs, Aug. 1, 2022, pp. 1-34.
Das, Dibakar: "CR for remaining CIDs on Triggered TXOP Sharing Procedure—part 1", doc.: IEEE 802.11-21/1731r4, Oct. 25, 2021, pp. 1-15.
Au, Edward et al.: "IEEE 802.11be CC36 comments", doc.: IEEE 802.11-21/1018r0, Jun. 28, 2021, pp. 1-1498.

* cited by examiner

(a) Trigger frame format

| Frame Control | Duration | RA | TA | Common Info | User Info List | Padding | FCS |
|---|---|---|---|---|---|---|---|
| 2 | 2 | 6 | 6 | 8 or more | variable | variable | 4 |

Octets:

(b) Common Info field

| Trigger Type | UL Length | More TF | CS Required | UL BW | GI And HE-LTF Type | MU-MIMO HE-LTF Mode | Number Of HE-LTF Symbols And Midamble Periodicity |
|---|---|---|---|---|---|---|---|
| 4 | 12 | 1 | 1 | 2 | 2 | 1 | 3 |

Bits: B0 B3 / B4 B15 / B16 / B17 / B18 B19 / B20 B21 / B22 / B23 B25

| UL STBC | LDPC Extra Symbol Segment | AP Tx Power | Pre-FEC Padding Factor | PE Disambiguity | UL Spatial Reuse | Doppler | UL HE-SIG-A2 Reserved |
|---|---|---|---|---|---|---|---|
| 1 | 1 | 6 | 2 | 1 | 16 | 1 | 9 |

Bits: B26 / B27 / B28 B33 / B34 B35 / B36 / B37 B52 / B53 / B54 B62

| Reserved | Trigger Dependent Common Info |
|---|---|
| 1 | variable |

Bits: B63

(c) User Info field

| AID12 | RU Allocation | UL FEC Coding Type | UL HE-MCS | UL DCM | SS Allocation / RA-RU Information | UL Target RSSI | Reserved | Trigger Dependent User Info |
|---|---|---|---|---|---|---|---|---|
| 12 | 8 | 1 | 4 | 1 | 6 | 7 | 1 | variable |

Bits: B0 B11 / B12 B19 / B20 / B21 B24 / B25 / B26 B31 / B32 B38 / B39

FIG. 16

| AID12 subfield | Description |
| --- | --- |
| 0 | User Info field allocates one or more contiguous RA-RUs for associated STAs |
| 1-2007 | User Info field is addressed to an associated STA whose AID is equal to the value in the AID12 subfield |
| 2008-2044 | Reserved |
| 2045 | User Info field allocates one or more contiguous RA-RUs for unassociated STAs |
| 2046 | Unallocated RU |
| 2047 | Response to the Trigger frame is transmitted in EHT TB PPDU |
| 2048 | Response to the Trigger frame is transmitted in NEXT TB PPDU |
| 2049-4094 | Reserved |
| 4095 | Start of Padding field |

*FIG. 17*

| Frame Control | Duration | RA | TA | Common Info (Type: MU-RTS) | User Info (AID12: 2007) | Padding | FCS |
|---|---|---|---|---|---|---|---|
| Octets: 2 | 2 | 6 | 6 | 8 or more | | variable | 4 |

FIG. 22

(a) MAC frame format

| Frame Control | Duration /ID | Address 1 | Address 2 | Address 3 | Sequence Control | Address 4 | QoS Control | HT Control | Frame Body | FCS |
|---|---|---|---|---|---|---|---|---|---|---|
| 2 | 2 | 6 | 0 or 6 | 0 or 6 | 0 or 2 | 0 or 6 | 0 or 2 | 0 or 4 | variable | 4 |

Octets:

← MAC header →

(b) HT Control field format

| Variant | B0 | B1 | B2-B29 | B30 | B31 |
|---|---|---|---|---|---|
| HT | 0 | HT Control Middle | | AC Constraint | RDG/More PPDU |
| VHT | 1 | 0 | VHT Control Middle | AC Constraint | RDG/More PPDU |
| HE | 1 | 1 | A-Control | | |

(c) A-Control subfield format

| Control List | Padding |
|---|---|
| variable | 0 or more |

Bits:

(d) Control subfield format

| Control ID | Control Information |
|---|---|
| 4 | variable |

Bits:

(e) Control Information subfield format in an OM Control subfield

| B0 | B2 | B3 | B4 | B5 | B6 | B8 | B9 | B10 | B11 |
|---|---|---|---|---|---|---|---|---|---|
| Rx NSS | | Channel Width | UL MU Disable | Tx NSTS | | ER SU Disable | DL MU-MIMO Resound Recommendation | UL MU Data Disable |
| 3 | | 2 | 1 | 3 | | 1 | 1 | 1 |

Bits:

FIG. 37

| UL MU Disable subfield | UL MU Data Disable subfield | Description |
|---|---|---|
| 0 | 0 | All trigger based UL MU transmissions are enabled. |
| 0 | 1 | Trigger based UL MU Data frame transmissions in response to a Basic Trigger frame are suspended. Other trigger based UL MU transmissions remain enabled. |
| 1 | 0 | All trigger based UL MU transmissions are suspended. |
| 1 | 1 | Reserved |
*FIG. 38*
(a)
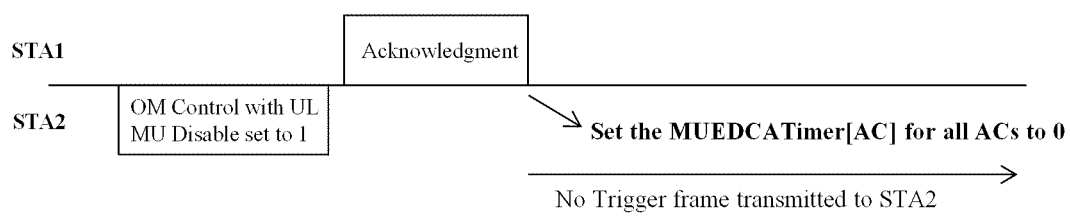
(b)
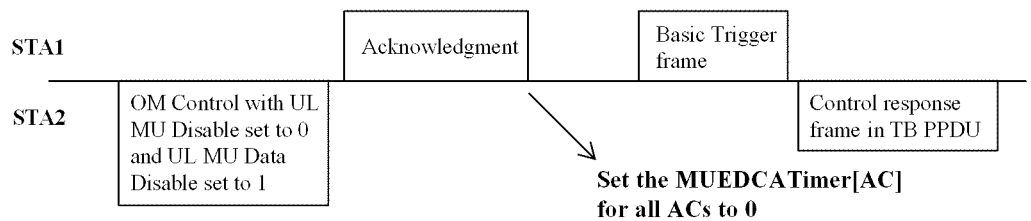
*FIG. 39*

(a)

| UL MU Disable subfield | UL MU Data Disable subfield | Description |
|---|---|---|
| 0 | 0 | All trigger based UL MU transmissions are enabled. |
| 0 | 1 | Trigger based UL MU Data frame transmissions in response to a Basic Trigger frame are suspended.<br>Other trigger based UL MU transmissions including transmission based on TXOP sharing remain enabled. |
| 1 | 0 | All trigger based UL MU transmissions including transmission based on TXOP sharing are suspended. |
| 1 | 1 | Reserved |

(b)

| UL MU Disable subfield | UL MU Data Disable subfield | Description |
|---|---|---|
| 0 | 0 | All trigger based UL MU transmissions are enabled. |
| 0 | 1 | Trigger based UL MU Data frame transmissions in response to a Basic Trigger frame or transmission based on TXOP sharing are suspended.<br>Other trigger based UL MU transmissions remain enabled. |
| 1 | 0 | All trigger based UL MU transmissions including transmission based on TXOP sharing are suspended. |
| 1 | 1 | Reserved |

(c)

| UL MU Disable subfield | UL MU Data Disable subfield | Description |
|---|---|---|
| 0 | 0 | All trigger based UL MU transmissions are enabled. |
| 0 | 1 | Trigger based UL MU Data frame transmissions in response to a Basic Trigger frame are suspended.<br>Other trigger based UL MU transmissions remain enabled. |
| 1 | 0 | All trigger based UL MU transmissions are suspended. |
| 1 | 1 | All trigger based UL MU transmissions and transmission based on TXOP sharing are suspended. |

*FIG. 40*

WIRELESS COMMUNICATION METHOD USING SHARED TXOP, AND WIRELESS COMMUNICATION TERMINAL USING SAME

CROSS-REFERENCE TO RELATED APPLICATIONS

This application is a continuation of International Patent Application No. PCT/KR2022/008860 filed on Jun. 22, 2022, which claims the priority to Korean Patent Application No. 10-2021-0081205 filed in the Korean Intellectual Property Office on Jun. 22, 2021, Korean Patent Application No. 10-2021-0114240 filed in the Korean Intellectual Property Office on Aug. 27, 2021, Korean Patent Application No. 10-2021-0147400 filed in the Korean Intellectual Property Office on Oct. 29, 2021, and Korean Patent Application No. 10-2021-0174275 filed in the Korean Intellectual Property Office on Dec. 7, 2021, the entire contents of which are incorporated herein by reference.

TECHNICAL FIELD

The present invention relates to a wireless communication method using a shared TXOP and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11 In has been provided. The IEEE 802.11 In aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11 In has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DETAILED DESCRIPTION OF THE INVENTION

Technical Problem

An embodiment of the present invention is for providing a wireless communication method using a shared TXOP and a wireless communication terminal using the same.

Technical Solution

A station in a wireless communication system includes: a transceiver; and a processor configured to control the transceiver. The processor is configured to: receive a trigger frame for triggering uplink transmission from an access point (AP), and the trigger frame allocates, to the station, a part of a transmission opportunity (TXOP) acquired by the AP, as a shared TXOP, transmit a CTS frame as a response to the trigger frame, and switch a first enhanced distributed channel access (EDCA) parameter set used for channel access to a second EDCA parameter set based on transmission for the AP within the shared TXOP.

The processor may be configured to switch the first EDCA parameter set to the second EDCA parameter set when a quality of service (QoS) data frame has been successfully transmitted to the AP within the shared TXOP.

The processor may be configured to switch the first EDCA parameter set to the second EDCA parameter set when the station has transmitted a QoS data frame requiring an immediate response to the AP and received a response to the QoS data frame requiring the immediate response within the shared TXOP.

The processor may be configured to switch the first EDCA parameter set to the second EDCA parameter set when the station has transmitted a QoS data frame requiring no immediate response to the AP within the shared TXOP.

The second EDCA parameter set may be used instead of the first EDCA parameter set based on whether UL multiuser (MU) transmission has been successfully performed.

A timer value for remaining duration to which the second EDCA parameter set is applied is configured as a value greater than 0 when the QoS data frame has been successfully transmitted to the AP within the shared TXOP.

Even though the station has successfully transmitted signaling of disabling a UL MU transmission operation to the AP within the shared TXOP, the processor may be configured not to set the timer value as 0.

When the station has successfully transmitted signaling for disabling an operation of the shared TXOP to the AP, the processor may be configured to set the timer value as 0.

A method for operating a station in a wireless communication system according to an embodiment of the present invention may include: receiving a trigger frame for triggering uplink transmission from an access point (AP), wherein the trigger frame allocates, to the station, a part of a transmission opportunity (TXOP) acquired by the AP, as a shared TXOP; transmitting a CTS frame as a response to the trigger frame; and switching a first enhanced distributed channel access (EDCA) parameter set used for channel access to a second EDCA parameter set based on transmission for the AP within the shared TXOP The switching the first EDCA parameter set used for channel access to the second EDCA parameter set may include switching the first EDCA parameter set to the second EDCA parameter set when the station has successfully transmitted a quality of service (QoS) data frame to the AP within the shared TXOP.

The switching the first EDCA parameter set to the second EDCA parameter set when the station has successfully transmitted the QoS data frame to the AP within the shared TXOP may include switching the first EDCA parameter set to the second EDCA parameter set when the station has transmitted a QoS data frame requiring an immediate response to the AP and received a response to the QoS data frame requiring the immediate response within the shared TXOP.

The switching the first EDCA parameter set to the second EDCA parameter set when the station has successfully transmitted the QoS data frame to the AP within the shared TXOP may include switching the first EDCA parameter set to the second EDCA parameter set when the station has transmitted a QoS data frame requiring no immediate response to the AP within the shared TXOP.

The second EDCA parameter set may be used instead of the first EDCA parameter set based on whether UL multiuser (MU) transmission has been successfully performed.

The switching the first EDCA parameter set to the second EDCA parameter set may include setting a timer value for remaining duration to which the second EDCA parameter set is applied as a value greater than 0 when the QoS data frame has been successfully transmitted to the AP within the shared TXOP.

The setting the timer value for remaining duration to which the second EDCA parameter set is applied as a value greater than 0 may include not setting the timer value as 0 even though the station has successfully transmitted signaling of disabling a UL MU transmission operation to the AP within the shared TXOP.

The setting the timer value for remaining duration to which the second EDCA parameter set as a value greater than 0 may include setting the timer value as 0 when the station has successfully transmitted signaling for disabling an operation of the shared TXOP to the AP.

Advantageous Effects

An embodiment of the present invention provides a wireless communication method efficiently using a shared TXOP and a wireless communication terminal using the same.

BRIEF DESCRIPTION OF THE DRAWINGS

FIG. 16 illustrates a trigger frame format according to an embodiment of the present invention.

FIG. 17 illustrates a method for indicating a trigger-based PPDU format according to an embodiment of the present invention.

FIG. 22 illustrates an example of a trigger frame for TXOP sharing according to an embodiment of the present invention.

FIG. 37 illustrates a format of a frame according to an embodiment of the present invention.

FIG. 38 illustrates a method for decoding a UL MU disable subfield and a UL MU data disable subfield of an OM control field by an AP according to an embodiment of the present invention.

FIG. 39 illustrates a method for configuring an MU EDCA parameter set by a station based on a UL MU disable subfield and a UL MU data subfield according to an embodiment of the present invention.

FIG. 40 illustrates a method for decoding a UL MU disable subfield and a UL MU data disable subfield of an OM control field by an AP according to another embodiment of the present invention.

MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
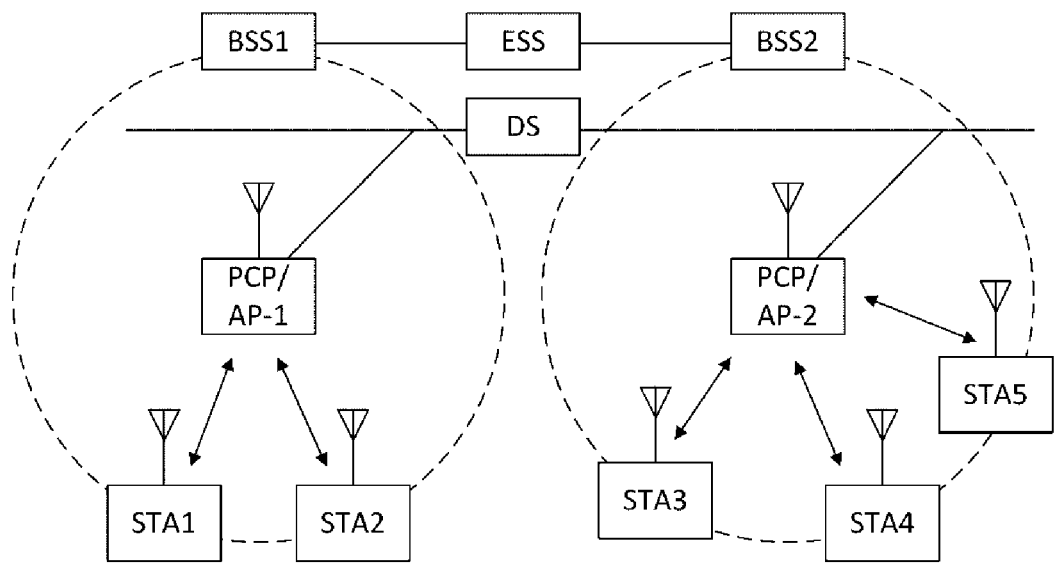
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
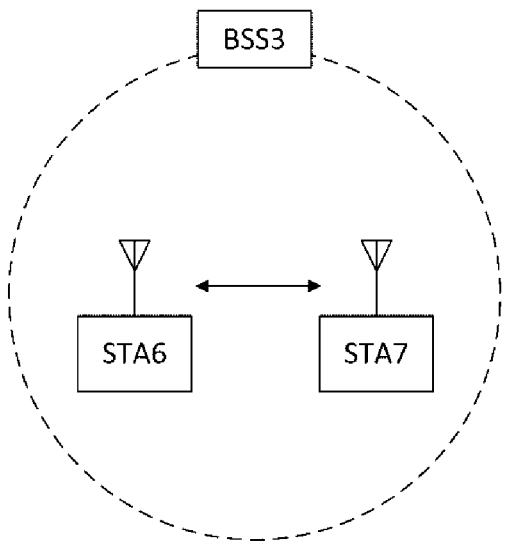
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
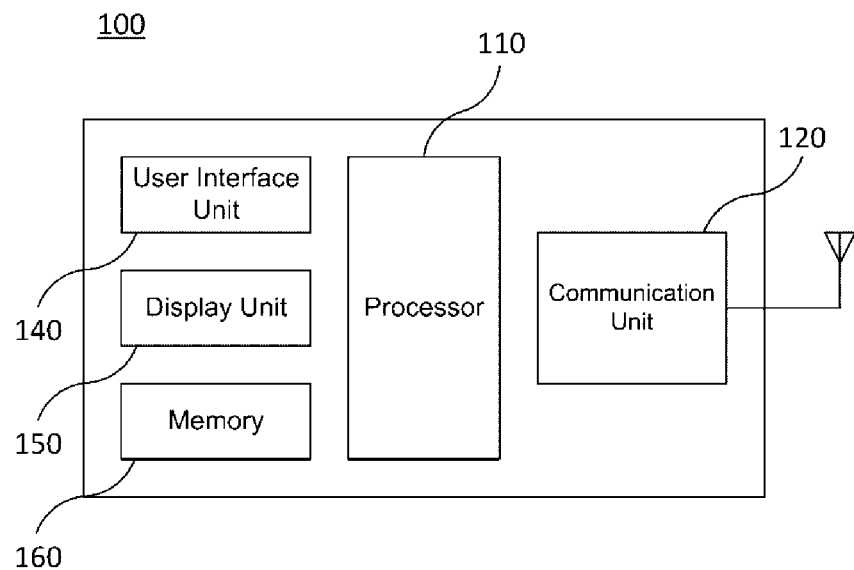
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
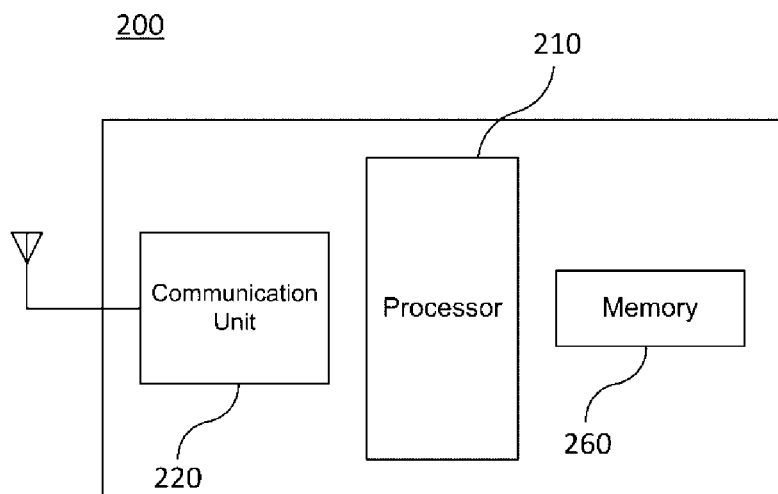
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
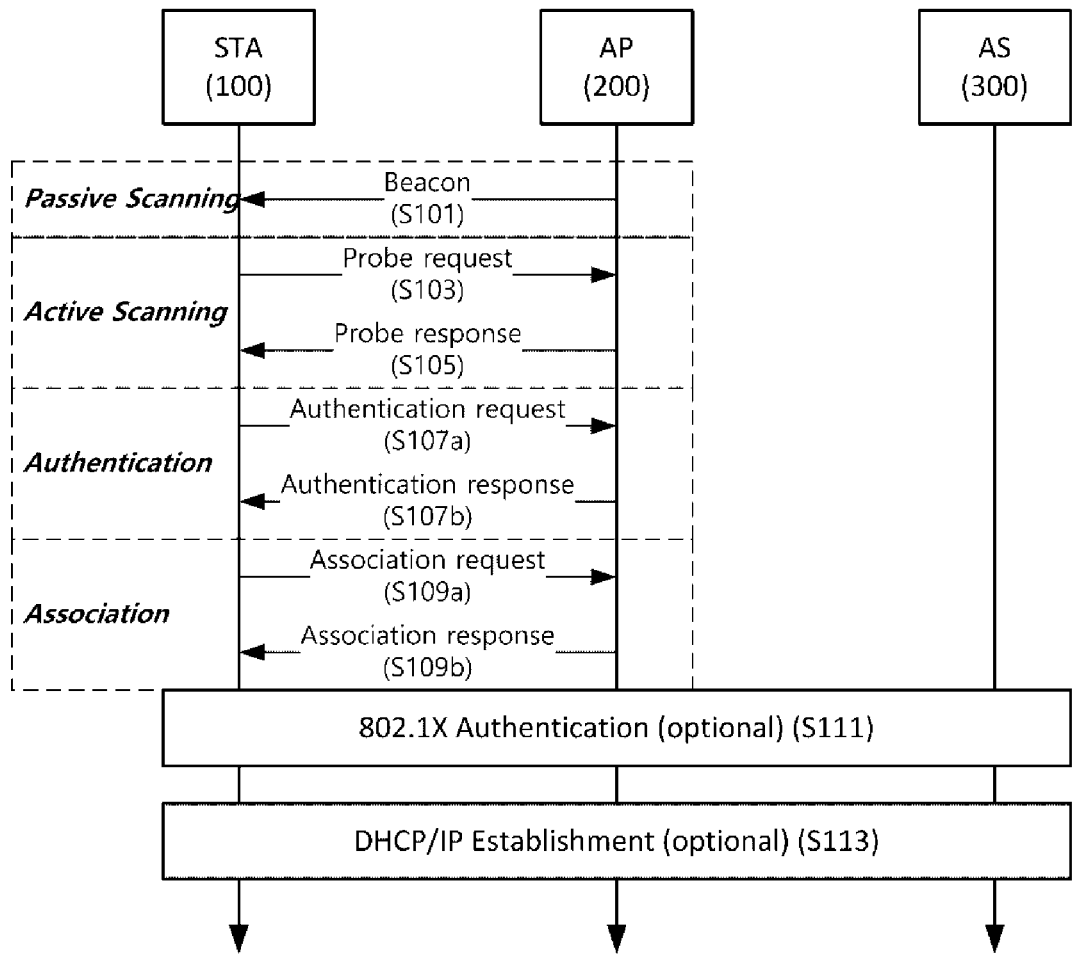
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
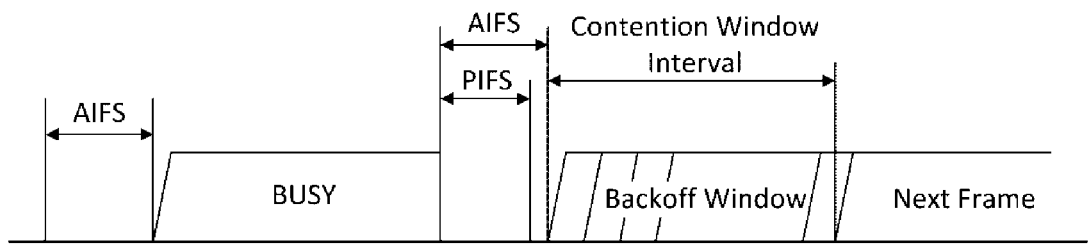
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

<Examples of Various PPDU Formats>

Figure 7:
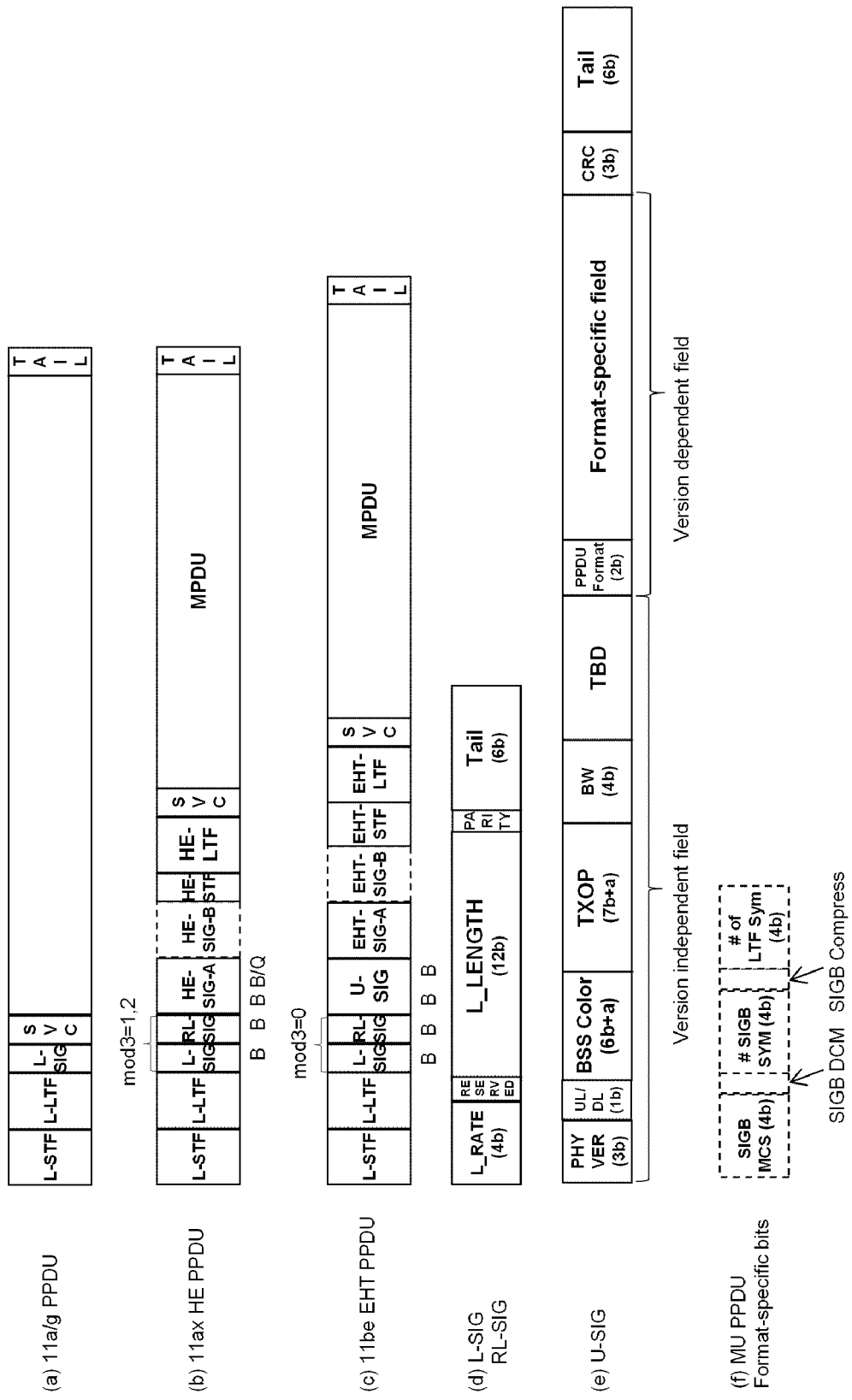
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11 be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of 1/2, 2/3, 3/4, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

First, a method of interpreting the length of a PPDU using a L_LENGTH field by a legacy terminal or a non-legacy terminal is as follows. When the L_RATE field is set to 6 Mbps, 3 bytes (i.e., 24 bits) can be transmitted for 4 us, which is one symbol duration of 64 FFT. Therefore, by adding 3 bytes corresponding to the SVC field and the Tail field to the value of the L_LENGTH field and dividing it by 3 bytes, which is the transmission amount of one symbol, the number of symbols after the L-SIG is obtained on the 64FFT basis. The length of the corresponding PPDU, that is, the reception time (i.e., RXTIME) is obtained by multiplying the obtained number of symbols by 4 us, which is one symbol duration, and then adding a 20 us which is for transmitting L-STF, L-LTF and L-SIG. This can be expressed by the following Equation 1.

$$RXTIME(us) = \left(\left\lceil \frac{L\_LENGTH + 3}{3} \right\rceil\right) \times 4 + 20 \qquad \text{[Equation 1]}$$

In this case, denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left(\left\lceil \frac{TXTIME - 20}{4} \right\rceil\right) \times 3 - 3 \qquad \text{[Equation 2]}$$

Herein, TXTIME is the total transmission time constituting the corresponding PPDU, and is expressed by Equation 3 below. In this case, TX represents the transmission time of X.

$$TXTIME(us) = T_{L-STF} + T_{L-LTF} + T_{L-SIG} + T_{RL-SIG} + T_{U-SIG} + (T_{EHT-SIG-A}) + (T_{EHT-SIG-B}) + T_{EHT-STF} + N_{EHT-LTF} \cdot T_{EHT-LTF} + T_{DATA} \qquad \text{[Equation 3]}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHz in a 320 MHz BW configuration of an SU PPDU.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
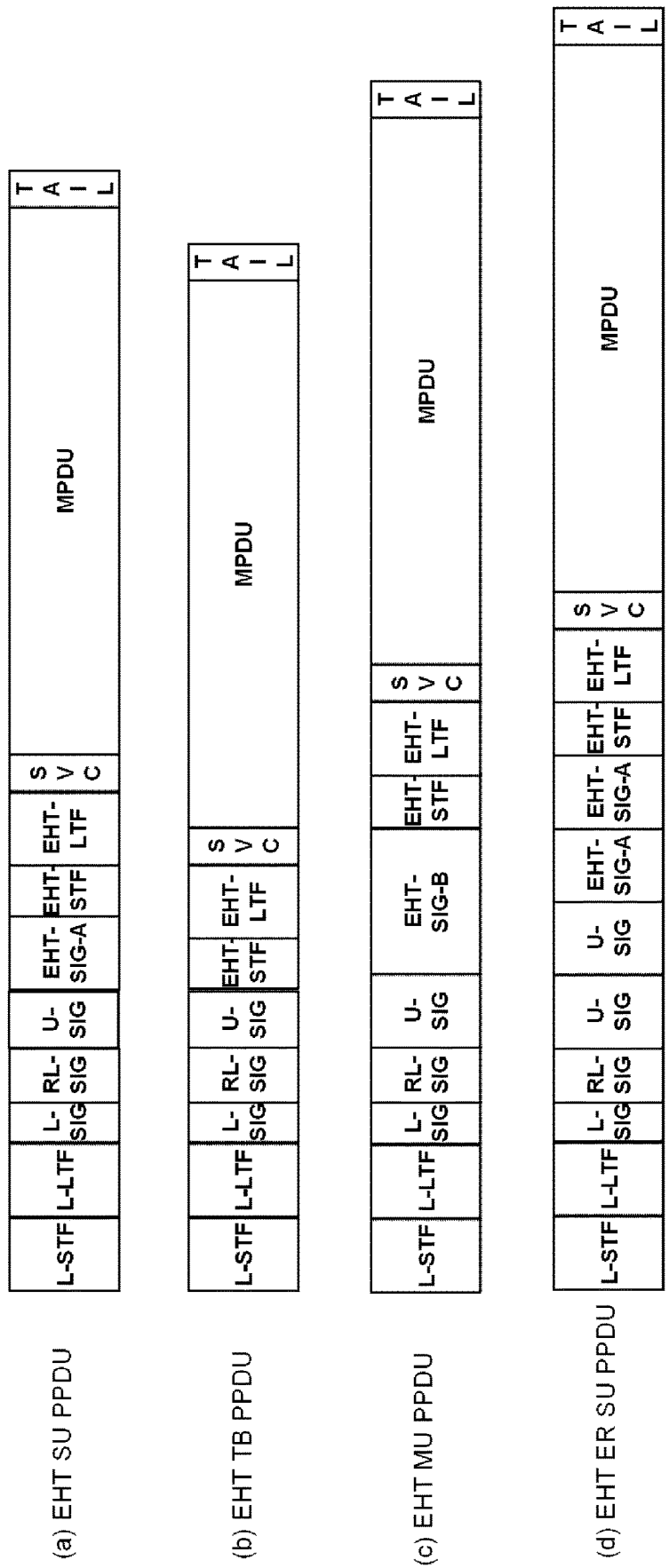
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

For convenience of description, a frame or a MAC frame may be interchangeably used with an MPDU in the present specification.

When a wireless communication device performs communication using multiple links, communication efficiency of the wireless communication device can be increased. In this case, the link may be configured as a wireless medium which can be used in delivering a MAC service data unit (MSDU), as a physical path. For example, when a frequency band of one link is busy by another wireless communication device, the wireless communication device may continuously perform communication through another link. Accordingly, the wireless communication device may use multiple channels in a useful manner. In addition, when the wireless communication device performs communication simultaneously using multiple links, the entire throughput can be increased. However, in the conventional wireless LAN, it is specified as a prerequisite that a wireless communication device uses one link. Accordingly, a wireless LAN operation method for using multiple links is required. FIGS. 9 to 26 illustrate a wireless communication method of a wireless communication device using multiple links. First, a detailed form of a wireless communication device using multiple links is described through FIG. 9.

Figure 9:
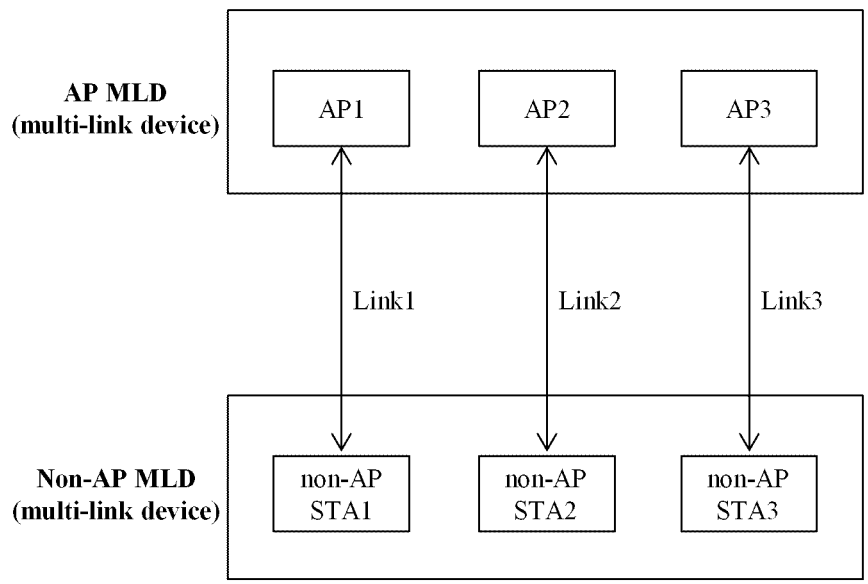
FIG. 9 illustrates a multi-link device according to an embodiment of the present invention.

FIG. 9 illustrates a multi-link device according to an embodiment of the present invention.

For the above-described wireless communication method using multiple links, a multi-link device (MLD) may be defined. A multi-link device may indicate a device having one or more affiliated stations. According to a detailed embodiment, a multi-link device may indicate a device having two or more affiliated stations. In addition, the multi-link device may exchange multi-link elements. A multi-link element includes information on one or more station or one or more links. The multi-link element may include a multi-link setup element to be described below. In this case, the multi-link device may be a logical entity. Specifically, the multi-link device may have multiple affiliated stations. The multi-link device may be referred to as a multi-link logical entity (MLLE) or a multi-link entity (MLE). The multi-link device may have one medium access control (MAC) service access point (SAP) including logical link control (LLC). In addition, the MLD may have one MAC data service The multiple stations included in the multi-link device may operate in multiple links. In addition, the multiple stations included in the multi-link device may operate in multiple channels. Specifically, the multiple stations included in the multi-link device may operate in different multiple links or different multiple channels. For example, the multiple stations included in the multi-link device may operate in different multiple channels of 2.4 GHz, 5 GHz, and 6 Hz.

The operation of the multi-link device may be referred to as a multi-link operation, an MLD operation, or a multi-band operation. In addition, when a station affiliated with the multi-link device is an AP, the multi-link device may be referred to as an AP MLD. In addition, when a station affiliated with the multi-link device is a non-AP station, the multi-link device may be referred to as a non-AP MLD.

FIG. 9 illustrates an operation in which a non-AP MLD and an AP-MLD communication with each other. Specifically, each of the non-AP MLD and the AP MLD performs communication by using three links. The AP MLD includes a first AP (AP1), a second AP (AP2), and a third AP (AP3). The non-AP MLD includes a first non-AP STA (non-AP STA1), a second non-AP STA (non-AP STA2), and a third non-AP STA (non-AP STA3). The first AP (AP1) and the first non-AP STA (non-AP STA1) communicate with each other through a first link (Link1). In addition, the second AP (AP2) and the second non-AP STA (non-AP STA2) communicate with each other through a second link (Link2). In addition, the third AP (AP3) and the third non-AP STA (non-AP STA3) communicate with each other through a third link (Link3).

The multi-link operation may include a multi-link setup operation. The multi-link setup corresponds to an association operation of a single-link operation described above, and may be performed first for frame exchange in the multi-link. The multi-link device may acquire information required for the multi-link setup from a multi-link setup element. Specifically, the multi-link setup element may include capability information related to the multi-link. In this case, the capability information may include information indicating whether one of multiple devices included in the multi-link device may perform transmission while simultaneously another device may perform reception. In addition, the capability information may include information relating to a link which can be used by each station included the MLD. In addition, the capability information may include information relating to a channel which can be used by each station included in the MLD.

The multi-link setup may be configured through a negotiation between peer stations. Specifically, the multi-link setup may be performed through communication between stations without communication with the AP. In addition, the multi-link setup may be configured through one link. For example, even when the first link to third link are configured through the multi-link, the multi-link setup may be performed through the first link.

In addition, mapping between a traffic identifier (TID) and a link may be configured. Specifically, a frame corresponding to the TID having a specific value can be exchanged through a predesignated link only. Directional-based mapping between the TID and the link may be configured. For example, when multiple links are configured between a first multi-link device and a second multi-link device, the first multi-link device may be configured to transmit a first TID frame through a first link among the multiple links, and the second multi-link device may be configured to transmit a second TID frame through the first link. In addition, there may be a default setup in the mapping between the TID and the link. Specifically, when there is no additional setup in the multi-link setup, the multi-link device may exchange a frame corresponding to a TID in each link according to the default setup. In this case, the default setup corresponds to exchanging all TIDs in one link.

A detailed description of the TID is made below. A TID is an ID for classifying traffic and data to support quality of service (QOS). In addition, the TID may be used or allocated in a higher layer than a MAC layer. In addition, the TID may indicate a traffic category (TC) and a traffic stream (TS). In addition, the TID may be distinguished by 16 different values. For example, the TID may be designated to have a value of one of 0 to 15. The TID value to be used may be designated differently according to an access policy and a channel access or medium access method. For example, when an enhanced distributed channel access (EDCA) or a hybrid coordination function contention-based channel access (HCAF) is used, the TID value may be allocated from 0 to 7. When the EDCA is used, the TID may indicate a user priority (UP). In this case, the UP may be designated according to the TC or the TS. The UP may be allocated in a higher layer than the MAC layer. In addition, when an HCF controlled channel access (HCCA) or an SPCA is used, the TID value may be allocated from 8 to 15. When the HCCA or the SPCA is used, the TID may indicate a TSID. In addition, when a HEMM or a SEMM is used, the TID value may be allocated to 8 to 15. When the HEMM or the SEMM is used, the TID may indicate a TSID.

The UP and the AC may be mapped to each other. The AC may be a label for providing the QoS in the EDCA. The AC may be a label for indicating an EDCA parameter set. An EDCA parameter or an EDCA parameter set may be a parameter used in EDCA channel contention. A QoS station may secure the QoS by using the AC. In addition, the AC may include AC_BK, AC_BE, AC_VI, and AC_VO. AC_BK, AC_BE, AC_VI, and AC_VO indicate a background, a best effort, a video, and a voice, respectively. In addition, AC_BK, AC_BE, AC_VI, and AC_VO may be classified into sub ACs. For example, AC_VI may be divided into AC_VI primary and AC_VI alternate. In addition, AC_VO may be divided into AC_VO primary and AC_VO alternate. In addition, the UP or the TID may be mapped to the AC. For example, 1, 2, 0, 3, 4, 5, 6, and 7 of the UP or the TID may be mapped to AC_BK, AC_BK, AC_BE, AC_BE, AC_VI, AC_VI, AC_VO, and AC_VO, respectively. In addition, 1, 2, 0, 3, 4, 5, 6, and 7 of the UP or the TID may be mapped to AC_BK, AC_BK, AC_BE, AC_BE, AC_VI alternate, AC_VI primary, AC_VO primary, and AC_VO alternate, respectively. In addition, 1, 2, 0, 3, 4, 5, 6, and 7 of the UP or the TID may have higher priorities in order. That is, 1 may have a lower priority, and 7 may have a higher priority. Accordingly, the priorities of AC_BK, AC_BE, AC_VI, and AC_VO may increase in order. In addition, AC_BK, AC_BE, AC_VI, and AC_VO may correspond to AC index (ACI) 0, 1, 2, and 3, respectively. According to such TID characteristics, the mapping between the TID and the link may indicate mapping between the AC and the link. In addition, the mapping between the link and the AC may indicate mapping between the TID and the link.

As described above, a TID may be mapped to each of the multiple links. The mapping corresponds to designation of a link through which traffic corresponding to a specific TID or AC can be exchanged. In addition, the TID or the AC which can be transmitted for each transmission direction may be designated in the link. As described above, there may be a default setup in the mapping between the TID and the link. Specifically, when there is no additional setup in the multi-link setup, the multi-link device may exchange a frame corresponding to a TID in each link according to the default setup. At least one link may be always mapped to either the TID or the AC at any time point. A management frame and a control frame may be transmitted in all links.

When the link is mapped to the TID or the AC, only a data frame corresponding to the TID or the AC mapped to the corresponding link may be transmitted in the corresponding link. Accordingly, when the link is mapped to the TID or the AC, a frame not corresponding to the TID or the AC mapped to the corresponding link cannot be transmitted in the corresponding link. When the link is mapped to the TID or the AC, an ACK may be transmitted based on the link to which the TID or the AC is mapped. For example, a block ACK agreement may be determined based on the mapping between the TID and the link. In another detailed embodiment, the mapping between the TID and the link may be determined based on the block ACK agreement. Specifically, the block ACK agreement may be configured for the TID mapped to a specific link.

Through the above-described mapping between the TID and the link, the QoS may be secured. Specifically, a relatively smaller number of stations may operate or a link having a good channel state may be mapped to the AC or the TID having a high priority. In addition, through the above-described mapping between the TID and the link, a station may maintain a power saving state for a longer time.

Figure 10:
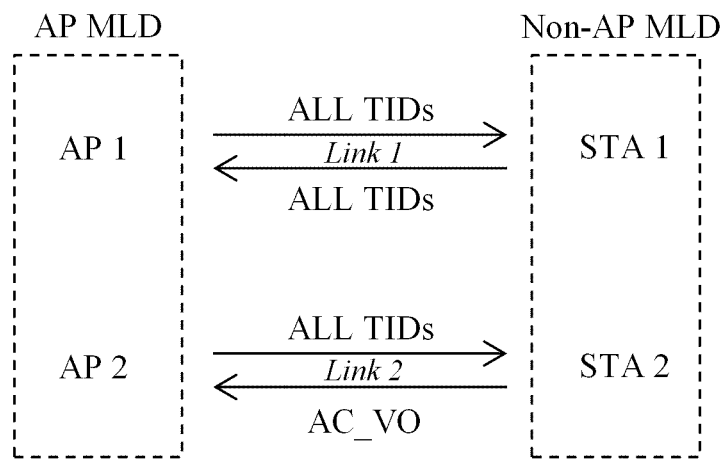
FIG. 10 illustrates multiple links mapped according to a TID-to-link mapping method according to an embodiment of the present invention.

FIG. 10 illustrates multiple links mapped according to a TID-to-link mapping method according to an embodiment of the present invention.

Referring to FIG. 10, as described in FIG. 9, there may be a mapping relationship between the TID and the link. In addition, the mapping relationship between the TID and the link in the present invent may be called TID-to-link mapping, TID to link mapping, TID mapping, link mapping, etc. The TID may be a traffic identifier. In addition, the TID may be an identifier (ID) for classifying traffic, data, or the like, to support quality of service (QoS).

In addition, the TID may be an ID which is used or allocated in a higher layer than the MAC layer. The TID may indicate traffic categories (TCs) and traffic streams (TSs). In addition, the TID may be classified into 16 segments. For example, the TID may be designated as one of 0 to 15. In addition, the TID value to be used may be designated differently according to an access policy and a channel access or medium access method. For example, when an enhanced distributed channel access (EDCA) or a hybrid coordination function contention-based channel access (HCAF) is used, an available TID value may be 0 to 7. In addition, when the EDCA is used, the TID value may indicate a user priority (UP), and the UP may relate to the TC or the TS. In addition, the UP may be a value allocated to a higher layer than the MAC layer. In addition, when an HCF controlled channel access (HCCA) or an SPCA is used, an available TID value may be 8 to 15. In addition, when the HCCA or the SPCA is used, the TID may indicate a TSID. In addition, a HEMM or a SEMM is used, an available TID value may be 8 to 15. In addition, when the HEMM or the SEMM is used, the TID may indicate a TSID.

In addition, there may be a mapping relationship between the UP and an access category (AC). The AC may be a label for providing the QoS in the EDCA or a label indicating an EDCA parameter set. An EDCA parameter or an EDCA parameter set may be used for channel connection. The AC may be used by a QoS STA.

A value of the AC may be configured by one of AC_BK, AC_BE, AC_VI, and AC_VO. AC_BK, AC_BE, AC_VI, AC_VO may indicate a background, a best effort, a video, and a voice, respectively. In addition, AC_BK, AC_BE, AC_VI, and AC_VO may be subdivided. For example, AC_VI may be divided into AC_VI primary and AC_VI alternate. In addition, AC_VO may be divided into AC_VO primary and AC_VO alternate. In addition, the UP value or the TID value may be mapped to the AC value. For example, 1, 2, 0, 3, 4, 5, 6, and 7 of UP values or TID values may be mapped to AC_BK, AC_BK, AC_BE, AC_BE, AC_VI, AC_VI, AC_VO, and AC_VO, respectively. In addition, 1, 2, 0, 3, 4, 5, 6, and 7 of UP values or TID values may be mapped to AC_BK, AC_BK, AC_BE, AC_BE, AC_VI alternate, AC_VI primary, AC_VO primary, and AC_VO alternate, respectively. In addition, 1, 2, 0, 3, 4, 5, 6, and 7 of the UP values or the TID values may have higher priorities in order. That is, 1 may have a lower priority, and 7 may have a higher priority. Accordingly, the priorities of AC_BK, AC_BE, AC_VI, and AC_VO may increase in order. In addition, AC_BK, AC_BE, AC_VI, and AC_VO may correspond to AC index (ACI) 0, 1, 2, and 3, respectively.

Accordingly, there may be a relationship between the TID and the AC. Accordingly, the TID-to-link mapping in the present invention may be a mapping relationship between the AC and the link. In addition, in the present invention, mapping of the TID may correspond to mapping of the AC, and vice versa.

According to an embodiment, there may be a TID mapped to each link of multiple links. For example, there may be mapping relating to a link among multiple links, in which a specific TID or a specific AC is allowed to be transmitted or received. In addition, such mapping may be separately defined for each direction of a link. In addition, as described above, there may be a default setup in the mapping between the TID and the link. For example, the mapping between the TID and the link may be, in general, mapping of all TIDs to a link. In addition, according to an embodiment, a TID or an AC may be mapped to at least one link at a specific time point. In addition, a management frame or a control frame may be transmitted in all links.

In the present invention, a data frame corresponding to a TID or an AC mapped to a direction of a link may be transmitted. In addition, a data frame corresponding to a TID or an AC not mapped to a direction of a link may not be transmitted.

According to an embodiment, the TID-to-link mapping may be also applied to an acknowledgement. For example, a block ack agreement may be based on the TID-to-link mapping. Alternatively, the TID-to-link mapping may be based on the block ack agreement. For example, there may be a block ack agreement for a TID-to-link mapped TID.

A QoS service may be provided through the TID-to-link mapping. For example, by mapping an AC or a TID having a higher priority to a link in a good channel state or having a smaller number of STAs, data of the corresponding AC or TID may be promptly transmitted. Alternatively, the TID-to-link mapping may be performed so that an STA of a specific link can save power (enter a doze state).

Referring to FIG. 10, there may be an AP MLD including AP 1 and AP 2. In addition, there may be a non-AP MLD including STA 1 and STA 2. In addition, multiple links, Link 1 and Link 2, may be in present in the AP MLD. AP 1 and STA 1 may be associated through Link 1, and AP 2 and STA 2 may be associated through Link 2.

Accordingly, Link 1 may include a link for transmission from AP 1 to STA 1 and/or a link for transmission from STA 1 to AP 1, and Link 2 may include a link for transmission from AP 2 to STA 2 and/or a link for transmission from STA 2 to AP 2. In this case, each link may be mapped to a TID and/or an AC.

For example, all TIDs and all ACs may be mapped to a link for transmission from AP 1 to STA 1 in Link 1, and a link for transmission from STA 1 to AP 1 in Link 1. In addition, only a TID corresponding to AC_VO or AC_VO may be mapped to a link for transmission from STA 2 to AP 2 in Link 2. In addition, only data of the mapped TID and/or AC may be transmitted through the corresponding link. In addition, data of a TID or AC not mapped to a link cannot be transmitted through the corresponding link.

Figure 11:
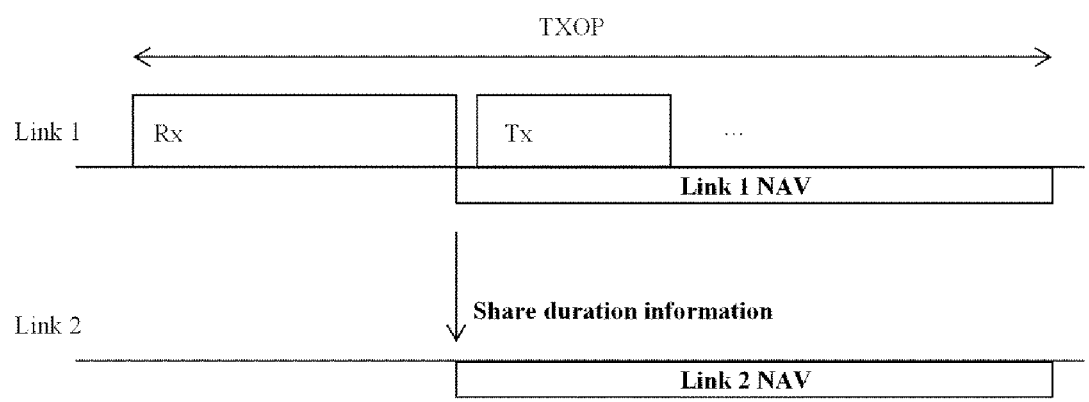
FIG. 11 illustrates an example of a multi-link NAV setup operation according to an embodiment of the present invention.

FIG. 11 illustrates an example of a multi-link NAV setup operation according to an embodiment of the present invention.

An operation in which an MLD performs simultaneous transmission and reception (STR) may be limited, and this may be associated with a frequency interval between multiple links for a multi-link operation.

Accordingly, according to an embodiment of the present invention, when an interval between links is m MHz, simultaneous transmission or reception may be limited, and with respect to n greater than m, when an interval between links is n MHZ, simultaneous transmission or reception may be not limited. This embodiment may be for solving a problem of limitation on the simultaneous transmission or reception, and a redundant description may be omitted. In addition, this embodiment may be applied to an MLD which cannot perform the STR.

According to an embodiment of the present invention, duration information may be shared between links for multi-link operation. In an embodiment, the duration information may be TXOP duration information transmitted in a signaling field of a preamble. The signaling field may be the U-SIG field described above. Alternatively, the signaling field may be the HE-SIG-A field described above. As another embodiment, the duration information may be duration information indicated by a duration ID/field including a MAC header. As another embodiment, the duration information may be duration information indicated by a length field (L length field) including an L-SIG field. According to an embodiment, duration information indicated by a U-SIG field or a HE-SIG-A or a duration ID/field may be a value indicating TXOP duration. According to an embodiment, duration information indicated by an L-SIG field may be the length of a physical layer protocol data unit (PPDU) including the L-SIG field, or a value indicating the end of the PPDU including the L-SIG field.

In addition, according to an embodiment of the present invention, transmission or channel access for duration based on duration information shared between links may be limited. A method for limiting the transmission or the channel access may include configuring a NAV. Alternatively, the NAV may be reset to resume the transmission or channel access. In this case, the NAV may be an intra-BSS NAV. The intra-BSS NAV may be a NAV configured by an intra-BSS frame (or PPDU). That is, an STA belonging to an MLD may configure a NAV based on a frame (or PPDU) facing another STA belonging to the MLD.

According to an embodiment of the present invention, there may be an inter-link NAV. In the multi-link operation, the inter-link NAV may be a NAV used by STAs of multiple links belonging to an MLD. For example, transmission may not be performed through Link 2 based on the inter-link NAV configured based on duration information received through Link 1. In addition, for the MLD which cannot perform the STR, the inter-link NAV may be present or used. For example, when the inter-link NAV is configured, the MLD having configured the corresponding inter-link NAV may not perform transmission or channel access in multiple links (or all links used by the MLD).

In addition, as a type of the NAV, there may be a basic NAV, in addition to an inter-BSS NAV. The basic NAV may be a NAV configured by an inter-BSS frame (or PPDU), the basic NAV may be configured by a frame (or PPDU) for which whether it is an intra-BSS frame or an inter-BSS frame is not determined.

When an inter-link NAV is separately used, it may be advantageous in a situation in which a NAV setup is updated, compared to a case where the inter-link NAV is not used. For example, a situation in which it is allowed to reset a NAV configured by another link may occur. For example, it may be allowed to reset an inter-link NAV which has been configured upon determination that the inter-link NAV is configured based on a frame (or PPDU) but the frame (or PPDU) is not directed to the same MLD. When there is an MLD operating in Link 1 and Link 2, a NAV for Link 1 may be configured based on a frame received through Link 1. Thereafter, the NAV of Link 1 may be updated based on a frame of Link 2. In addition, when there is no need to maintain a NAV by Link 2 and the NAV of Link 1 is reset, NAV information configured based on the frame received through Link 1 may be lost. When the inter-link NAV is used together with the NAV for each link, the NAV for each link may be maintained even though the inter-link NAV is reset, and thus such a problem can be resolved.

An embodiment of the present invention provides an example of configuring a NAV, but the embodiment of the present invention is not limited thereto, and may be applied to a case of indicating a physical layer to stop performing channel access or indicating that a channel state is busy. In addition, the present invention is not limited to a case of resetting the NAV, and may be also applied to a case of indicating a physical layer to continuously perform channel access or indicating that the channel state is idle. In this case, the primitive exchanged between a physical layer and a MAC layer may be used. Alternatively, the primitive exchanged between one STA of the MLD and another STA may be used. Alternatively, the primitive exchanged between one MAC layer of the MLD and another MAC layer may be used.

According to an embodiment of the present invention, when an STA belonging to an MLD starts PPDU reception, another STA belonging to the MLD may need to perform channel access. As described above, the channel access may be stopped based on the received duration information, but a time interval for obtaining duration information from a PPDU reception start time point may be required due to the location of a field including the duration information or a time required for decoding, or the like. Accordingly, when channel access and transmission are performed during this time interval, the problem described above may occur. Accordingly, according to an embodiment of the present invention, an STA of an MLD may stop performing channel access from a time point at which another STA of the MLD starts reception. In addition, when it is identified that a frame received after another STA of the MLD starts reception is not directed toward another STA, channel access may be restarted.

Figure 12:
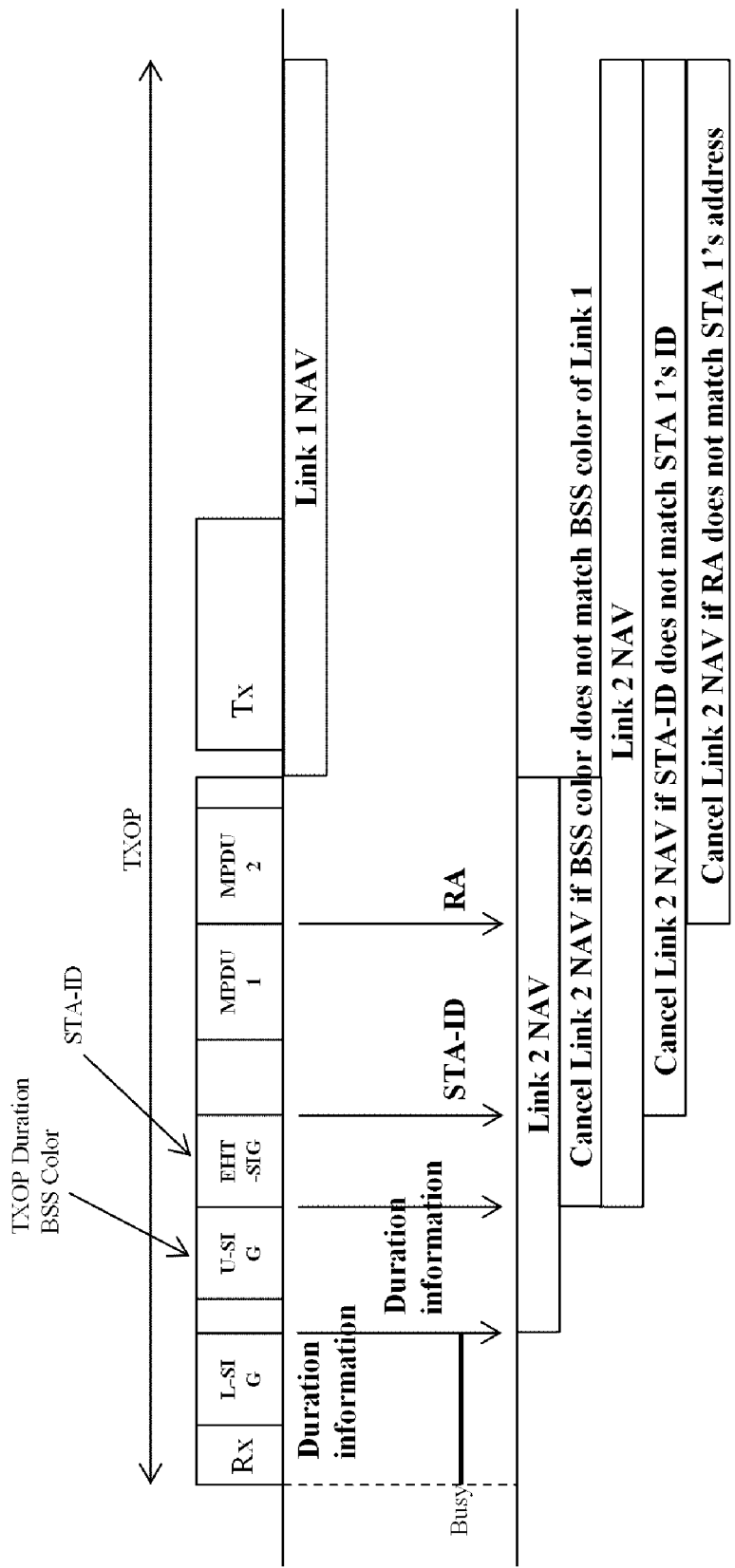
FIG. 12 illustrates another example of a multi-link NAV setup operation according to an embodiment of the present invention.

FIG. 12 illustrates another example of a multi-link NAV setup operation according to an embodiment of the present invention.

FIG. 12 more specifically describes the specific method in the embodiment described in FIG. 11, and a redundant description may be omitted.

As described above, based on a frame or a PPDU received by one STA belonging to an MLD, another STA belonging to the same MLD may stop or resume performing channel access or transmission. In the present invention, stopping the channel access or transmission may include an operation such as configuring (updating) a NAV, determining a channel state as busy, or stopping CCA. In addition, resuming the channel access or transmission may include an operation such as resetting a NAV, canceling the NAV setup, determining the channel state as idle, or performing the CCA. Hereinafter, such operations may be indicated as stopping or resuming channel access. In addition, it may be described that STA 1 and STA 2 belong to an MLD, and STA 1 and STA 2 operate in Link 1 and Link 2, respectively. In addition, the frame and the PPDU may be interchangeably indicated. In addition, as described in FIG. 11, the NAV in this case may be an intra-BSS NAV or an inter-link NAV.

According to an embodiment of the present invention, when STA 1 starts to receive a frame, STA 2 stops performing channel access. In addition, when STA 1 acquires duration information from an L-SIG, STA 2 may continuously stop performing the channel access. In this case, STA 2 may determine the channel access stopping state to be continued by the end of the frame received by STA 1. In addition, when STA 1 fails to correctly decode the L-SIG (in a case of invalid L-SIG), STA 2 may resume performing channel access.

In addition, TXOP duration and a BSS color may be received from the U-SIG of the frame received by STA 1. If the received BSS color indicates an intra-BSS, or the BSS color is a BSS color corresponding to STA 1, the channel access may be stopped. As an embodiment, a channel access stop period may last by the end of the received frame. In this case, it is advantageous in that the channel access can be promptly started after the received frame. As another embodiment, in this case, the channel access stop period may be TXOP duration. In this case, duration of the stopped channel access may be updated based on the L-SIG. In this case, it is advantageous in that a sequence after the received frame can be better protected.

Alternatively, there may be a case where the TXPO duration and the BSS color are received from the U-SIG of the frame received by STA 1, and the received BSS color does not indicate an intra-BSS, or the BSS color is a not a BSS color corresponding to STA 1. Alternatively, there may be a case where STA 1 has failed to successfully decode the U-SIG. In this case, STA 2 may resume the channel access.

Alternatively, when information acquired from the U-SIG of the frame received by STA 1 indicates that the corresponding frame is a frame not received by STA 1, STA 2 may resume performing channel access. For example, when a PHY identifier acquired from the U-SIG corresponds to an ID corresponding to a future standard or an unrecognizable ID, STA 2 may resume performing channel access.

In addition, the case in which the U-SIG is received is described above, but the same embodiment is applicable to a case in which a HE PPDU is received and a case in which a HE-SIG-A is received. For example, the HE-SIG-A may include TXOP duration and a BSS color, and accordingly the same operation described above may be performed.

In addition, an STA-ID may have been received from an EHT-SIG of the frame received by STA 1. When the received STA-ID is an indicator to be received by STA 1, for example, when STA-ID indicates STA 1, STA-ID indicates a group to which STA 1 belongs, or STA-ID indicates broadcast, STA 2 may continuously stop performing the channel access.

In addition, an STA-ID may have been received from an EHT-SIG of the frame received by STA 1. When the received STA-ID corresponds to an indicator which does not correspond to STA 1, for example, when STA-ID does not indicate an indicator corresponding to STA 1, STA-ID does not indicate a group to which STA 1 belongs, and STA-ID does not indicate broadcast, STA 2 may resume performing channel access. Alternatively, even when STA 1 has failed to successfully decode the EHT-SIG, STA 2 may resume performing channel access.

In addition, the case in which the EHT-SIG is received is described above, but the same embodiment is applicable to a case in which a HE PPDU is received and a case in which a HE-SIG-B is received. For example, the HE-SIG-B may include an STA-ID, and accordingly, the same operation described above may be performed.

In addition, a MAC header of the frame received by STA 1 may have been received. When a receiver address (RA) or a destination address (DA) included in the received MAC header indicates a value to be received by STA 1, for example, when an RA or a DA indicates STA 1, indicates a group to which STA 1 belongs, or an STA-ID indicates broadcast, STA 2 may continuously stop performing the channel access. In this case, the stopped channel access period may be based on duration information included in the received MAC header. More specifically, the stopped channel access period may be based on duration information indicated by a duration/ID field included in the received MAC header.

In addition, a MAC header of the frame received by STA 1 may have been received. When an RA or a DA included in the received MAC header is an indicator not corresponding to STA 1, for example, when the RA or the DA does not indicate an indicator corresponding to STA 1, does not indicate a group to which STA 1 belongs, and does not indicate broadcast, STA 2 may resume performing channel access. Alternatively, STA 1 may not have received all MAC headers. For example, STA 1 may have failed to receive all MPDUs included in an A-MPDU. In this case, STA 2 may resume performing channel access.

The stopping and resuming of channel access, described in FIG. 12, may operate according to a decoding order as STA 1 start receiving a frame (or PPDU) and decode the same in order. The decoding order may be based on a PPDU format, a frame format, and the like. For example, decoding may be performed in the sequence of an L-SIG, a U-SIG, an EHT-SIG, and a MAC header (in a case of an EHT PPDU). Alternatively, decoding may be performed in the sequence of an L-SIG, a HE-SIG-A, a MAC header (in a case of a HE SU PPDU or a HE TB PPDU). Alternatively, decoding may be performed in the sequence of an L-SIG, a HE-SIG-A, a HE-SIG-B, a MAC header (in a case of a HE MU PPDU). Alternatively, decoding may be performed in the sequence of an L-SIG and an MAC header (in a case of a 11a/g PPDU).

According to an embodiment of the present invention, the STA-ID mentioned above may be a value indicating an intended receiver of a PPDU or a resource unit (RU). In addition, the STA-ID may be included in an EHT-SIG field, a HE-SIG-B field, or the like. In addition, the STA-ID may indicate a value corresponding to a single STA. For example, when multiple STAs are included in an MLD, the STA-ID may indicate a value corresponding to one of the multiple STAs. In addition, the STA-ID may be a value based on an AID or MAC address of the STA.

Figure 13:
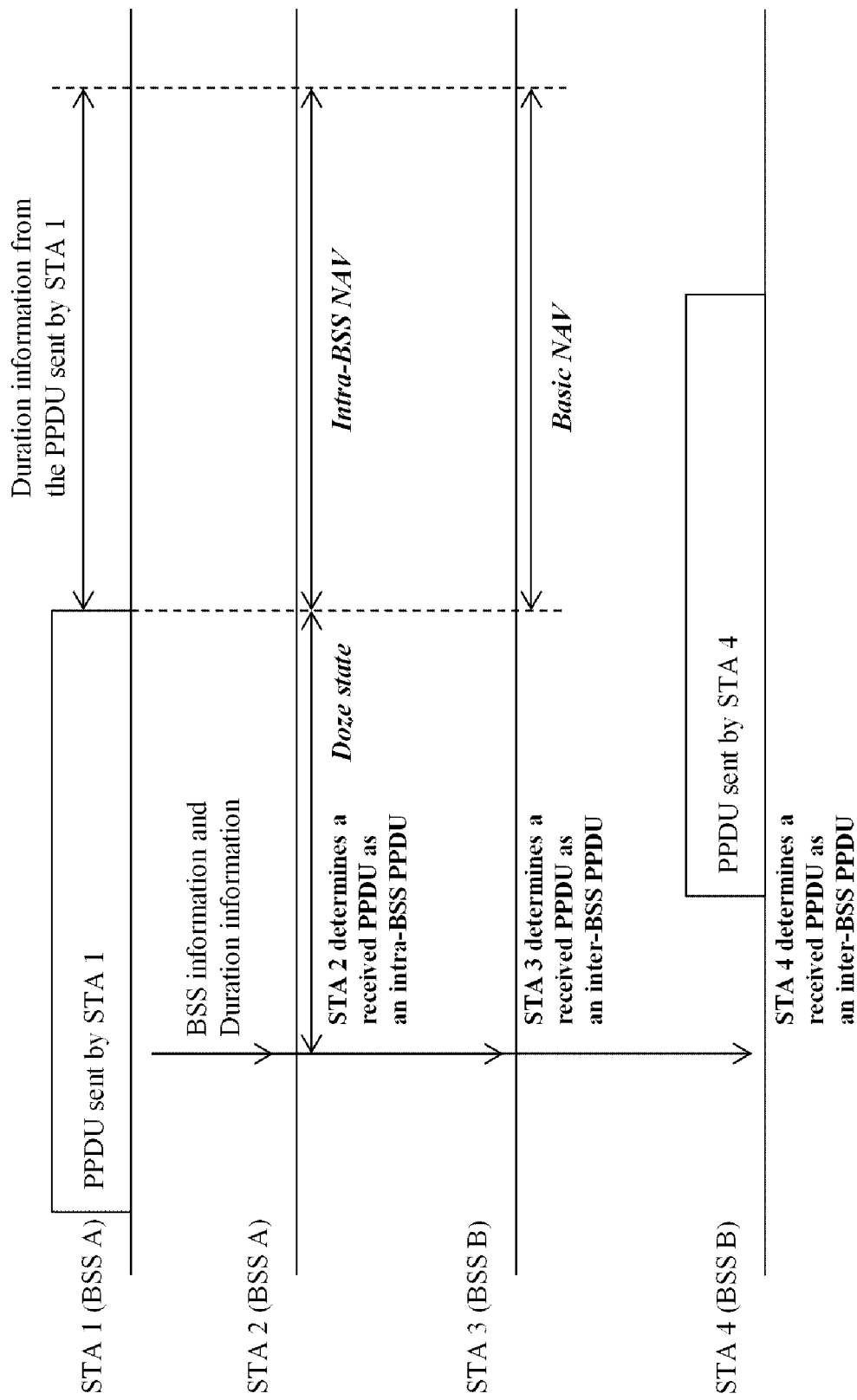
FIG. 13 illustrates an example of BSS classification and an operation based thereon according to an embodiment of the present invention.

FIG. 13 illustrates an example of BSS classification and an operation based thereon according to an embodiment of the present invention.

According to an embodiment, an STA may classify (or determine) a BSS according to a received frame or a received PPDU. The classifying of the BSS may include an operation of classifying whether or not the received frame or the received PPDU corresponds to a BSS to which the STA performing the classification belongs. Alternatively, the classifying of the BSS may mean an operation of classifying whether or not the received frame or the received PPDU has been transmitted from a BSS to which the STA performing the classification belongs. In addition, the classifying of the BSS may include an operation of whether or not the received frame or the received PPDU corresponds to a BSS to which the STA performing the classification does not belong. Alternatively, the classifying of the BSS may mean an operation of classifying whether or not the received frame or the received PPDU has been transmitted from a BSS to which the STA performing the classification does not belong. In addition, the classifying of the BSS may include an operation of classifying a BSS to which the received frame or the received PPDU belongs. Alternatively, the classifying of the BSS may mean an operation of classifying a BSS from which the received frame or the received PPDU has been transmitted. According to an embodiment of the present invention, the BSS to which the STA performing the classification belongs may be referred to as an intra-BSS. Alternatively, BSSs including the BSS to which the STA performing the classification belongs may be referred to as an intra-BSS. In addition, a BSS other than the intra-BSS may be referred to as an inter-BSS. Alternatively, a BSS other than the intra-BSS may be an inter-BSS or an unclassified BSS. Alternatively, the inter-BSS may include the unclassified BSS. In addition, the BSS to which the STA performing the classification does not belong may be referred to as an inter-BSS.

According to an embodiment, when it is determined that the received frame or the received PPDU corresponds to an intra-BSS or has been transmitted from the intra-BSS, the received frame and the received PPDU may be an intra-BSS frame and an intra-BSS PPDU, respectively. In addition, when it is determined that the received frame or the received PPDU corresponds to an inter-BSS, or has been transmitted from the inter-BSS, the received frame and the received PPDU may be an inter-BSS frame and an inter-BSS PPDU, respectively. In addition, a PPDU including the intra-BSS frame may be an intra-BSS PPDU. In addition, a PPDU including the inter-BSS frame may be an inter-BSS PPDU.

According to an embodiment, the BSS may be classified based on one or more BSS classification conditions. For example, the BSS may be classified according whether at least one of the one or more BSS classification conditions is satisfied.

The BSS classification condition may include a condition based on a BSS color. The BSS color may be an identifier. In addition, the BSS color may be included in a preamble of a PPDU, and more specifically, in a signaling field (for example, a HE-SIG-A field, a U-SIG field, or a VHT-SIG-A field). In addition, the BSS color may be included in a TXVECTOR transferred from a MAC layer to a PHY layer of a transmitter. In addition, the BSS color may be included in an RXVECTOR transferred from a PHY layer to a MAC layer of a receiver. Parameters included in the TXVECTOR and the RXVECTOR may be referred to as a TXVECTOR parameter and an RXVECTOR parameter, respectively. In addition, the BSS color may be included in the TXVECTOR parameter or the RXVECTOR parameter. In addition, a BSS color configured by an AP may be informed to STAs. According to an embodiment, the BSS may be classified based on a BSS color included in a received PPDU. When a BSS color included in the PPDU received by the STA differs from a BSS color of the BSS corresponding to the STA, the received PPDU may be classified as an inter-BSS PPDU. Alternatively, when the BSS color included in the PPDU received by the STA differs from the BSS color of the BSS corresponding to the STA and the value thereof is not 0, the received PPDU may be classified as an inter-BSS PPDU. In addition, when the BSS color included in the PPDU received by the STA is identical to the BSS color of the BSS corresponding to the STA, the received PPDU may be classified as an intra-BSS PPDU.

The BSS classification condition may include a condition based on a MAC address. The MAC address may be included in a MAC header of a frame. In addition, the MAC address may include a receiver address (RA), a transmitter address (TA), a BSSID, a source address (SA), a destination address (DA), and the like. According to an embodiment, the BSS may be classified based on the MAC address included a received frame. When a MAC address included in the received frame differs from a BSSID of a BSS corresponding to the STA, the received frame may be classified as an inter-BSS frame. More specifically, when all MAC addresses included in the received frame differ from the BSSID of the BSS corresponding to the STA, the received frame may be classified as an inter-BSS frame. In addition, when the MAC address included in the received frame is identical to the BSSID of the BSS corresponding to the STA, the received frame may be classified as an intra-BSS frame. More specifically, when at least one of MAC addresses included in the received frame is identical to the BSSID of the BSS corresponding to the STA, the received frame may be classified as an intra-BSS frame.

The corresponding BSS may include a BSS associated with the STA. In addition, the corresponding BSS may include a BSS included in as set of multiple BSSIDs, such as the BSS associated with the STA. In addition, the corresponding BSS may include a BSS included in a co-hosted BSSID set, such as the BSS associated with the STA. In addition, information relating to one or more BSSs included in the same set of multiple BSSIDs or the same co-hosted BSSID set may be transferred through one frame.

The BSS classification condition may include a condition based on a partial AID field value included in a VHT PPDU. The partial AID field may be included in a preamble of a VHT PPDU. In addition, the partial AID field may be included in a VHT-SIG-A field included in the VHT PPDU. According to an embodiment, the partial AID field may indicate a part of a BSS color. For example, when a partial BSS color function is used, the partial AID field may indicate a part of the BSS color. Alternatively, when an AID assignment rule is used, the partial AID field may indicate a part of the BSS color. The AID assignment rule may be a method for allocating an AID based on a part of the BSS color. In addition, when a group ID field included in the VHT-SIG-A field of the VHT PPDU has a preconfigured value (for example, when a group ID field is configured as 63), the partial AID field may indicate a part of the BSS color. According to an embodiment, in a case where a partial AID field of the received PPDU indicates a part of the BSS color, when the received partial AID field value differs from a part of the BSS color corresponding to the received STA, the received PPDU may be classified as an inter-BSS PPDU.

In addition, in a case where the partial AID field of the received PPDU indicates a part of the BSS color, when the received partial AID value is identical to a part of the BSS color corresponding to the received STA, the received PPDU may be classified as an intra-BSS PPDU. In addition, the part of the BSS color may be 4 LSBs. According to another embodiment, the partial AID field may indicate a part of the BSSID. For example, in a case where a group ID field included in the VHT-SIG-A field of the VHT PPDU has a preconfigured value (for example, when a group ID field is configured as 0), the partial AID field may indicate a part of the BSSID. According to an embodiment, in a case where a partial AID field of the received PPDU indicates a part of the BSSId, when the received partial AID field value differs from a part of the BSSID corresponding to the received STA, the received PPDU may be classified as an inter-BSS PPDU. In addition, in a case where a partial AID field of the received PPDU indicates a part of the BSSID, when the received partial AID field is identical to a part of the BSSID corresponding to the received STA, the received PPDU may be classified as an intra-BSS PPDU. In addition, in this case, the part of the BSSID may be 9 MSBs of the BSSID. In addition, the partial AID field value may be included in TXVECTOR parameter PARTIAl_AID or RXVECTOR parameter PARTIAL_AID. In addition, the group ID field value may be included in TXVECTOR parameter GROUP_ID or RXVECTOR parameter GROUP_ID.

The BSS classification condition may include a condition for receiving a PPDU having a preconfigured condition by an AP. For example, the PPDU having a preconfigured condition may include a downlink PPDU. According to an embodiment, the downlink PPDU may include a VHT MU PPDU. In addition, the downlink PPDU may include a PPDU in which signaling indicating either uplink or downlink is configured with a preconfigured value. The signaling indicating either the uplink or the downlink may be included in a signaling field of a HE PPDU. Alternatively, the signaling indicating either the uplink or the downlink may be included in a U-SIG. The U-SIG may be included in a preamble an EHT PPDU or a PPDU after the EHT standard.

In addition, there may be a PPDU which cannot be classified as an intra-BSS PPDU or an inter-BSS PPDU. For example, when both the condition for classifying the PPDU as the intra-BSS PPDU and the condition for classifying the PPDU as the inter-BSS PPDU, which are described above, are not satisfied, the PPDU may not be classified as the intra-BSS PPDU or the inter-BSS PPDU.

In addition, during the BSS classification, when classification results according to multiple conditions do not match, a final result may be determined according to a preconfigured condition. For example, when a result according to a condition based on the BSS color and a result according to a condition based on the MAC address do not match, the result according to the condition based on the MAC address may be prioritized, or a final result may be determined based on the result according to the condition based on the MAC address. Alternatively, when both the condition for classifying the PPDU as the intra-BSS PPDU and the condition for classifying the PPDU as the inter-BSS PPDU are satisfied, the PPDU may be classified as the intra-BSS PPDU.

According to an embodiment of the present invention, the STA may perform an operation based on the classified BSS. The operation based on the classified BSS may include an intra-PPDU power save operation. The intra-PPDU power save operation may be a power save operation based on the received PPDU. When the preconfigured condition is satisfied, the intra-PPDU power save operation may be performed. The preconfigured condition may include a condition for classifying the received PPDU as the intra-BSS PPDU. In addition, the preconfigured condition may include a condition in which an intended received of the received PPDU is not an STA having received the PPDU. For example, when an ID or an address included in the PPDU does not correspond to the STA having received the PPDU, the intended receiver of the PPDU may not be an STA having received the PPDU. The ID may be included in a preamble of the PPDU. For example, the ID may be STA_ID included in the preamble of the PPDU. In addition, STA_ID may be included in a HE MU PPDU or an EHT PPDU. In addition, the address may be the MAC address described above. In addition, when signaling indicating either the uplink or the downlink, included in the received PPDU, indicates the uplink, the intended receiver of the PPDU may not be the STA having received the PPDU. In addition, when the configuration of the received PPDU is made so that the STA having received the PPDU is not supported, the intended receiver of the PPDU may not be the STA having received the PPDU. The configuration of the received PPDU may include an MCS, the number of spatial streams, a channel width, and the like of the PPDU. In addition, when the configuration of the received PPDU is made so that the STA having received the PPDU is not supported, the PHY-RXEND.indication (UnsupportedRate) primitive may be received. In addition, when the received PPDU has a preconfigured format, the intended receiver of the PPDU may not be the STA having received the PPDU. The preconfigured format may include a TB PPDU. The TB PPDU may include a HE TB PPDU and an EHT TB PPDU. In addition, the TB PPDU may be a PPDU transmitted as a response to a triggering frame. The triggering frame may include a trigger frame. The triggering frame may include a frame including triggering information. The triggering information may be included in a MAC header, for example, an A-control field. In addition, the triggering information or information included in the trigger frame may include the length of a responding PPDU, an RU to be used when responding, a PHY configuration to be used when responding, a MAC configuration, and the like. The intra-PPDU power save operation may be an operation in which entering a doze state by the end of the received PPDU is allowed. As another embodiment, when it is determined that the intended receiver of the frame or the PPDU received by an STA is not the STA described above, reception or decoding of the PPDU or the frame may be stopped.

The operation based on the classified BSS may include an operation of configuring (or updating) a NAV. According to an embodiment, an STA may manage one or more NAVs. In addition, when the STA has received the PPDU or the frame, a NAV corresponding to the BSS classified based on the received PPDU or the received frame may be configured. For example, the intra-BSS NAV may be a NAV corresponding to the intra-BSS PPDU. In addition, a basic NAV may be a NAV corresponding to a PPDU other than the intra-BSS PPDU. Alternatively, the basic NAV may be a NAV corresponding to the inter-BSS PPDU. In addition, when the NAV is configured based on the received PPDU or the received frame, duration information included in the received PPDU or the received frame may be used. The duration information may include a TXOP. The TXOP may mean a value included in a TXOP field. The TXOP field may be included in a preamble of a PPDU. For example, the TXOP field may be included in a HE-SIG-A field of a HE PPDU. Alternatively, the TXOP field may be included in a U-SIG field of an EHT PPDU or a PPDU after the EHT standard. In addition, the duration information may be included in the MAC header. For example, the duration information may be included in a duration/ID field included in the MAC header.

The operation based on the classified BSS may include a spatial reuse operation. In addition, the operation based on the classified BSS may include a channel access operation. The spatial reuse information may be a channel access operation. When an STA receives a PPDU or a frame and a preconfigured condition is satisfied, the spatial reuse operation may be performed. The preconfigured condition may include a condition in which the received PPDU or the received frame corresponds to an inter-BSS. In addition, the preconfigured condition may include a condition in which a signal strength of the received PPDU or the received frame may have a value smaller than a threshold. For example, the threshold may be variable. In addition, the threshold may be a threshold for an OBSS PD-based spatial reuse operation. In addition, the threshold may be a value equal to or greater than a CCA threshold. In addition, the threshold may be a value based on power to be transmitted. The spatial reuse operation may include an operation of transmitting a PPDU. In addition, the spatial reuse operation may include an operation of resetting PHY. For example, the operation of resetting PHY may be an operation of issuing the PHY-CCARESET.request primitive. In addition, the spatial reuse operation may include an operation of not configuring a NAV based on the received PPDU or the received frame. When the STA performs the spatial reuse operation, the STA may transmit the PPDU while the received PPDU or the received frame is transmitted or received.

Referring to FIG. 13, there may be BSS A and BSS B, and BSS A and BSS B may be different from each other. In addition, each of BSS A and BSS B may correspond to an inter-BSS. That is, a PPDU or a frame transmitted from BSS B by an STA associated with BSS A may be classified as an inter-BSS PPDU or an inter-BSS frame. In addition, there may be STA 1 and STA 2 belonging to BSS A (or associated with an AP operating BSS A). There may be STA 3 and STA 4 belonging to BSS B (or associated with an AP operating BSS B). Referring to FIG. 13, STA 1 may transmit a PPDU. In addition, the PPDU transmitted by STA 1 may include information on the BSS. For example, information on the BSS may be information for classifying the above-described BSS. In addition, the PPDU transmitted by STA 1 may include duration information.

STA 2 may receive the PPDU transmitted by STA 1, and may classify a BSS for the corresponding PPDU. In addition, since STA 2 and STA 1 belong to BSS A, the PPDU received by STA 2 may be classified as an intra-BSS PPDU. In addition, the PPDU received by STA 2 may be a UL PPDU or a PPDU in which the STA is not an intended receiver. Accordingly, according to the above-described embodiment, STA 2 may perform the intra-PPDU power saving. Referring to FIG. 13, STA 2 may enter the doze state by the end of the received PPDU. In addition, STA 2 may configure a NAV based on duration information included in the received PPDU. STA 2 may configure an intra-BSS NAV since STA 2 has classified the received PPDU as the intra-BSS PPDU.

STA 3 may receive a PPDU transmitted by STA 1, and may classify a BSS for the corresponding PPDU. In addition, STA 3 and STA 1 belong to BSS B and BSS A, respectively, and thus the PPDU received by STA 3 may be classified as an inter-BSS PPDU. In addition, STA 3 may configure a NAV based on duration information included in the received PPDU. A basic NAV may be configured since STA 3 has classified the received PPDU as the inter-BSS PPDU.

STA 4 may receive a PPDU transmitted by STA 1, and may classify a BSS for the corresponding PPDU. In addition, STA 3 and STA 1 belong to BSS B and BSS A, respectively, the PPDU received by STA 4 may be classified as an inter-BSS PPDU. In addition, a signal strength of the PPDU received by STA 4 may have a value smaller than a threshold. Accordingly, the PPDU received by STA 4 has been classified as the inter-BSS PPDU and the signal strength of the PPDU received by STA 4 has a value smaller than the threshold, STA 4 may perform a spatial reuse operation. Accordingly, STA 4 may perform channel access and a backoff procedure, and may start transmission. For example, STA 4 may start transmission at a time point by which the PPDU transmitted by STA 1 has not yet ended.

Figure 14:
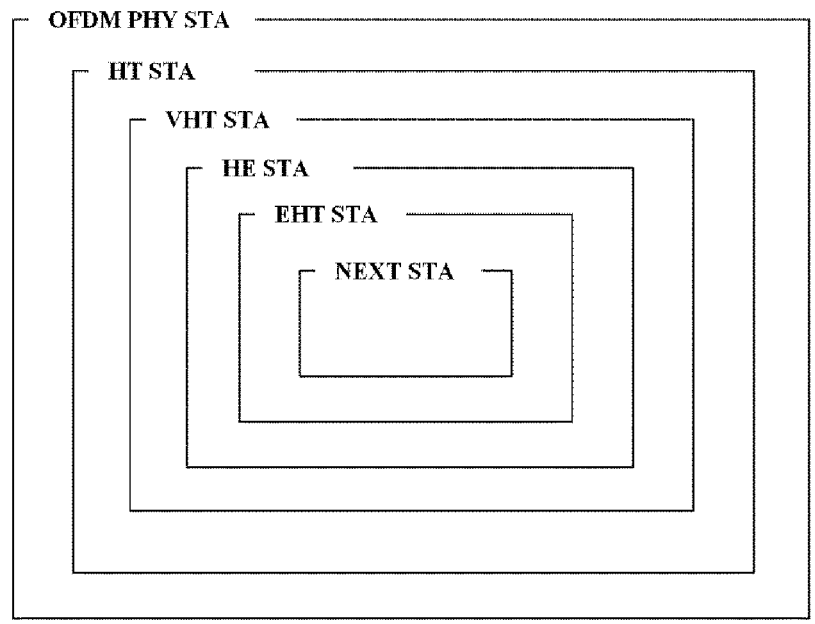
FIG. 14 illustrates a wireless LAN function according to an embodiment of the present invention.

FIG. 14 illustrates a function of an STA according to an embodiment of the present invention.

According to an embodiment of the present invention, an STA following a wireless LAN standard may include a function of a previous wireless LAN standard. This is for backward compatibility. For example, the STA supporting a specific wireless LAN standard may support a wireless LAN standard function in the previous generation and also additionally support a new function. For example, an HT STA may support a basic function of an OFDM PHY STA. Accordingly, the HT STA may be classified as an OFDM PHY STA. In addition, the HT STA may support not only a function of the OFDM PHY STA but also an additional function not supported by the OFDM PHY STA. A VHT STA may support a basic function of the HT STA and support a function not supported by the HT STA. The VHT STA may be classified as the HT STA. In addition, a HE STA may support a basic function of the VHT STA, and support a function not supported by the VHT STA. The HE STA may be classified as the VHT STA. In addition, an EHT STA may also be the HE STA. In addition, the EHT STA may support a basic function of the HE STA, and support a function not supported by the HE STA. In addition, the EHT STA may be classified as the HE STA. In addition, a wireless LAN standard after the EHT standard may be newly defined. In the present invention, a standard after the ETH standard may be referred to as a NEXT standard, and an STA following the NEXT standard may be referred to a NEXT STA. The NEXT STA may support a basic function of the EHT STA, and may support a function not supported by the EHT STA. The NEXT STA may be classified as the EHT STA.

FIG. 14 is a diagram illustrating a relationship among STAs supporting each wireless LAN standard. Referring to FIG. 11, in a case of the EHT STA, the STA may be the HE STA, the VHT STA, the HT STA, and the OFDM PHY STA. In addition, in a case of the NEXT STA, the STA may be the EHT STA, the HE STA, the VHT STA, the HT STA, and the OFDM PHY STA.

FIG. 16 illustrates a UL MU operation according to an embodiment of the present invention.

An access point in an embodiment of the present invention may transmit a frame soliciting multi-user (MU) transmission. Such a frame may be referred to as a trigger frame. In this case, one or more STAs having received a triggering frame may perform uplink transmission based on the triggering frame. Specifically, one or more STAs having received the triggering frame may transmit a response frame for the frame. In this case, an interval (an inter-space) between a PPDU including the triggering frame and a PPDU used for uplink transmission may be an SIFS. Specifically, multiple STAs may receive the triggering frame and simultaneously transmit an immediate response. In the present specification, the immediate response indicates that the interval between the above-described received PPDU and the PPDU including the response is an SIFS. Specifically, the immediate response may be a response transmitted after the SIFS from the end of the received PPDU.

The triggering frame is a type of control frame, and may be a trigger frame including trigger information. In addition, the triggering frame may be a frame including the triggering information in the MAC header. In this case, the trigger information may be triggered response scheduling included in an HT control field, a control subfield, or an A-control subfield of the MAC header. In addition, the trigger information may be information soliciting transmission of a TB PPDU.

The TB PPDU has a PPDU format including a response frame to the triggering frame. The TB PPDU may include a HE TB PPDU and an EHT TB PPDU. In addition, the TB PPDU may include a NEXT TB PPDU defined in the NEXT wireless LAN standard. The HE TB PPDU may include a preamble sequentially including an L-STF, an L-LTF, an L-SIG, an RL-SIG, a HE-SIG-A, a HE-STF, and a HE-LTF, and may include data and packet extension (PE), in addition to the preamble.

In addition, the EHT TB PPDU and the NEXT TB PPDU may sequentially include a preamble including an L-STF, an L-LTF, an L-SIG, an RL-SIG, a U-SIG, an (EHT-/NEXT-) STF, and an (EHT-/NEXT-) LTF, and may include data and packet extension (PE), in addition to the preamble.

The triggering frame may include information required for TB PPDU transmission. When a type subfield (B3 B2) value of a MAC frame is 01b and a subtype subfield (B7 B6 B5 B4) value is 0010b, the values may indicate a MAC frame trigger frame.

When multiple STAs responding to the trigger frame transmit TB PPDUs having different formats, it may be difficult for an access point to receive the TB PPDU. In addition, when preambles of the PPDU transmitted by the multiple STAs are different from each other, it may be difficult for the access point to receive the TB PPDU. Specifically, when RUs in which TB PPDUs having different formats are transmitted overlap, it may be difficult for the access point to receive the TB PPDUs. Accordingly, the multiple STAs transmitting the response to one triggering frame may use the TB PPDU having the same format. In addition, preamble information of the TB PPDUs, transmitted by the multiple STAs transmitting the response to one triggering frame, may be identical.

As described through FIG. 14, the HE STA may transmit a HE TB PPDU. In addition, the EHT STA may transmit the EHT TB PPDU or the HE TB PPDU. In addition, the NEXT STA may transmit the NEXT TB PPDU, the EHT TB PPDU, or the HE TB PPDU.

Figure 15:
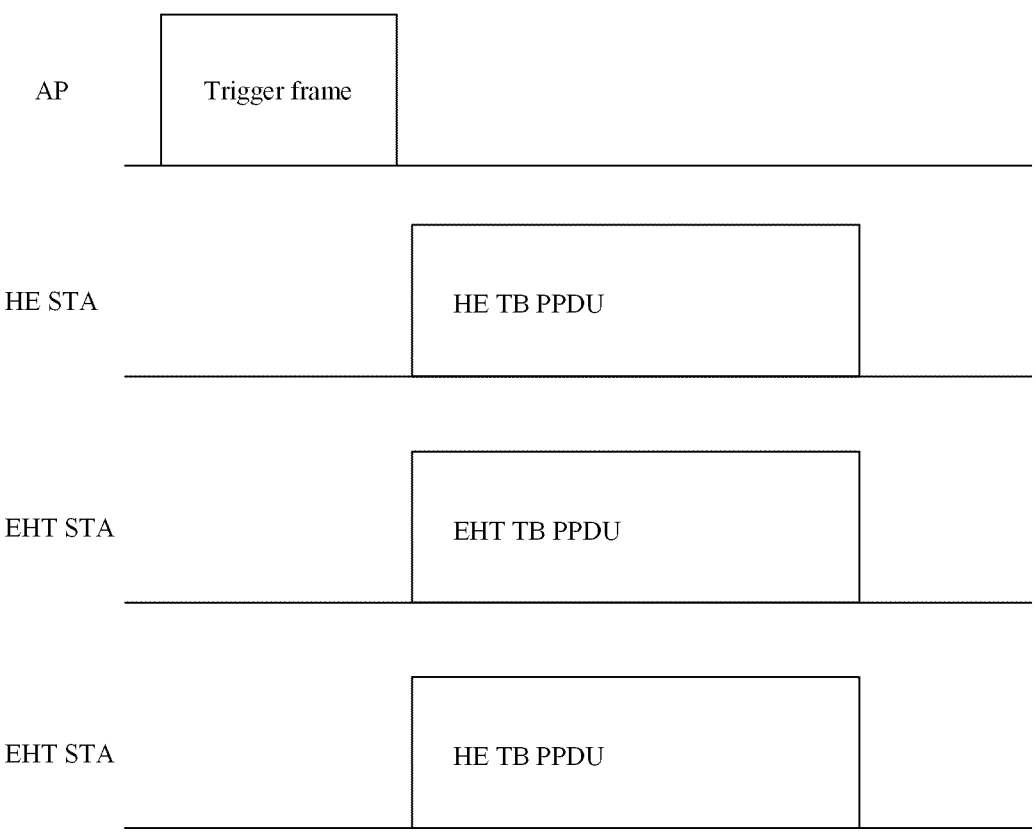
FIG. 15 illustrates an uplink (UL) multi-user (MU) operation according to an embodiment of the present invention.

In the embodiment of FIG. 15, an AP transmits a trigger frame scheduling transmission of the HE STA and transmission of the EHT STA. In this case, when the trigger frame does not indicate a format of the TB PPDU to be transmitted for a response to the trigger frame, the HE STA, EHT STA, or different EHT STAs may TB PPDUs having different formats. Accordingly, transmission of the TB PPDU may fail and a transmission opportunity may be wasted. For convenience of description, trigger frames defined in the HE, EHT, and NEXT standards may be referred to as a HE trigger frame, an EHT trigger frame, a next trigger frame, respectively. In addition, TRSs defined in the HE, EHT, and NEXT standards are referred to as an HE TRS, an EHT TRS, and a NEXT TRS, respectively. The format of the trigger frame is described through FIG. 13.

FIG. 16 illustrates a format of a trigger frame and a subfield included in the trigger frame according to an embodiment of the present invention.

Specifically, FIG. 16(*a*) illustrates a format of a trigger frame, FIG. 16(*b*) indicates a common info field of a trigger frame, and FIG. 16(*c*) indicates a user info field of a trigger frame. A MAC header of the trigger frame may include a frame control field, a duration field, and an address field. In this case, the address field includes an RA field and a TA field. In addition, the trigger frame includes a common info field and a user info list field. The common info field includes information for all stays triggered by the trigger frame. In addition, the user info list field may include a user info field. In a detailed embodiment, a trigger frame having a specific type may not include a user info list field. In addition, the trigger frame may include a padding field and an FCS field. The padding field may increase a frame length to secure a time required for an STA receiving a trigger frame to prepare a response, and may be optionally present.

The common info field may include a trigger type subfield. The trigger type subfield identifies a trigger frame variant. The trigger frame may indicate a type of a trigger frame through a trigger type subtype value. In addition, information included in each of a trigger dependent common info subfield and a trigger dependent user info subfield and the length of each of the trigger dependent common info subfield and the trigger dependent user info subfield may be determined according to the trigger type subfield. For example, the trigger type subfield may be indicated by B0 to B3 bits of the common info field.

In addition, the common info field may include a UL length subfield. The UL length subfield may include information on the length of a TB PPDU responding to the trigger frame. Alternatively, the UL length subfield may include information on the length of a frame responding to the trigger frame. In addition, the UL length subfield may indicate a value to be included in a length subfield of an L-SIG of a TB PPDU responding to the trigger frame. Accordingly, the STA responding with the TB PPDU may configure the length subfield of the L-SIG of the TB-PPDU based on the value of the UL length subfield included in the received trigger frame. More specifically, the STA responding with the TB PPDU may configure the length subfield of the L-SIG of the TB PPDU with a value of the UL length subfield included in the received trigger frame. For example, the UL length subfield may be indicated by B4 to B15 bits of the common info field.

In addition, the common info field may include a UL BW subfield. The UL BW subfield may indicate a bandwidth (BW) value included in a signaling field of the TB PPDU responding to the trigger frame, for example, a HE-SIG-A field or a U-SIG field. In addition, the UL BW subfield may indicate the maximum bandwidth of the TB PPDU responding to the trigger frame.

In addition, the common info field may include information, etc. to be included in the signaling field of the TB PPDU responding to the trigger frame, for example the HE-SIG-A field or the U-SIG field.

The user info field may include an AID12 subfield. The AID12 subfield may perform a role for indicating an intended receiver of a user info field including the AID12 subfield or a function of the user info field. Accordingly, the AID12 subfield may perform a role for indicating an intended receiver of the trigger frame including the AID12 subfield and a function of the trigger frame. For example, when a value of the AID12 subfield is a preconfigured value, the value may indicate that the user info field indicates a random-access resource unit (RA-RU). More specifically, when a value of the AID12 subfield is 0, the user info field may indicate an RA-RU for an associated STA. In addition, when a value of the AID12 subfield is 2045, the user info field may indicate an RA-RU for an unassociated STA. In addition, a trigger frame including the AID12 subfield or a user info field including an STA AID12 subfield corresponding to an STAID indicated by the value of the AID12 subfield, for example, an association ID (AID), may indicate triggering of a response. For example, the AID12 subfield may indicate an AID or 12 LSBs of the AID. The STA corresponding to the value of the AID12 subfield may response to the trigger frame with the TB PPDU. In addition, the value of the AID12 subfield may be a range of 1 to 2007 (including 1 and 2007). In addition, when the AID12 subfield has a preconfigured value, for example, 2046, it may indicate that the corresponding RU is not allocated to any STA. In addition, when the AID12 subfield has a preconfigured value, for example, 4095, it may indicate that padding of the trigger frame is started.

In addition, information of the user info field including the AID12 subfield may be information corresponding to the STA indicated by the AID12 subfield. For example, the RU allocation subfield may indicate the location and the size of the RU. In this case, a value of an RU allocation subfield of the user info field including the AID12 subfield may be information corresponding to the STA indicated by the AID12 subfield. In addition, the user info field may indicate a UL FEC coding type, a modulation method (UL HE-MCS and UL DCM), and transmission power (UL target RSSI) used for a response of the trigger frame including the user info field.

As described above, a problem may occur according to a PPDU format in which the TB PPDU is transmitted, the TB PPDU being simultaneously transmitted as a response to the trigger frame. A triggering frame transmission method related thereto is described through FIG. 14.

FIG. 17 illustrates information indicated by a value of an AID12 subfield of a trigger frame according to an embodiment of the present invention.

An EHT STA according to an embodiment of the present invention may selectively transmit a HE TB PPDU and an EHT TB PPDU. In addition, a NEXT STA may selectively transmit a HE TB PPDU, an EHT TB PPDU, and a NEXT TB PPDU. Through this, an STA in the multiple wireless LAN standards may be scheduled with one frame or one PPDU. Accordingly, use efficiency of a transmission medium may be increased. For example, the HE STA and the EHT STA not supporting the EHT standard, as one frame, may response with the HE TB PPDU.

In addition, information for selecting a TB PPDU format may be included in a trigger frame, a TRS, a PPDU including the trigger frame, or a PPDU including the TRS.

According to an embodiment of the present invention, information on the TB PPDU format may be present in the MAC level. According to an embodiment of the present invention, the trigger frame may be divided into a HE trigger frame, an EHT trigger frame, and a NEXT trigger frame. In addition, responses triggered by the HE trigger frame, the EHT trigger frame, and the NEXT trigger frame, may respond with a HE TB PPDU, an EHT TB PPDU, and a NEXT TB PPDU, respectively.

In addition, dividing the trigger frame into the HE trigger frame, the EHT trigger frame, and the NEXT trigger frame may have the same meaning as dividing a TB PPDU format to be used for responding to the trigger frame into a HE TB PPDU, an EHT TB PPDU, and a NEXT TB PPDU. That is, according to the format of the trigger frame, a format of the TB PPDU may vary, and the next generation trigger frame may be indicated together with the transmission of the previous TB PPDU. That is, the EHT trigger frame may simultaneously indicate transmission of the HE TB PPDU and transmission of the EHT TB PPDU. However, the HE trigger frame may not indicate the transmission of the EHT TB PPDU.

In a detailed embodiment, a trigger frame corresponding to one of the HE trigger frame, the EHT trigger frame, and the NEXT trigger frame may be determined according to a frame control field of the MAC header included in the trigger frame. For example, a trigger frame corresponding to one of the HE trigger frame, the EHT trigger frame, and the NEXT trigger frame may be determined according to at least one of a type subfield, a subtype subfield, or a control frame extension subfield of the frame control field of the MAC header included in the trigger frame. For example, when the type subfield, the subtype subfield, or the control frame extension subfield of the frame control field of the MAC header included in the trigger frame has a first value, the trigger frame may be classified as a HE trigger frame. In addition, when the type subfield, the subtype subfield, or the control frame extension subfield of the frame control field of the MAC header included in the trigger frame has a second value, the trigger frame may be classified as the EHT trigger frame. In addition, when the type subfield, the subtype subfield, or the control frame extension subfield of the frame control field of the MAC header included in the trigger frame has a third value, the trigger frame may be classified as the NEXT trigger frame. When a value of the type subfield of the frame control field of the MAC header is 01b and a value of the subtype subfield is 0010b, the trigger frame may be classified as the HE trigger frame. The type subfield, the subtype subfield, and the control frame extension subfield may be limited to 2 bits, 4 bits, and 4 bits, respectively. Accordingly, such an embodiment may be disadvantages in that a type to be used in the future is limited due to the use of limited bit field values.

In another detailed embodiment, a trigger frame corresponding to one of the HE trigger frame the EHT trigger frame, and the NEXT trigger frame may be determined according to a common info field included in the trigger frame. For example, when a value of the trigger type subfield of the common info field of the trigger frame is a first value, the trigger frame may be classified as the HE trigger frame. When a value of the trigger type subfield of the common info field of the trigger frame is a second value, the trigger frame may be classified as the EHT trigger frame. When a value of the trigger type subfield of the common info field of the trigger frame is a third value, the trigger frame may be classified as the NEXT trigger frame. Specifically, when a value of the trigger type subfield of the common info field of the trigger frame is 0 to 7, the trigger frame may be classified as the HE trigger frame. In addition, when a value of the trigger type subfield of the common info field of the trigger frame is not 0 to 7, the trigger frame may be classified as the EHT trigger frame or the NEXT trigger frame. The number of trigger type subfield bits is limited, and thus such an embodiment may be disadvantages in that a trigger type to be used in the future is limited due to the use of limited bit field values.

In another detailed embodiment, a trigger frame corresponding to one of the HE trigger frame, the EHT trigger frame, and the NEXT trigger frame may be determined according to a UL length field included in the trigger frame. For example, when a remainder value obtained by dividing a value of the UL length field of the trigger frame by 3 is a first value, the trigger frame may be classified as the HE trigger frame. When a remainder value obtained by dividing a value of the UL length field of the trigger frame by 3 is a second value, the trigger frame may be classified as the EHT trigger frame. When a remainder value obtained by dividing a value of the UL length field of the trigger frame by 3 is a third value, the trigger frame may be classified as the NEXT trigger frame. When a remainder value obtained by dividing a value of the UL length field of the trigger frame by 3 is not 0, the trigger frame may be classified as the HE trigger frame. When a remainder value obtained by dividing a value of the UL length field of the trigger frame by 3 is 1, the trigger frame may be classified as the HE trigger frame. When a remainder value obtained by dividing a value of the UL length field of the trigger frame by 3 is 0, the trigger frame may be classified as the EHT trigger frame or the NEXT trigger frame. In addition, a trigger frame corresponding to one of the HE trigger frame, the EHT trigger frame, and the NEXT trigger frame may be determined according to at least one of a format identifier, a PHY identifier, and TB PPDU format signaling of the trigger frame, in addition to the value of the UL length field of the trigger frame.

In another detailed embodiment, a trigger frame corresponding to one of the HE trigger frame, the EHT trigger frame, and the NEXT trigger frame may be determined according to a user info field included in the trigger frame. Specifically, a trigger frame corresponding to one of the HE trigger frame, the EHT trigger frame, and the NEXT trigger frame may be determined according to a value of an AID12 subfield of the user info field of the trigger frame. For example, a trigger frame corresponding to one of the HE trigger frame, the EHT trigger frame, and the NEXT trigger frame may be determined according to whether the value of the AID12 subfield of the user info field of the trigger frame is a pre-designated value. In this case, the user info field including the AID12 subfield indicating the type of the trigger frame may be the first user info field in a user info field list. The user info field including the AID12 subfield indicating the type of the trigger frame may be located before the user info field including the AID12 subfield indicating the AID of the STA. Accordingly, the STA receiving the trigger frame may determine the type of the trigger type early. In another detailed embodiment, the user info field including the AID12 subfield indicating the type of the trigger frame may be located after the user info field for the HE STA in the user info field list. Accordingly, a problem, which may occur due to failure in determining the meaning of the value of the AID12 subfield by a legacy STA, i.e., a HE STA, can be prevented. In addition, the user info field including the AID12 subfield indicating the type of the trigger frame may not include a subfield other than the AID12 subfield. This is because information other than the type of the trigger frame may not be required since the corresponding user info field is for indicating the type of the trigger frame. In such an embodiment, the length of the user info field may vary according to the value of the AID12 subfield. FIG. 17 shows a meaning indicated by the value of the AID12 subfield when such an embodiment is applied. When the value of the AID12 subfield is a first value, the AID12 subfield may indicate that the trigger frame including the AID12 field triggers transmission of the EHT TB PPDU. The first value may be 2047. When the value of the AID12 subfield is a second value, the AID12 subfield may indicate that the trigger frame including the AID12 field triggers transmission of the NEXT TB PPDU. The second value may be 2048.

In another detailed embodiment, an STA may determine a format of a TB PPDU transmitted as a response to a trigger frame, according to the location of a user info field triggering the STA. Specifically, the STA may determine a format of a TB PPDU transmitted as a response to a trigger frame, based on whether the user info field triggering the STA is located after the user info field including the AID12 field having a pre-designated value. In this case, the STA may determine the format of the TB PPDU transmitted as a response to the trigger frame, based on whether the user info field triggering the STA is located after the user info field including the AID12 field having a first value and is located after the user info field including the AID12 field having a second value. When the user info field triggering the STA in the embodiment of FIG. 17 is located after the user info field including the AID12 field having a value of 2047, the STA may transmit the EHT TB PPDU as a response to the trigger frame. In addition, when the user info field triggering the STA is located after the user info field including the AID12 field having a value of 2048, the STA may transmit the NEXT TB PPDU as a response to the trigger frame. In addition, when the user info field triggering the STA is located after the user info field including the AID12 filed having a value of 2047 and the user info field including the AID12 field having a value of 2048, the STA may transmit the NEXT TB PPDU as a response to the trigger frame. In addition, when the user info field triggering the STA is located before the user info field including the AID12 field having a value of 2047 and the user info field including the AID12 filed having a value of 2048, the STA may transmit the HE TB PPDU as a response to the trigger frame.

A trigger frame corresponding to one of the HE trigger frame, the EHT trigger frame, and the NEXT trigger frame may be determined according to the subfield of the user info field, in addition the AID12 subfield.

A trigger frame corresponding to one of the HE trigger frame, the EHT trigger frame, and the NEXT trigger frame may be determined according to a padding field of the trigger frame. For example, a trigger frame corresponding to one of the HE trigger frame, the EHT trigger frame, and the NEXT trigger frame may be determined according to whether the padding field of the trigger frame includes a pre-designated value.

In addition, the embodiments described above may be combined and applied. For example, factors influencing determination on whether the trigger frame is the HE trigger frame, the EHT trigger frame, or the NEXT trigger frame may be combined and determined.

In addition, the embodiments described above may be used in determining the format of the TB PPDU to be transmitted as a response to the TRS field.

Figure 18:
FIG. 18 illustrates an example of a UL MU operation according to an embodiment of the present invention.

FIG. 18 illustrates a UL MU operation according to an embodiment of the present invention.

As described above, a trigger frame may include a TRS in a MAC frame header. The TRS may be included an HT control field as described above. Specifically, when the HT control field includes an A-control field, the HT control filed may include the TRS. In addition, the TRS may be included in the TRS control field. Control list fields may be consecutively located in the A-control field. In this case, the control list field may include the TRS.

An STA corresponding to an intended receiver of a MAC frame including the TRS may transmit a PPDU based on the TRS field. In this case, the TRS may include information (UL data symbols) on the length of a PPDU or a frame to be transmitted as a response to the MAC frame including the TRS. When information (AP Tx power and UL target RSSI) on power of transmission of a response to the MAC frame including the TRS, information (RU allocation) the location and the size of an RU to be used when transmitting a response to the MAC frame including the TRS, and information (UL HE-MCS) on a modulation method of transmission of a response to the MAC frame including the TRS may be included.

The TRS may be defined according to a wireless LAN standard. In this case, an STA having received the MAC frame including the TRS may determine a format of a TB PPDU to be transmitted as a response to the TRS, according to the format of the TRS, that is, a wireless LAN standard in which the TRS is defined. Specifically, when the STA has received a HE TRS, the STA may transit the HE TB PPDU as a response to the TRS. In addition, when the STA has received an EHT TRS, the STA may transmit the EHT TB PPDU as a response to the TRS. In addition, when the STA has received a NEXT TRS, the STA may transmit the NEXT TB PPDU as a response to the TRS. In this case, the STA may determine a wireless LAN standard in which the TRS is defined, based on the control ID subfield of the A-control subfield. The TRS may be divided into a HE TRS and an TRS other than the HE TRS.

The format of the TRS may be determined according to whether the HT control field including the TRS is a HE variant, an EHT variant, or a NEXT variant. When the HT control field including the TRS is the EHT variant, the TRS may be the EHT TRS. In addition, when the HT control field including the TRS is the NEXT variant, the TRS may be the NEXT TRS. In addition, whether the HT control field is the HE variant, the EHT variant, or the NEXT variant may be determined according to a value of a pre-designated bit among bits of the HT control field including the TRS. For example, when the first and second bit (B0, B1) values of the HT control filed is 11b, the HT control field may be the HE variant. In addition, whether the HT control field is the HE variant, the EHT variant, or the NEXT variant may be determined based on the first and second bits (B0, B1) and an additional bit, for example, the 32nd bit (B31), of the HT control field.

In the embodiment of FIG. 18, when the TRS is included in the HE PPDU, the STA having received the HE PPDU may transmit a HE TB PPDU as a response to the TRS. When the TRS includes the EHT PPDU, the STA having received the EHT PPDU transmits the EHT TB PPDU as a response to the TRS. When the TRS includes the NEXT PPDU, the STA having received the EHT PPDU transmits the NEXT TB PPDU as a response to the TRS.

In addition, information indicated by a subfield included in the TRS may vary according to the format of a PPDU including the TRS. When the TRS is included in the HE PPDU, a subfield for the MCS included in the TRS, for example, a UL HE-MCS subfield, may indicate a value corresponding to a HE MCS table. In addition, when the TRS is included in the EHT PPDU, a subfield for the MCS included in the TRS, for example, a UL HE-MCS subfield, may indicate a value corresponding to an EHT MCS table. In addition, when the TRS is included in the NEXT PPDU, a subfield for the MCS included in the TRS, for example, a UL HE-MCS subfield, may indicate a value corresponding to a NEXT MCS table. In addition, information indicated by an RU allocation subfield may vary according to a format of a PPDU including the TRS.

Figure 19:
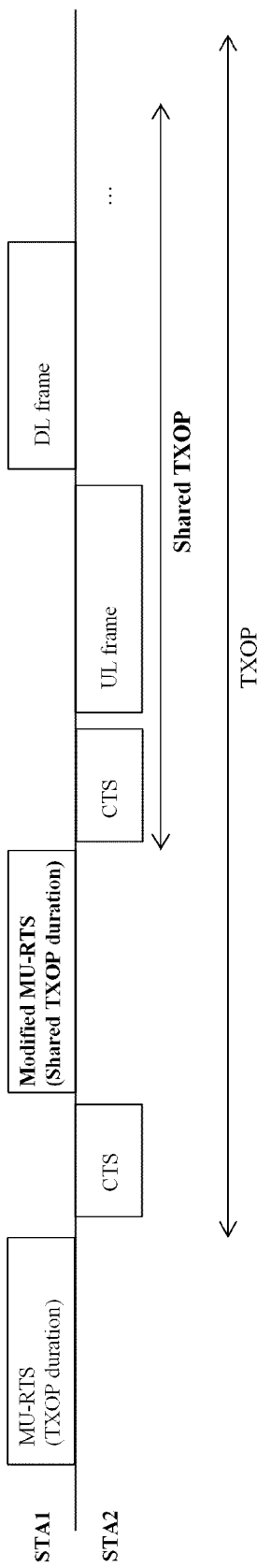
FIG. 19 illustrates a method for sharing a TXOP according to an embodiment of the present invention.

FIG. 19 illustrates a method for sharing a TXOP according to an embodiment of the present invention.

Referring to FIG. 19, a part or entirety of the TXOP configured by an AP may be shared to a non-AP STA, and the non-AP STA may transmit a PLCP protocol data unit (PPDU) to another non-AP STA (third STA) and/or an AP by using the shared TXOP. Hereinafter, sharing a TXOP to another STA in the present invention may be referred to as TXOP sharing. In addition, an STA may be an AP or an AP-STA transmitting a trigger frame, or a non-AP STA receiving a trigger frame. In addition, the STA may share a TXOP or receive a shared TXOP.

Specifically, after transmitting a frame for configuring a TXOP, the STA receives a response to the frame to configure (or acquire) the TXOP. After configuring the TXOP, the STA may perform TXOP sharing by sharing the configured TXOP. A response to the frame for configuring the TXOP may include information on the length of the TXOP, and the length of the TXOP may be greater than 0. In this case, the response to the frame for configuring the TXOP may be an immediate response, and may be transmitted after a specific time (for example, SIFS) at the end of the frame (for example, PPDU) for configuring the TXOP.

The length of the TXOP may be indicated based on duration information included in the frame transmitted by the STA. For example, the duration information may be included in a duration/ID field of a MAC header of a PPDU, and the length of the TXOP may be based on the duration information. The length of the TXOP may be included in a preamble included in the PPDU of the frame transmitted by the STA. That is, the duration information may be included in a TXOP field included in a signaling field of the PPDU, and the signaling field may be a HE-SIG-A field or a U-SIG field.

The TXOP sharing may be performed within the configured TXOP, and one or more TXOPs may be shared during the configured TXOP. That is, one or more TXOPs may be shared to another STA by the STA within the configured TXOP.

An STA having received the shared TXOP may transmit a PPDU to the STA having shared the TXOP or another STA during the shared TXOP, and in this case, the transmitted PPDU may be a PPDU (for example, a non-TB PPDU) other than a TB PPDU. That is, the STA having received the shared TXOP may transmit the PPDU even though a trigger frame is not received from the AP during the shared TXOP. In other words, the STA having received the shared TXOP may transmit the PPDU even though an additional trigger frame is not received until the shared TXOP ends by using an RU allocated by the trigger frame transmitted when the TXOP is shared even though a separate RU is not individually allocated through the trigger frame during the shared TXOP. Accordingly, as an example of the PPDU transmitted by the STA during the shared TXOP may be a non-HT PPDU, a HE PPDU, a VHT PPDU, a HE SU PPDU, or an EHT MU PPDU.

In the TXOP sharing, the STA having received the shared TXOP during the shared TXOP may transmit a frame to the STA having shared the TXOP or a third STA (or another STA). That is, when an AP configures a TXOP and shares a part or entirety of the configured TXOP to an STA, the STA having received the shared TXOP may transmit a frame to the AP having shared the TXOP or a third STA. In this case, the frame transmitted to the third STA is a frame transmitted between non-AP STAs, and may thus be a peer to peer (P2P) frame.

Such TXOP sharing may be configured through a specific frame. That is, sharing of a part or entirety of the configured TXOP through the specific frame may be indicated, and the STA may use the shared TXOP by receiving the corresponding frame. In this case, the specific frame may be transmitted by the STA sharing the TXOP. For example, the TXOP sharing may be performed through the trigger frame transmitted by the AP. In this case, the trigger frame for the TXOP sharing may be a trigger frame (for example, an MU-RTS frame, an MU-RTS trigger frame, or the like) having a specific type, and may be identified by the value of the trigger type subfield of the trigger frame described in FIG. 16. That is, the value of the trigger type subfield is configured as a preconfigured value (for example, "3"), the STA having received the trigger frame may recognize that the TXOP is shared and may transmit the PPDU through the shared TXOP.

The MU-RTS frame corresponding to a frame for sharing the TXOP may be a frame indicating transmission of a CTS frame from one or more STAs. For example, the CTS frame may be transmitted as an immediate response to the MU-RTS frame, and the CTS frame may be a non-HT PPDU. Hereinafter, the MU-RTS frame for sharing the TXOP in the present invention may be referred to as a modified MU-RTS frame or an MU-RTS TXS trigger frame. However, a frame for the TXOP sharing is not limited thereto and various other terms may be used.

Sharing of a part or entirety of the TXOP is configured for only one STA, but may be configured for one or more STAs. That is, in the case of the TXOP sharing through the frame, one or more STAs for the TXOP sharing may be indicated the frame. In this case, the TXOP sharing may be configured within the TXOP configured by the sharing STA as described above. That is, the shared TXOP cannot exceed the TXOP configured by the sharing STA.

Duration of the shared TXOP (for example, a modified MU-RTS frame) may be indicated by a specific frame for the TXOP sharing. For example, the modified MU-RTS may include a UL length subfield, and the UL length subfield may include duration of the shared TXOP. In this case, the UL length subfield may be the UL length subfield described in FIG. 16. When a trigger frame indicates transmission of a TB PPDU, the UL length subfield may include information on the length of the indicated TB PPDU (or information on a period for transmission of the TB PPDU).

Whether the transmitted MU-RTS frame is an MU-RTS frame (modified MU-RTS frame) for the TXOP sharing or an MU-RTS frame not used for the TXOP sharing may be indicated by a specific field included in the frame. For example, when a value of the specific field included in the frame is a preconfigured value, the corresponding MU-RTS frame may be a modified MU-RTS frame for the TXOP sharing. In this case, the specific frame may be a GI and HE-LTF type subfield. For example, when the type field included in the trigger frame indicates an MU-RTS frame, whether the MU-RTS frame is a trigger frame for the TXOP sharing may be identified according to the GI and HE-LTF type subfield. That is, when the GI and HE-LTF type subfield is configured with a preconfigured value, the corresponding trigger frame may be a trigger frame for the TXOP sharing.

Alternatively, whether the received frame is an MU-RTS frame for the TXOP sharing may be determined based on whether a specific field is included in the MU-RTS frame and/or the number of specific fields. In this case, the specific field may be the user info field or the user info list field described in FIG. 16. Specifically, whether the received MU-RTS frame is a frame for the TXOP sharing may be determined based on the number of user info fields included in the MU-RTS frame. For example, when the MU-RTS frame does not include a user info field (when the number of user info fields is "0"), the corresponding MU-RTS frame may be a frame for the TXOP sharing. In this case, when the MU-RTS frame is not a frame for the TXOP sharing, the corresponding MU-RTS frame may be an MU-RTS frame indicating transmission of the conventional CTS frame to one or more STAs, wherein the conventional MU-RTS frame is an MU-RTS frame defined in the 802.11ax standard.

An STA (for example, AP) having transmitted the conventional MU-RTS frame may transmit a frame or a PPDU immediately after the CTS frame is transmitted as a response to the conventional MU-RTS frame. In addition, An STA having transmitted a CTS frame may transmit a frame or a PPDU immediately after the CTS frame is transmitted as a response to a modified MU-RTS frame. Alternatively, as a response to the modified MU-RTS frame, an STA having received the shard TXOP may transmit a frame or a PPDU other than the CTS frame. In this case, the frame and the PPDU may be a frame transmitted by an STA having received the shared TXOP during the shared TXOP, and a PPDU including a frame transmitted by an STA having the shared TXOP during the shared TXOP, respectively. That is, the frame or the PPDU may be directed to the AP or may be a P2P frame.

In the present invention, indication of the MU-RTS frame may refer to the conventional MU-RTS frame. That is, in the present invention, indication of the MU-RTS frame may refer to the MU-RTS frame other than a modified MU-RTS frame.

According to an embodiment of the present invention, as a response to the modified MU-RTS frame, a CTS frame may be transmitted. The CTS frame may be transmitted by an STA receiving the shared TXOP. In this case, the STA receiving the shared TXOP may transmit a frame immediately after the CTS frame is transmitted. The STA receiving the shared TXOP may transmit a frame immediately after a PPDU including a CTS frame is transmitted. The frame transmitted immediately the CTS frame is transmitted may be included in a PPDU transmitted by the STA having received the shared TXOP during the above-described shared TXOP. Alternatively, the frame transmitted immediately after the CTS frame is transmitted may be included in the above-described non-TB PPDU and transmitted. In addition, in the present invention, when transmission is performed immediately after a time point, it may mean that transmission is performed at a time point after a time interval of an SIFS or PIFS from the end of the PPDU including the CTS frame. The CTS frame may inform that the STA receiving a shared TXOP has received the shared TXOP.

According to another embodiment, as a response to the modified MU-RTS frame, the CTS frame may not be transmitted. In addition, the STA receiving the shared TXOP may transmit a frame immediately after the modified MU-RTS frame. In addition, the STA receiving the shared TXOP may transmit a PPDU immediately after the PPDU including the modified MU-RTS frame. In this case, the transmitting frame may be included in the PPDU transmitted by the STA having received the shared TXOP during the above-described shared TXOP. Alternatively, in this case, the transmitted frame may be included in the above-described non-TB PPDU and transmitted. In addition, in the present invention, when transmission is performed immediately after a time point, it may mean that transmission is performed at a time point later by an SIFS or PIFS from the end of the PPDU including the modified MU-RTS frame.

According to an embodiment, the modified MU-RTS frame may include signaling on whether the STA receiving the shared TXOP needs to transmit the CTS frame. According to an embodiment, when a frame transmitted to the AP by the STA receiving the shared TXOP is transmitted, a TXOP shared without the CTS frame can be used. In addition, when the STA receiving the shared TXOP transmits a P2P frame, a TXOP shared through transmission of the CTS frame can be used. In addition, even when the STA receiving the shared TXOP transmits the P2P frame, an RA field of the CTS frame transmitted immediately after the modified MU-RTS frame can be configured as a MAC address of the STA having transmitted the modified MU- RTS frame. This is because it may be difficult for the STA sharing the TXOP to identify whether the STA receiving the shared TXOP has successfully received the modified MU-RTS frame when the STA receiving the shared TXOP does not transmit a frame including an address of the STA having transmitted the modified MU-RTS frame after receiving the modified MU-RTS frame.

Referring to FIG. 19, there may be STA1 and STA2, and STA1 and STA2 may be associated with each other. In addition, STA1 may be an AP. STA2 may be a non-AP STA. STA1 may transmit an MU-RTS frame. The MU-RTS frame may be the conventional MU-RTS frame. The MU-RTS frame may include duration information relating to TXOP duration. The MU-RTS frame may solicit a CTS frame from one or more STAs. In this case, the one or more STAs may include STA2. STA2 may transmit the CTS frame as a response to the MU-RTS frame. In this case, STA1 may be a TXOP holder. The TXOP holder may be an STA acquiring a TXOP. The TXOP holder may transmit a frame to be transmitted during the TXOP. In addition, in this case, STA2 may be a TXOP responder. The TXOP responder may be an STA having transmitted a response to the frame transmitted by the TXOP holder. The TXOP responder may transmit a response to a frame transmitted by the TXOP holder during the TXOP. Alternatively, the TXOP responder may transmit a frame allowed by the TXOP holder during the TXOP. In the embodiment of FIG. 19, an example of acquiring a TXOP based on exchanging of the MU-RTS frame and the CTS frame is described, but the present invention is not limited thereto, and may be applied to a case where a TXOP is acquired based on exchanging of other frames.

In FIG. 19, STA1 may perform TXOP sharing after acquiring the TXOP. For example, STA1 may transmit a modified MU-RTS frame corresponding to a frame notifying the TXOP sharing. For example, the modified MU-RTS frame may be transmitted to STA2. A transmitter address (TA) of the modified MU-RTS frame may be configured as a MAC address of STA1 or a value based on the MAC address of STA1. A receiver address (RA) of the modified MU-RTS frame may be configured as a MAC address of STA2 and a value based on the MAC address of STA2. In addition, in a user info field included in the modified MU-RTS frame, an AID12 subfield value may indicate STA2. That is, in the user info field included in the modified MU-RTS frame, the AID12 subfield value may indicate 12 LSBs of an AID of the STA2. The modified MU-RTS frame may include information on duration of the shared TXOP.

According to an embodiment, STA2 may transmit a CTS frame as a response to the modified MU-RTS frame. In addition, STA2 may transmit a frame after transmitting the CTS frame. The frame transmitted after STA2 transmits the CTS frame may not be a CTS frame. According to another embodiment, STA2 may not transmit the CTS frame as a response to the modified MU-RTS frame. In this case, STA2 may transmit a frame other than the CTS frame after the modified MU-RTS frame is transmitted. In addition, according to an embodiment, the frame other than the CTS frame, transmitted after the STA2 transmits the modified MU-RTS frame, may be a frame transmitted to STA1. According to another embodiment, the frame other than the CTS frame, transmitted after STA2 transmits the modified MU-RTS frame, may be a frame transmitted to STA 3.

For example, the AP may transmit a trigger frame to a non-AP STA (or an STA) to configure a TXOP of an AP. In this case, when the AP attempts to share a part or entirety of the TXOP configured by the AP, to the non-AP STA having transmitted the trigger frame, the AP may configure a specific field (e.g., a GI and HE-LTF type subfield) of the trigger frame with a preconfigured value and perform transmission. In this case, the specific field may be referred to as a GI and HE-LTF type/trigger TXOP sharing mode subfield. Specifically, when the AP does not share the TXOP configured by the AP, the GI and HE-LTF type/triggered TXOP sharing mode subfield may be configured as "0" and construed as a GI and HE-LTF type subfield. However, when the AP does not share the TXOP configured by the AP, the GI and HE-LTF type/triggered TXOP sharing mode subfield may be configured as a value of "1" or "2", and construed as a triggered TXOP sharing mode subfield. When a value of the GI and HE-LTF type/triggered TXOP sharing mode subfield is "1" or "2", the corresponding trigger frame may be referred to as a modified MU-RTS frame or an MU-RTS TXS trigger frame. When the AP shares a part or entirety of the TXOP configured by the AP, the GI and HE-LTF type/triggered TXOP sharing mode subfield of the trigger frame for the TXOP sharing indicates a TXOP sharing mode. For example, the GI and HE-LTF type/triggered TXOP sharing mode subfield indicates whether the TXOP sharing is performed only in transmission or reception with the AP which has configured the TXOP or the TXOP sharing is performed in transmission or reception with not only the AP but also a third STA (or another STA). That is, when a value of the GI and HE-LTF type/triggered TXOP sharing mode subfield is "1", the STA may transmit the PPDU only to the AP during the shared TXOP. However, when a value of the GI and HE-LTF type/triggered TXOP sharing mode subfield is "2", the STA may transmit the PPDU to not only the AP but also another STA during the shared TXOP. That is, when a value of the GI and HE-LTF type/triggered TXOP sharing mode subfield is "2", the STA may perform P2P communication during the shared TXOP.

Table 1 below shows an example of whether a TXOP is shared or a mode of the TXOP according to a value of a GI and HE-LTF type/triggered TXOP sharing mode subfield.

TABLE 1

| GI and HE-LTF type/triggered TXOP sharing mode subfield value | Description |
| --- | --- |
| 0 | MU-RTS trigger frame not starting MU-RTS TXOP sharing procedure |
| 1 | MU-RTS frame starting TXOP sharing procedure in which scheduled STA can transmit PPDU to addressed AP only |
| 2 | MU-RTS trigger frame starting TXOP sharing procedure in which scheduled STA can transmit PPDU to addressed AP or addressed to another STA |
| 3 | Reserved |

Figure 20:
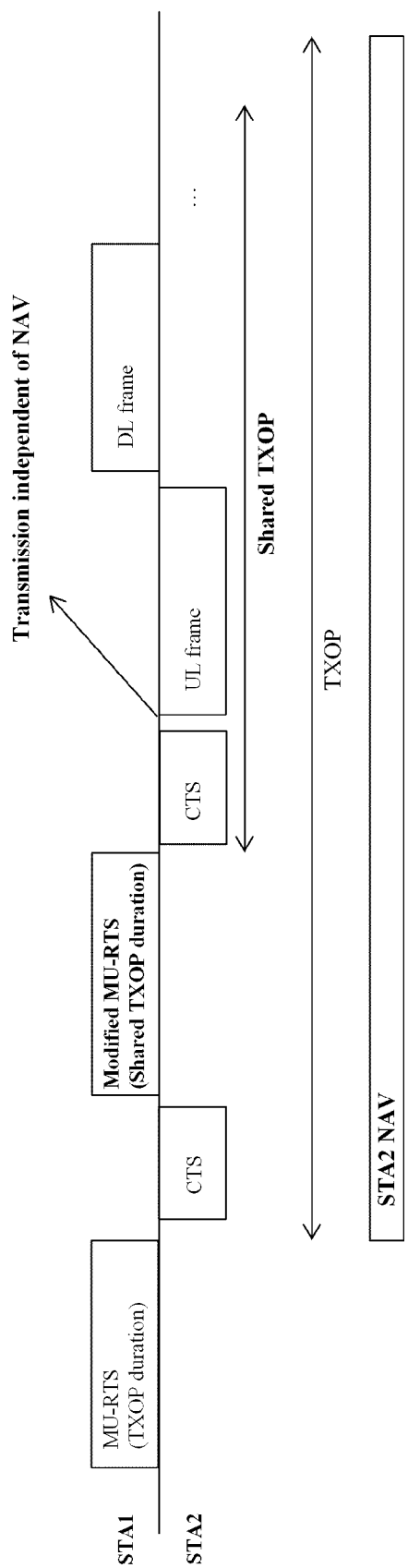
FIG. 20 illustrates a method related to TXOP sharing and NAV setup according to an embodiment of the present invention.

FIG. 20 illustrates a method related to TXOP sharing and NAV setup according to an embodiment of the present invention.

An embodiment of FIG. 20 may be an embodiment in which a problem occurring due to difficulty in performing the operation described in FIG. 19, and a method for resolving the problem are described. The details described in FIG. 19 may be omitted.

According to an embodiment of the present invention, an STA may configure a network allocation vector (NAV) based on duration information included in a received frame or a received PPDU. Whether a result of virtual carrier sensing (CS) indicates an idle state or a busy state may be determined based on whether the NAV has been configured. When a NAV value is 0, the result of virtual CS indicates an idle state. When the NAV value is greater than 0, the result of virtual CS indicates a busy state. Physical CS may correspond to clear channel assessment (CCA). When at least one of virtual CS and physical CS indicates a busy state, a result of the CS may indicate a busy state. When both virtual CS and physical CS indicate an idle state, a result of the CS may indicate an idle state. In addition, there may be a case where an STA includes multiple NAVs. For example, the STA may include an intra-BSS NAV and a basic NAV. The intra-BSS NAV may be an NAV configured by an intra-BSS frame or an intra-BSS PPDU. A regular NAV may be an NAV configured by the inter-BSS frame, the inter-BSS PPDU, or a frame or PPDU which cannot be determined as either the intra-BSS frame or PPDU or the inter-BSS frame or PPDU. In addition, when at least one of the intra-BSS NAV and the basic NAV has a value greater than 0, virtual CS may indicate a busy state. Alternatively, when at least one of the intra-BSS NAV and the basic NAV has a value greater than 0, the NAV may have a value greater than 0. When values of both the intra-BSS NAV and the basic NAV are 0, virtual CS may indicate an idle state. Alternatively, when values of both the intra-BSS NAV and the basic NAV are 0, the value of the NAV may be 0.

For an STA, the intra-BSS frame or the intra-BSS PPDU may be a frame or a PPDU which is determined as being transmitted from the same BSS as that of the STA. For an STA, the inter-BSS frame or the inter-BSS PPDU may be a frame or a PPDU which is determined as being transmitted from a different BSS from that of the STA. In addition, determining whether the transmission is performed from the same BSS or different BSS may be made based on a BSS color filed included in a preamble of the PPDU, an address field included in a MAC header, and the like. For example, when the BSS color field or the address field is a value corresponding to the same BSS, the frame or the PPDU may be determined as the intra-BSS frame or the intra-BSS PPDU. In addition, when the BSS color filed or the address field does not include a value corresponding to the same BSS, the frame or the PPDU may be determined as the inter-BSS frame or the inter-BSS PPDU. The address field may include an RA field, a TA field, a BSSID field, and the like.

According to an embodiment, an STA may configure a NAV based on a received frame when a resource allocation (RA) field of the received frame is not a MAC address of the STA itself. Alternatively, the STA may configure the NAV based on a received trigger frame. More specifically, the STA may configure the NAV based on a trigger frame corresponding to a received intra-BSS frame. In this case, the NAV may be an intra-BSS NAV. In this case, the NAV may be configured regardless of whether the trigger frame triggers the STA. Alternatively, when the received frame or the received PPDU does not indicate an immediate response from the STA, the STA may configure the NAV.

According to an embodiment of the present invention, when CS indicates a busy state, the STA cannot transmit a frame or a PPDU.

According to an embodiment of the present invention, when the NAV is configured with a value greater than 0, the STA cannot transmit a frame or a PPDU. More specifically, in a case where the NAV is configured with a value greater than 0, when a preconfigured condition is not satisfied, the STA cannot transmit a frame or a PPDU.

According to an embodiment, when the received frame is addressed to the STA and an immediate response is required, the STA performs transmission regardless of the NAV (or without considering the NAV). More specifically, the received frame may be neither an RTS frame nor a trigger frame. That is, even though the NAV is configured with a value greater than 0, the STA may perform transmission regardless of the NAV when the received frame is addressed to the STA and an immediate response is required. In addition, a case where a frame is addressed to the STA may include a case where an RA field of the frame is configured as an address of the STA. Alternatively, a case where a frame is addressed to the STA may include a case where the frame includes an identifier corresponding to the STA. The identifier may include a MAC address, an association ID (AID), an ID based on the MAC address, an ID based on the AID, etc.

According to another embodiment, when the received frame is transmitted from a TXOP holder, the STA may transmit a response to the frame, regardless of the NAV. In this case, the NAV may be a NAV configured by the frame or the PPDU transmitted by the TXOP holder. Alternatively, the NAV may be an intra-BSS NAV. In addition, the received frame may be an RTS frame. The transmission of the frame from the TXOP holder may be determined based on a TA field included in the frame. The STA may store a TXOP holder address. When an STA has received an RTS frame transmitted by the TXOP holder and the RTS frame is addressed to the STA, the STA may response to the RTS frame, without considering the NAV. In this case, as a response to the RTS frame, a CTS frame may be transmitted.

According to another embodiment, when receiving a trigger frame, the STA may transmit a response to the frame, regardless of the NAV. In this case, the NAV may be limited to the intra-BSS NAV. Accordingly, in a case where the NAV is configured by the same BSS STA or the same BSS AP, when a response is indicated by a trigger frame, the STA may transmit the response thereto, regardless of the NAV. When the STA has received a trigger frame, the STA may determine whether to transmit a response to the trigger frame, in consideration of the intra-BSS NAV and without considering the basic NAV. In addition, when the STA has received a trigger frame, the STA may determine whether to transmit a response to the trigger frame, based on a result of CS. For example, when the trigger frame may include signaling indicating whether or not to determine, based on the result of CS, whether to transmit a response when the trigger frame is received. For example, the signaling may be the CS required subfield indicated in FIG. 16. When the CS required subfield indicates that whether to transmit a response is determined based on the result of CS, the STA may respond to the trigger frame when virtual CS and physical CS indicate an idle state, and may not response to the trigger frame when virtual CS or physical CS indicates a busy state. In this case, for the virtual CS, the intra-BSS NAV may not be considered, and the basic NAV may be considered. In addition, when the CS required subfield indicates responding that is not based on the result of CS, the STA may response to the trigger frame without identifying the result of CS.

In an embodiment of FIG. 19, the STA having received the modified MU-RTS frame may not be able to transmit a frame other than the CTS frame during the shared TXOP since the NAV is configured. A further description is made in FIG. 20.

In relation to FIG. 20, the details described in FIG. 19 may be omitted. Referring to FIG. 20, there may be STA1 and STA2, and STA1 and STA2 may be associated with each other. In addition, STA1 may be an AP. STA2 may be a non-AP STA. STA1 may transmit an MU-RTS frame. In addition, STA2 may transmit a CTS frame as a response to the MU-RTS frame. In this case, the transmission of the CTS frame by STA2 may be because a result of physical CS of STA2 indicates an idle state and a basic NA is not configured. Alternatively, the transmission of the CTS frame by the STA2 may be because the STA2 has received a frame which is addressed to STA2 itself and requires an immediate response. In this case, even when exchanging of other frames other than exchange of the MU-RTS frame and the CTS frame occurs, STA2 may transmit a responding frame since the frame is addressed to STA2 based on the frame received from STA1 and an immediate response is required. In addition, ST2 may configure a NAV based on an MU-RTS frame or a frame other than the MU-RTS frame transmitted by STA1. In this case, the NAV may be an intra-BSS NAV.

In addition, STA1 may perform TXOP sharing to STA2. That is, STA1 may transmit a modified MU-RTS frame to STA2. In this case, as described above, STA2 may: 1) transmit a CTS frame by using the shared TXOP, and then transmit another frame; or 2) transmit another frame without transmitting the CTS frame. However, in this case, since the NAV is configured, it may be difficult for STA2 to transmit the frame. For example, the NAV may be configured for STA2 by a frame transmitted by STA1 to acquire a TXOP before allocating a shared TXOP. That is, the NAV may be configured since STA2 receives a frame transmitted before STA1 transmits a modified MU-RTS frame. Alternatively, The NAV may be configured since STA2 receives a frame transmitted from another STA during the same TXOP before STA2 receives a modified MU-RTS frame addressed to STA2 itself. Alternatively, the NAV may be configured for STA2 on the basis the modified MU-RTS frame addressed to STA2 itself. That is, the NAV may be configured since STA2 at least receives the modified MU-RTS frame while using the shared TXOP. Accordingly, it may be difficult for STA2 to transmit the frame by utilizing the shared TXOP.

Therefore, according to an embodiment of the present invention, the STA having received the shared TXOP may transmit a frame, regardless of the NAV. For example, the STA having received the shared TXOP may transmit a frame during the shared TXOP, regardless of the NAV. For example, even though the NAV is configured (even when the NAV has a value greater than 0), the STA having received the shared TXOP may transmit a frame. According to a more detailed embodiment, in this case, the NAV may be limited to an intra-BSS NAV. For example, the STA having received the shared TXOP may transmit a frame, regardless of the intra-BSS NAV. In addition, when a basic NAV is configured, the STA having received the shared TXOP cannot transmit the frame. Alternatively, the STA having received the shared TXOP may transmit the frame, regardless of the NAV configured by the frame or the PPDU transmitted by the associated AP. For example, when the NAV of the STA having received the shared TXOP is configured by a frame transmitted by an STA rather than the associated AP, the frame may not be transmitted during the shared TXOP.

That is, when the STA has received the shared TXOP, the STA may transmit the PPDU, regardless of the NAV configured in the shared TXOP. Specifically, when the AP has transmitted a trigger frame for TXOP sharing, the NAV may be configured by the AP within the shared TXOP. In this case, the STA having received the shared TXOP cannot transmit the PPDU because of the NAV configured within the shared TXOP. Accordingly, the STA having received the shared TXOP may transmit the PPDU by disregarding the NAV configured by the AP which has shared the TXOP within the shared TXOP.

The invention may be also applied by replacing the term "frame" in the present invention with the term "PPDU including a frame".

In addition, in this case, the frame transmitted by the STA having received the TXOP sharing, regardless of the NAV, may be a case of transmission after an SIFS from the previous PPDU.

According to another embodiment, in a case where a frame is transmitted after a PIFS from the previous PPDU when the STA having received the TXOP sharing transmits the frame, the NAV may be considered.

Referring to FIG. 20, the NAV may be configured for STA2 based on an MU-RTS frame or a modified MU-RTS frame. For example, an intra-BSS NAV may be configured. Alternatively, the NAV may be configured for STA2 based on an intra-BSS frame. Alternatively, the NAV may be configured for STA2 based on a frame transmitted by the associated AP. The NAV in the present embodiment may be used to collectively refer to such NAVs above. STA1 may perform TXOP sharing to STA2. STA2 may receive TXOP sharing through the modified MU-RTS frame. When transmitting a frame in the shared TXOP, STA2 may transmit a frame, regardless of the NAV. In this case, the transmitted frame according to an embodiment may be a frame transmitted immediately after a CTS frame transmitted immediately after the received modified MU-RTS frame. According to another embodiment, in this case, the transmitted frame may be a frame transmitted immediately after the received modified MU-RTS frame. In addition, according to an embodiment, the frame transmitted by STA2 may be a frame transmitted to the STA having transmitted the modified MU-RTS frame. That is, an RA field of the transmitted frame may be configured as a value of a TA field of the received modified MU-RTS frame. Alternatively, the RA field of the transmitted frame may be configured as a MAC address of the AP. According to another embodiment, the frame transmitted by STA2 may be a frame transmitted to STA3. In addition, when a frame is transmitted immediately after a time point, it may mean a case where a transmission starting time of a PPDD including the frame is after an SIFS from the end of the PPDU.

Figure 21:
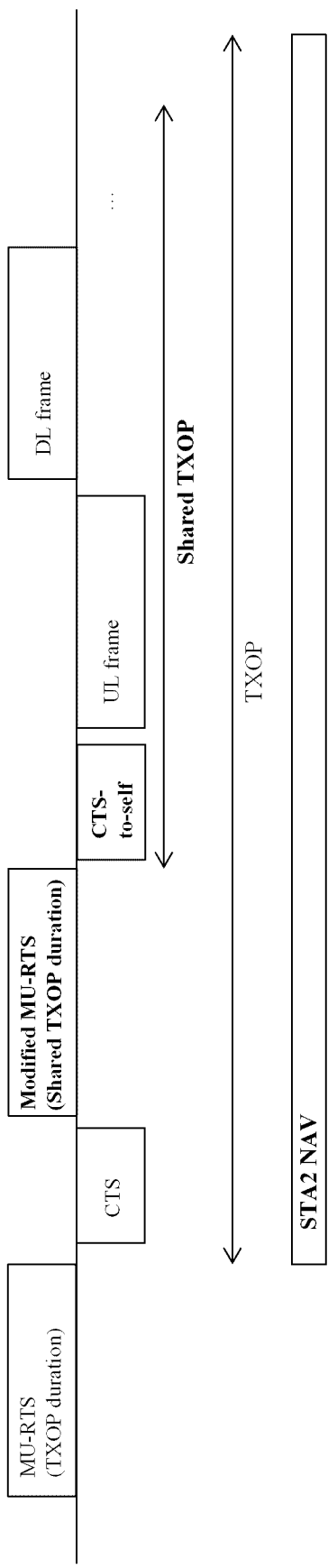
FIG. 21 illustrates transmission of a CTS frame and TXOP sharing according to an embodiment of the present invention.

FIG. 21 illustrates transmission of a CTS frame and TXOP sharing according to an embodiment of the present invention.

The embodiment of FIG. 21 may be a method for resolving the problem described in FIGS. 19 and 20.

According to an embodiment of the present invention, to solve a problem occurring due to difficulty in transmitting a frame during a shared TXOP in consideration of a NAV, a frame sequence may be continued so that condition for transmitting a response regardless of the NAV is satisfied.

According to an embodiment, an STA having received TXOP sharing may transmit a CTS-to-self frame as a response to a modified MU-RTS frame. The CTS-to-self frame may be a CTS frame having an RA field configured as a MAC address of the STA transmitting the CTS-to-self frame. In this case, the STA sharing the TXOP may determine that allocation of the shared TXOP has been successfully performed when receiving a frame including a MAC address of an STA receiving the TXOP sharing after transmitting the modified MU-RTS frame.

Referring to FIG. 21, STA2 may receive the modified MU-RTS frame from STA1. In addition, STA2 may transmit a CTS-to-self frame immediately after the modified MU- RTS frame. That is, STA2 may transmit a CTS frame by configuring an RA field of the CTS frame as the MAC address of the STA2. In this case, for the CTS-to-self frame transmitted by STA2, STA2 may consider that the frame is a frame which is addressed to STA2 itself and requires an immediate response. Alternatively, for the transmission of the CTS-to-self frame, STA2 may consider that a frame which is addressed to STA2 itself and requires an immediate response is received. Accordingly, STA2 may transmit a frame immediately after the CTS-to-self frame even though the NAV is configured.

According to an embodiment of the present invention, an RA field of a CTS frame transmitted as a response to an RTS frame or an MU-RTS frame may be configured with a TA field value of the RTS frame or the MU-RTS frame or a value obtained by configuring an individual/group bit in the TA field value as 0. However, for transmission of the CTS-to-self frame as described in FIG. 21, an additional method for configuring an RA field of a CTS frame may be defined. For example, the RA field of the CTS frame transmitted as a response to the modified MU-RTS frame may be configured as a MAC address of the STA transmitting the CTS frame.

According to an embodiment of the present invention, the STA having received TXOP sharing may perform recovery within a shared TXOP. That is, the STA having received the TXOP sharing may perform recovery when there is failure in the frame transmitted by the STA itself within the shared TXOP. For example, the STA having received the TXOP sharing may transmit a frame at a time point later by a PIFS when there is failure in the frame transmitted by the STA itself within the shared TXOP. According to an embodiment of the present invention, a TXOP holder may perform recovery. In addition, when the TXOP holder performs TXOP sharing, the STA having received the TXOP sharing may perform recovery. That is, when 1) an STA which is a TXOP responder, or 2) an STA which is neither a TXOP holder nor a TXOP responder corresponds to an STA having received the TXOP sharing, recovery may be performed. In addition, even in a case where a frame other than the first CTS frame after reception of the modified MU-RTS frame is transmitted, the STA having received the TXOP sharing may perform a recovery operation when there is failure in the frame other than the CTS frame. For example, the TXOP holder may not perform the recovery operation when there is failure in the first transmitted frame of the sequence, and in this case, the TXOP may fail to be acquired. However, the STA having received the TXOP sharing may perform the recovery operation even when there is failure the frame other than the first CTS frame transmitted in the shared TXOP.

Referring to FIG. 21, STA2 may transmit a UL frame indicated in FIG. 21, and if the transmission fails, a recovery operation may be performed. That is, when STA2 transmits the UL frame and fails to receive a DL frame indicated in FIG. 21, STA2 may re-transmit the frame. In this case, transmission of the retransmitted frame may start after a PIFS from the end of a PPDU including the UL frame in failure, indicated in FIG. 21. In addition, during the recovery, it may be identified whether a channel is idle. In addition, in the recovery operation performed by the STA having received the TXOP sharing, virtual CS is not considered and only a physical CS may be considered.

FIG. 22 illustrates an example of a trigger frame for TXOP sharing according to an embodiment of the present invention.

As described in FIG. 19, whether a frame is a modified MU-RTS frame may be based on the number of user info fields. However, the trigger frame defined in the 802.11ax standard may be designed without considering extension of a function in the standard thereafter. Accordingly, for example, the common info field indicated in FIG. 16B may have a signaling space that is insufficient to include the extended function. Accordingly, according to an embodiment of the present invention, the user info field including the preconfigured AID12 subfield value may have different format from that indicated in FIG. 16C. In addition, the user info field including the preconfigured AID12 subfield value may include information corresponding to all receivers or one or more receives of a trigger frame including the user info field. For example, the user info field including the preconfigured AID12 subfield value may include at least one of a PHY version ID, bandwidth extension, a bandwidth, spatial reuse, and U-SIG reserved bits. In addition, the preconfigured AID12 subfield value may be based on a value not allocated to an actual AID. The preconfigured AID12 subfield value may be 12 LSBs of the value not allocated to the actual AID. For example, the preconfigured AID12 subfield value may be 2007.

In addition, the extended function mentioned above may include, for example, a wider bandwidth. For example, the bandwidth may be extended from maximum 160 MHz to maximum 320 MHz. In addition, the extended function may include information for generating a U-SIG field.

Therefore, according to an embodiment of the present invention, to use the extended function within the TXOP or the modified MU-RTS frame, the modified MU-RTS frame may include the user info field including the preconfigured AID12 subfield value mentioned above.

According to an embodiment of the present invention, the modified MU-RTS frame may not include any user info field, or may include only the above-mentioned user info field including the preconfigured AID12 subfield, as a user info field. That is, when a received trigger frame does not include any user info field, or when the received trigger frame includes only the above-mentioned user info field including the preconfigured AID12 subfield, as a user info field, the trigger frame may be determined as a modified MU-RTS frame. Alternatively, when a received MU-RTS frame does not include any user info field, or when a received MU-RTS frame includes only the above-mentioned user info field including the preconfigured AID12 subfield, as a user info field, the MU-RTX frame may be determined as a modified MU-RTS frame. In this case, the STA receiving the TXOP sharing may be indicated through the RA field of the trigger frame.

Referring to FIG. 22, the modified MU-RTS frame may have a type subfield configured with an MU-RTS. In addition, the modified MU-RTS frame may have one user info field, and in this case, an AID12 subfield included in the user info field may be configured with a preconfigured value. In this case, the preconfigured value may be a value not allocated to the AID. In addition, the preconfigured value may be a different value from 12 LSBs of the AID of the STA having the RA field value of the modified MU-RTS frame with the MAC address. For example, the preconfigured value may be 2007. Alternatively, the modified MU-RTS frame may include no user info field. That is, in a case where the type of a trigger frame is configured as a MU-RTS frame, when the trigger frame includes any user info field or includes only a user info field including an AID12 subfield having a preconfigured value, the STA having received the trigger frame may determine that the trigger frame as the modified MU-RTS frame.

Figure 23:
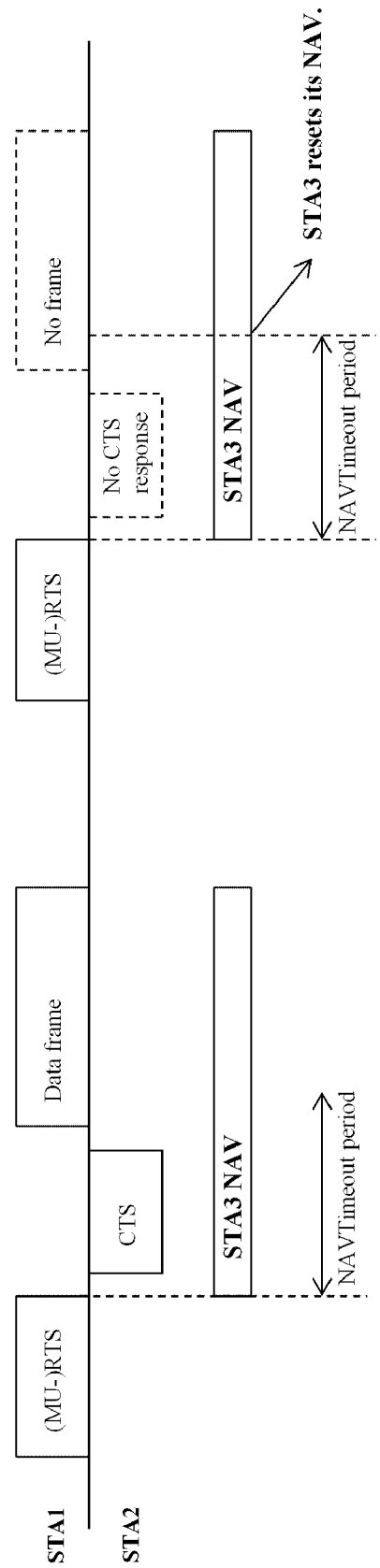
FIG. 23 illustrates a NAV timeout according to an embodiment of the present invention.

FIG. 23 illustrates a NAV timeout according to an embodiment of the present invention.

According to an embodiment of the present invention, an STA may reset a configured NAV. For example, when a NAV is configured based on an RTS frame or an MU-RTS frame, the NAV may be reset. More specifically, in a case where the NAV is configured based on the RTS frame or the MU-RTS frame, the NAV may be reset when PPDU reception has not been successfully started during a preconfigured time. Such an operation may be called a NAV timeout or NAVTimeout. The preconfigured time may be called a NAVTimeout period or a NAV timeout period. The NAVTimeout period may start when the PHY-RXEND.indication primitive corresponding to the RTS frame or the MU-RTS frame is received.

In an embodiment of the present invention, a case where the NAV is configured based on the RTS frame or the MU-RTS frame may mean a case where the most recent NAV updating has been performed on the basis the RTS frame or the MU-RTS frame. When duration information received from the RTS frame or the MU-RTS frame by the STA has a value greater than a current NAV value of the STA, the NAV may be configured or updated based on the RTS frame or the MU-RTS frame. The duration information may be acquired based on a duration/ID field included in a MAC header, or may be acquired based on a TXOP field or TXOP duration included in a preamble of a PPDU.

In addition, in an embodiment of the present invention, when the PPDU reception has been successfully started, the PHY-RXSTART.indication primitive may be received. Alternatively, when the PPDU reception has been successfully started, the PHY-RXSTART.indication primitive may be issued. The PHY-RXSTART.indication primitive may be transferred from PHY to MAC. For example, when the PHY has received a valid start of the PPDU, the PHY-RXSTART.indication primitive may be generated. In addition, reception of the valid start of the PPDU may mean reception of a valid PHY header. In addition, PHY-RXSTART.indication primitive may be generated after determination of a PPDU format. When the PHY-RXSTART.indication primitive is generated, the PHY may maintain a physical medium as a busy status during the length of the PPDU or the length indicated by the preamble of the PPDU. When the PHY-RXSTART.indication primitive is generated, the PHY may maintain the physical medium as the busy status during the length of the PPDU or the length indicated by the preamble of the PPDU even though the reception has failed in the middle of the PPDU. In addition, when the PPDU reception ends, PHY-RXEND.indication may be generated.

According to an embodiment, the above-mentioned NAV timeout period may be based on a response time to the RTS frame or the MU-RTS frame. That is, when a response to the RTS frame or the MU-RTS frame is a CTS frame, the NAV timeout period may be based on a CTS frame time. The CTS frame time may be indicated as CTS_Time. Alternatively, a response time to the RTS frame or the MU-RTS frame may be indicated as CTS-Time. In this case, the response time to the RTS frame or the MU-RTS frame may mean the length of the PPDU including the response.

According to an embodiment, the NAV timeout period may be based on at least one of the following items.

1) CTS_Time
2) aSIFSTime
3) aRxPHYStartDelay
4) aSlotTime

According to an embodiment, CTS_Time may be calculated based on a preconfigured rate. That is, CTS_Time may be the length of a CTS frame, calculated based on the preconfigured rate. Alternatively, that is, CTS_Time may be the length of a PPDU including a CTS frame, calculated based on the preconfigured rate. For example, the preconfigured rate may be 6 Mbps. For example, CTS_Time may be calculated based on a 6 Mbps data rate. Alternatively, the preconfigured rate may be a rate of the RTS frame or the MU-RTS frame for causing the configuration of the NAV. Alternatively, the preconfigured rate may be a rate indicated by the RTS frame or the MU-RTS frame which has caused the NAV to be configured.

According to an embodiment, aSIFSTime may be an SIFS length. For example, aSIFSTime may be 10 us in a case of a 2.4 GHz band operation. For example, aSIFSTime may be 16 us in a case of a 5 GHz band or a 6 GHz band operation.

According to an embodiment, aRxPHYStartDelay may be a delay taken until a receiver generates the PHY-RXSTART.indication primitive after the start of the PPDU. For example, aRxPHYStartDelay may be a time taken until a PPDU format is determined from the start of the PPDU. For example, aRxPHYStartDelay may vary according to the PPDU format. aRxPHYStartDelay may be 20 us for a non-HT PPDU. In addition, aRxPHYStartDelay may be 28 us for an HT PPDU having an HT-mixed format. In addition, aRxPHYStartDelay may be 24 us for an HT PPDU having an HT-greenfield format. In addition, aRxPHYStartDelay may be (36+4*(the maximum possible value for N_VHT-LTF supported)+4) us for a VHT PPDU. N_VHT-LTF may indicate the number of VHT-LTFs. In addition, aRxPHYStartDelay may be 32 us for a HE SU PPDU or a HE TB PPDU. In addition, aRxPHYStartDelay may be 40 us for a HE ER SU PPDU. In addition, aRxPHYStartDelay may be (32+4*N_HE-SIG-B) us for a HE MU PPDU. N_HE-SIG-B may be the number of OFDM symbols of a HE-SIG-B field. In addition, aRxPHYStartDelay may be 32 us for an EHT MU PPDU or an EHT TB PPDU.

According to an embodiment, a NAV timeout period may be ((2*aSIFSTime)+(CTS_Time)+aRxPHYStartDelay+(2*aSlotTime)).

According to an embodiment of the present invention, an RTS frame may be a frame indicating a CTS frame. Alternatively, the RTS frame may be a frame indicating a CTS frame from a single STA. The RTS frame may include a frame control field, a duration field, an RA field, a TA field, and an FCS field. The duration field may include information on a time for configuring a NAV by STAs receiving the duration field. In addition, the RA field may include an address of an intended immediate recipient. For example, when the RA field included in the RTS frame received by the STA is an address of the STA, responding to the RTS frame with a CTS frame is possible. In addition, whether a frame is an RTS frame may be determined based on a frame control field included in the frame. For example, whether a frame is an RTS frame may be determined based on a subtype subfield and a type subfield included in a frame control field included in the frame. For example, when the type subfield is 01(B3 B2) and the subtype subfield is 1011(B7 B6 B5 B4), it may be indicated that a frame including the type subfield and the subtype field is an RTS frame. For example, the RTS frame may be a control frame.

The CTS frame may include a frame control field, a duration field, an RA field, and an FCS field. The duration field may include information on a time for configuring a NAV by STAs receiving the duration field. For example, when the type subfield is 01(B3 B2) and the subtype subfield is 1011(B7 B6 B5 B4), it may be indicated that a frame including the type subfield and the subtype field is a CTS frame. For example, the CTS frame may be a control frame.

Referring to the first sequence in FIG. 23, there may be STA1, STA2, and STA3. In addition, STA1 may transmit an RTS frame or an MU-RTS frame to STA2. For example, when an RA field of the RTS frame or the MU-RTS frame is configured as an address of STA2, the RTS frame or the MU-RTS frame may be transmitted to STA2. Alternatively, when a user info field including the MU-RTS field indicates STA2, the MU-RTS frame may be transmitted to STA2. When STA2 has successfully received the RTS frame or the MU-RTS frame, responding with a CTS frame is possible. In this case, STA2 may make a response based on a carrier sensing result. In addition, when STA3 receives the RTS frame or the MU-RTS frame, STA3 may configure a NAV based on duration information included in the RTS frame or the MU-RTS frame or duration information included in a PPDU including the RTS frame or the MU-RTS frame. In addition, when STA1 has successfully received the CTS frame transmitted by STA2, STA1 may transmit the frame to STA2. In addition, after the NAV is configured, STA3 may have received the CTS frame transmitted by STA2 or the frame transmitted to STA2 by STA1. In this case, STA3 may receive the PHY-RXSTART.indication primitive during the NAVTimeout period. Accordingly, the NAV configured by STA3 may not be reset.

Referring to the second sequence in FIG. 23, there may be STA1, STA2, and STA3. In addition, STA1 may transmit an RTS frame or an MU-RTS frame to STA2. When STA2 has failed to successfully receive the RTS frame or the MU-RTS frame, responding to the CTS frame may not be performed. Alternatively, even though STA2 has successfully received the RTS frame or the MU-RTS frame, responding with the CTS frame may not be performed based on a carrier sensing result. In this case, the frame sequence transmitted from STA1 to STA2 may not be continued.

In addition, when STA3 receives the RTS frame or the MU-RTS frame, STA3 may configure a NAV based on duration information included in the RTS frame or the MU-RTS frame or duration information included in a PPDU including the RTS frame or the MU-RTS frame. In addition, after STA3 configures a NAV, STA3 cannot receive the CTS frame transmitted by STA2 or the frame transmitted to STA2 by STA1. In this case, STA3 may have failed to receive the PHY-RXSTART.indication primitive during the NAVTimeout period. Accordingly, the NAV configured by STA3 may be reset. Through this, even though the sequence is not continued, a problem that STA3 maintains a NAV and fails to perform channel access can be solved.

Figure 24:
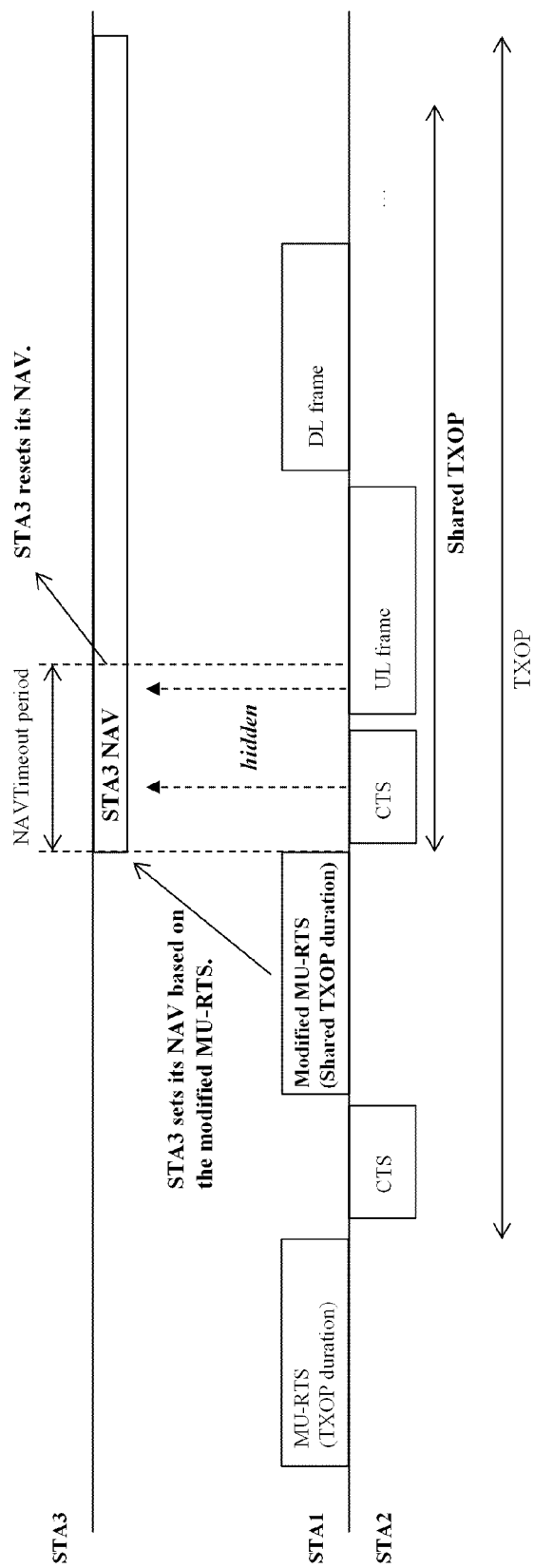
FIG. 24 illustrates a NAV time out and TXOP sharing according to an embodiment of the present invention.

FIG. 24 illustrates a NAV time out and TXOP sharing according to an embodiment of the present invention.

Referring to FIG. 24, as described above, STA1 may perform TXOP sharing with STA2. STA1 may be an STA sharing a TXOP, and STA2 may be an STA receiving the shared TXOP. STA1 may transmit the first frame of a sequence to STA2. Referring to FIG. 24, STA1 may transmit an MU-RTS frame corresponding to the first frame of the sequence to STA2. In addition, a CTS frame corresponding to a response to the MU-RTS frame may be transmitted.

For example, the CTS frame may be transmitted from STAs including STA2. STA1 may acquire the TXOP. In addition, STA3 may have failed to successfully receive the CTS frame and the MU-RTS frame. STA1 may transmit a modified MU-RTS frame to STA2. That is, STA1 may perform TXOP sharing with STA2. In addition, STA3 may successfully receive the modified MU-RTS frame. Accordingly, STA3 may configure a NAV based on the modified MU-RTS frame. In this case, STA3 may configure the NAV based on the MU-RTS frame. In addition, according to the above-described TXOP sharing sequence, for the modified MU-RTS frame, 1) STA2 may transmit a CTS frame, and transmit a frame immediately after the CTS frame is transmitted. Alternatively, for the modified MU-RTS frame, 2) STA2 may not transmit the CTS frame and transmit the frame. In addition, STA3 may fail to receive a frame or a PPDU from STA2. For example, STA2 may be present in a location hidden from STA2. For example, power transmitted by STA2 may be insufficient to be received by STA3. In this case, STA3 may fail to receive a PPDU during a NAV timeout period. This is because the NAV timeout period is determined based on CTS_Time. That is, when STA2 transmits a frame immediately after transmission of the CTS frame, the NAVTimeout period may end while the frame is transmitted to STA3. Alternatively, when STA2 transmits a frame without CTS frame transmission, there is high possibility that the length of the frame is longer than that of the CTS frame, and thus the NAVTimeout period may end while the frame is transmitted to STA3. Accordingly, STA3 may reset the NAV. When STA3 resets the NAV, the sequence during the TXOP shared through channel access performed by STA3 may be intervened.

Figure 25:
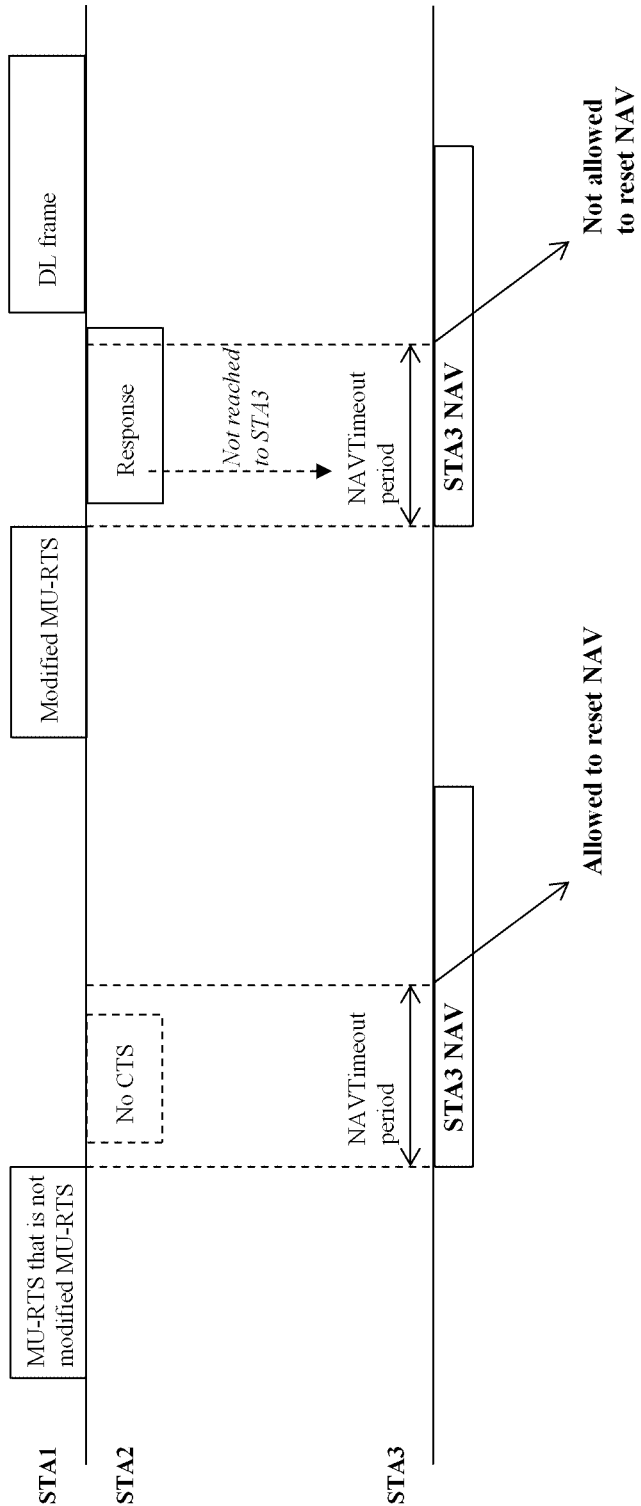
FIG. 25 illustrates a NAV timeout and TXOP sharing according to another embodiment of the present invention.

FIG. 25 illustrates a NAV timeout and TXOP sharing according to another embodiment of the present invention.

Referring to FIG. 25, when a TXOP is shared by an AP, an STA (a third STA) other than an STA to which the TXOP is shared by the AP may not reset the shared TXOP even when a CTS frame or another frame is not transmitted for a predetermined time from the STA to which the TXOP is shared. An embodiment of FIG. 25 may be provided to solve the problem described in FIGS. 23 and 24. In addition, the details described above may be omitted.

Specifically, a NAV timeout for resetting the TXOP may be allowed or not be allowed based on whether a trigger frame (for example, an MU-RTS frame) transmitted from the AP is an MU-RTS TXS trigger frame or a modified MU-RTS frame for TXOP sharing. That is, whether a NAV timeout for resetting a configured TXOP by an STA other than an STA to which the TXOP is configured may be determined according to whether the TXOP is a generally configured TXOP or a TXOP obtained by sharing the entirety or a part of the TXOP configured by the AP.

For example, when a NAV is configured based on an MU-RTS frame other than a frame (a modified MU-RTS frame or a MU-RTS TXS trigger frame) for sharing a part or entirety of the configured TXOP, a NAV timeout may be allowed. That is, in a case where the STA configures the NAV based on the MU-RTS frame, the MU-RTS frame is not a modified MU-RTS frame, and PPDU reception has failed to be successfully started during the NAVTimeout period, the NAV may be reset.

However, when the NAV is configured by the modified MU-RTS frame or the MU-RTS TXS trigger frame corresponding to the frame for sharing a part or entirety of the configured TXOP, the NAV timeout may not be allowed. That is, in a case where the STA configures the NAV based on the MU-RTS frame, when the corresponding MU-RTS frame is the MU-RTS TXS trigger frame or the modified MU-RTS frame for TXOP sharing, the STA may not be able to reset the NAV even though PPDU reception has failed to be successfully started during the NAVTimeout period.

That is, when a frame that is most recently received by the STA for NAV updating is the MU-RTS TXS trigger frame or the modified MU-RTS frame corresponding to a frame for TXOP sharing, the STA is not allowed to reset the NAV after NAVTimeout expires.

Whether the received MU-RTS frame is the modified MU-RTS frame may follow the description made above. For example, whether the frame is the modified MU-RTS frame may be determined based on a GI and HE-LTF type subfield included in the MU-RTS frame. For example, when a value of the GI and HE-LTF type subfield is 0, the MU-RTS frame including the GI and HE-LTF type subfield may not be the modified MU-RTS frame. In addition, when a value of the GI and HE-LTF type subfield is not 0, the MU-RTS frame including the GI and HE-LTF type subfield may be the modified MU-RTS frame. For example, when a value of the GI and HE-LTF type subfield value is 1 or 2, the MU-RTS frame including the GI and HE-LTF type subfield may be the modified MU-RTS frame.

According to an embodiment of the present invention, the problem described in FIG. 24 and a problem that a sequence of a shared TXOP is intervened through the NAV timeout operation after the STA configures the NAV based on the modified MU-RTS frame can be prevented.

In addition, such an embodiment may be performed by a terminal (a terminal following the EHT standard or later) after the 802.11 be standard, and may not be performed by a terminal (HE STA) following the 802.11ax standard. The HE STA may not perform such an embodiment, but may reduce possibility that the problem described through the embodiment may occur.

Referring to FIG. 25, there may be STA1, STA2, and STA3. In addition, STA1 may transmit an MU-RTS frame to STA2. For example, STA1 may transmit an MU-RTS frame other than a modified MU-RTS frame. However, STA2 corresponding to an intended receiver of the MU-RTS frame may fail to respond to the MU-RTS frame. Accordingly, STA2 may fail to transmit a CTS frame. In addition, STA3 may configure a NAV based on the MU-RTS frame. However, since STA2 has failed to transmit the CTS frame, STA3 may fail to successfully star PPDU reception during the NAVTimeout period. In this case, STA3 may reset the NAV based on the NAV timeout operation. This is because a frame for causing STA3 to configure a NAV corresponds to an MU-RTS frame other than a modified MU-RTS frame.

In addition, STA1 may transmit the modified MU-RTS frame. In FIG. 25, frames before the modified MU-RTS frame may be omitted. STA2 corresponding to an intended receiver of the modified MU-RTS frame may response to the modified MU-RTS frame. In addition, STA3 may configure a NAV based on the modified MU-RTS frame. However, a response transmitted to the modified MU-RTS frame by STA2 may not be received by STA3. For example, this may be because the response transmitted to STA3 by STA2 may not be transmitted with sufficiently large power. For example, this may be because STA3 and STA2 are spaced far apart from each other. In this case, STA3 may fail to successfully start PPDU reception during the NAVTimeout period. This may be because a frame is transmitted after STA2 transmits a CTS frame after the modified MU-RTS frame. Alternatively, this is may be because STA2 has transmitted a frame longer than the CTS frame after the modified MU-RTS frame. Alternatively, this may be because STA2 has transmitted a PPDU longer than a PPDU including the CTS frame after the modified MU-RTS frame. In this case, STA3 may not be able to perform a NAV reset operation based on the NAV timeout operation. This may be because a frame for causing STA3 to configure the NAV is an MU-RTS frame corresponding the modified MU-RTS frame.

Figure 26:
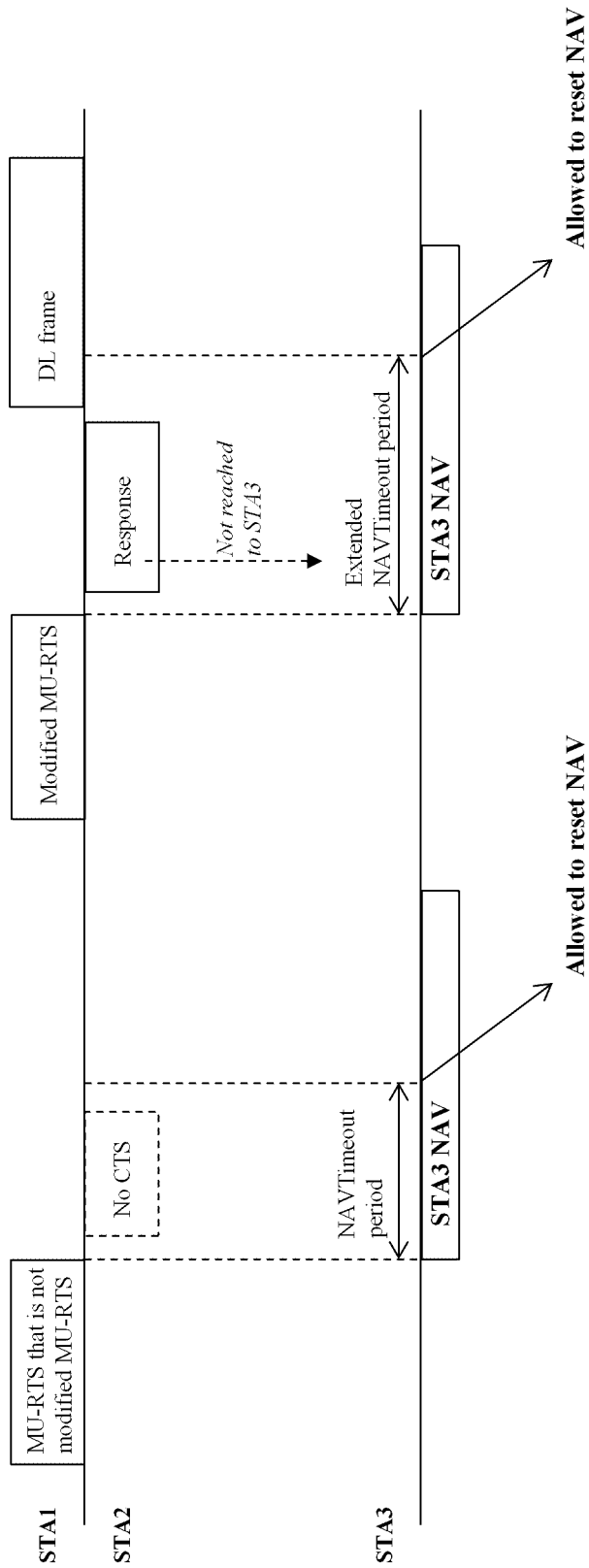
FIG. 26 illustrates a NAV timeout and TXOP sharing according to another embodiment of the present invention.

FIG. 26 illustrates a NAV timeout and TXOP sharing according to another embodiment.

An embodiment of FIG. 26 may be provided to solve the problem described in FIGS. 23 and 24. In addition, the details described above may be omitted.

According to an embodiment of the present invention, a NAV timeout period may be determined differently based on whether an MU-RTS frame corresponds to a modified MU-RTS frame. For example, CTS-Time may be determined differently based on whether the MU-RTS frame corresponds to the modified MU-RTS frame. According to an embodiment, a NAV timeout period when the MU-RTS frame corresponds to the modified MU-RTS frame may be longer than a NAV timeout period when the MU-RTS frame does not correspond to the modified MU-RTS frame. In an embodiment, the NAV timeout period when the MU-RTS frame corresponds to the modified MU-RTS frame may be referred to as an extended NAVTimeout period. The NAV-Timeout period described in FIG. 23 and the extended NAVTimeout period may start at the same time point. That is, the period may start when the PHY-RXEND.indication primitive corresponding to the MU-RTS frame is received. The NAVTimeout period described in FIG. 23 may be a time based on a CTS frame time. For example, the NAVTimeout period described in FIG. 23 may be a time based on a time taken to transmit a CTS frame at 6 Mbps.

According to an embodiment of the present invention, in a case where an STA has configured a NAV based on the modified MU-RTS frame, the NAV may be reset when PPDU reception has failed to be successfully started during the extended NAVTimeout period. In a case where an STA has configured a NAV based on the modified MU-RTS frame, the NAV may not be reset when PPDU reception has failed to be successfully started during the NAVTimeout period described in FIG. 23.

In addition, in a case where an STA has configured a NAV based on the MU-RTS frame rather than the modified MU-RTS frame, the NAV may be reset when PPDU reception has failed to be successfully started during the NAV-Timeout period described in FIG. 23.

According to an embodiment of the present invention, the extended NAVTimeout period may be determined based on length information included in the modified MU-RTS frame. For example, CTS-Time may be determined based on the length information included in the modified MU-RTS frame. Alternatively, the extended NAVTimeout period may be determined based on the length information included in the modified MU-RTS frame and a rate corresponding to the modified MU-RTS frame. For example, CTS_Time may be determined based on the length information included in the modified MU-RTS frame and the rate corresponding to the modified MU-RTS frame. For example, the length information included in the modified MU-RTS frame may be included in a UL length subfield indicated in FIG. 16. As another embodiment, the length information included in the modified MU-RTS frame may be included in a user info field indicated in FIG. 16. More specifically, the length information included in the modified MU-RTS frame may be included in a user info field indicating an STA receiving a shared TXOP among the user info field indicated in FIG. 16.

In addition, the STA having received the shared TXOP may transmit a PPDU based on the length information included in the modified MU-RTS frame. For example, the STA having received the shared TXOP may transmit the first PPDU of the shared TXOP based on the length information included in the modified MU-RTS frame. Alternatively, the STA having received the shared TXOP may transmit the first PPDU not including a CTS frame of the shared TXOP, based on the length information included in the modified MU-RTS frame. The first PPDU not including the CTS frame of the shared TXOP may be the first PPDU subsequent to a PPDU including the CTS frame.

Referring to FIG. 26, there may be STA1, STA2, and STA3. In addition, STA1 may transmit an MU-RTS frame to STA2. For example, STA1 may transmit the MU-RTS frame rather than a modified MU-RTS frame. However, STA2 corresponding to an intended receiver of the MU-RTS frame may fail to respond to the MU-RTS frame. Accordingly, STA2 may fail to transmit a CTS frame. In addition, STA3 may configure a NAV based on the MU-RTS frame. However, since STA2 has failed to transmit the CTS frame, STA3 may have failed to start PPDU reception during a NAVTimeout period. In this case, STA3 may reset the configured NAV based on a NAV timeout operation. This is because a frame for causing STA3 to configure the NAV corresponds to the MU-RTS frame rather than the modified MU-RTS frame, and thus the operation may be an operation based on the determined NAVTimeout period. That is, since the frame for causing STA3 to configure the NAV corresponds to the MU-RTS frame rather than the modified MU-RTS frame, the NAVTimeout period may be determined based on a time taken until the CTS frame is transmitted.

In addition, STA1 may transmit the modified MU-RTS. In FIG. 26, frames before the modified MU-RTS frame may have been omitted. STA2 corresponding to an intended receiver of the modified MU-RTS frame may response to the modified MU-RTS frame. In addition, STA3 may configure a NAV based on the modified MU-RTS frame. However, STA3 may have failed to receive a response to the modified MU-RTS frame, transmitted by STA2. For example, this may be because the response transmitted to STA3 by STA2 may not be transmitted with sufficiently large power. For example, this may be because STA3 and STA2 are spaced far apart from each other. In this case, STA3 may fail to successfully start PPDU reception during the NAVTimeout period described in FIG. 23. However, in this case, STA3 may successfully start PPDU reception during the extended NAVTimeout period. Accordingly, STA3 may not perform the NAV timeout operation. When the NAVTimeout period described in FIG. 23 has elapsed, STA3 may not perform a NAV reset operation, and may wait until the extended NAVTimeout period. This may be because the frame for causing STA3 to configure the NAV corresponds to the MU-RTS frame corresponding to the modified MU-RTS frame.

When STA2 having received the modified MU-RTS frame has failed to respond, STA1 may perform operation a recovery operation. Accordingly, PPDU reception may be successfully started before STA3 performs the NAV timeout operation.

In addition, STA2 having received the modified MU-RTS frame has failed to respond, a sequence of the shared TXOP may be cut. In this case, STA3 performs the NAV timeout operation so as to solve a problem that channel access cannot be performed due to configuration of an unnecessary NAV even when actual frame exchanging is not performed.

FIG. 20 describes a method for solving a problem occurring in the TXOP sharing due to difficulty in performing transmission due to a configured NAV by a scheduled STA having received a shared part or entirety of the TXOP configured by the AP. The method for solving a problem according to another embodiment is described through FIG. 27. Hereinafter, the scheduled STA and the STA having received the TXOP correspond to the same STA, and the terms may be interchangeably used.

Figure 27:
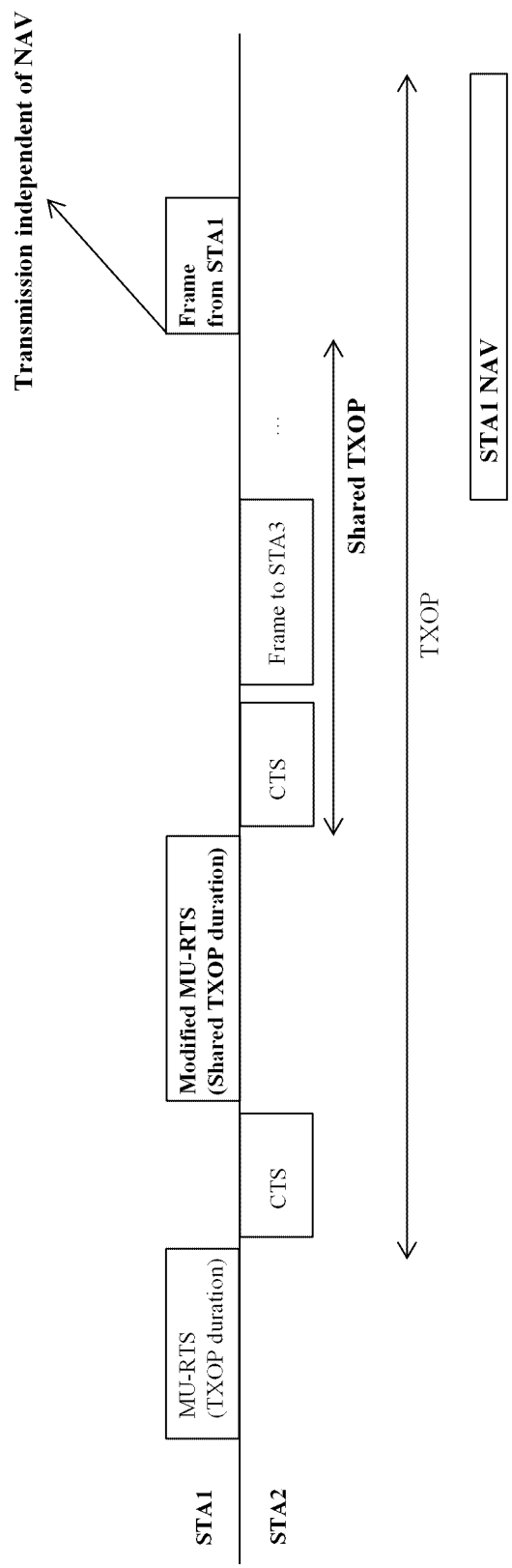
FIG. 27 illustrates applying a NAV by an STA and an AP when TXOP sharing is applied according to an embodiment of the present invention.

FIG. 27 illustrates applying a NAV by an STA and an AP when TXOP sharing is applied according to an embodiment of the present invention.

In the TXOP sharing, a scheduled STA may not configure a NAV. Specifically, in the TXOP sharing, the scheduled STA may not configure a NAV based on an MU-RTS TXS trigger frame or a modified MU-RTS frame corresponding to an MU-RTS frame for TXOP sharing configuration. The STA having received the MU-RTS frame for the TXOP sharing configuration may not configure a NAV based on the MU-RTS frame for the TXOP sharing configuration. The STA scheduled by the MU-RTS frame for the TXOP sharing configuration may not configure a NAV based on the MU-RTS frame for the TXOP sharing configuration. Accordingly, when the STA receives a trigger frame and the trigger frame schedules TXOP sharing to the STA, the STA may not configure a NAV based on the trigger frame. That is, the STA may configure the NAV based on the received trigger frame according to whether the trigger frame is a trigger frame for TXOP sharing. For example, when the received MU-RTS frame corresponds the MU-RTS TXS trigger frame or the modified MU-RTS frame for the TXOP sharing, the STA may not configure a NAV on the basis the received MU-RTS frame. However, when the received MU-RTS frame does not correspond to the MU-RTS TXS trigger frame or the modified MU-RTS frame for the TXOP sharing, the STA configures a NAV based on the received MU-RTS frame.

In addition, in the TXOP sharing, the scheduled STA may not configure a NAV based on the frame received within the shared TXOP.

In this case, a period within the shared TXOP may indicate a period lasting until the shared TXOP ends even when not all duration of the shared TXOP is utilized. In a case where the scheduled STA of the shared TXOP transmits a PPDU and the PPDU only includes a frame not requesting an immediate response, a TXOP ends when the STA transmits the PPDU. Accordingly, a period within the shared TXOP may indicate a period from a time point at which the TXOP sharing is configured to a time point at which the scheduled STA of the TXOP sharing transmits a PPDU only including a frame not requesting an immediate response. When the scheduled STA of the TXOP sharing signals the end of the shared TXOP, the shared TXOP may end. Accordingly, a period within the shared TXOP may indicate a period from a time point at which the TXOP sharing is configured to a time point at which the scheduled STA of the TXOP sharing signals the end of the shared TXOP. In addition, a period within the TXOP may indicate the elapse of shared TXOP duration from a time point at which the TXOP sharing is configured. Alternatively, when the STA having received the shared TXOP (or the STA having shared the TXOP) has transmitted or received signaling of the end of the shared TXOP, the shared TXOP may end. In this case, duration of the shared TXOP and duration of a TXOP (a TXOP acquired by a frame of an initial AP) used by an AP for sharing is identical, but the duration of the shared TXOP may be shorter than the duration of the TXOP. Accordingly, even though the shared TXOP ends, the TXOP may not end. That is, in a case the duration of the shared TXOP and the duration of the TXOP are identical, when the shared TXOP ends, the TXOP also ends. However, when the duration of the shared TXOP is shorter than the duration of the TXOP, the TXOP may be maintained even when the shared TXOP ends.

In another detailed embodiment, even though the shared TXOP ends before the shared TXOP period, the shared TXOP period may indicate the elapse of shared TXOP duration from a time point at which the TXOP sharing is configured.

As described above, in the TXOP sharing, the scheduled STA may transmit a frame, regardless of a NAV. That is, when a NAV (a NAV configured by an intra-BSS PPDU) is configured within a TXOP configured by an AP, the scheduled STA may transmit a PPDD within the shared TXOP, regardless of the configured NAV. In other words, the STA having received the shared TXOP may disregard a NAV configured by a frame transmitted by an STA having shared the TXOP within the shared TXOP, and transmit a frame. In this case, the shared TXOP may end before an interval configured by the MU-RTS frame. That is, the STA having received the shared TXOP before the interval configured by the MU-RTS may transmit signaling for requesting stopping of the TXOP sharing within the shared TXOP, so as to stop the TXOP sharing. For example, when a non-AP STA has received a shared part or entirety of the TXOP from the AP and there is no PPDU to be transmitted (or PPDU in pending), the non-AP STA may transmit signaling for terminating the TXOP sharing to the AP to terminate the shared TXOP, and stop the TXOP sharing. A time point at which the TXOP sharing is stopped may be one of a time point at which a non-AP STA transmits signaling for requesting stopping of the TXOP sharing and a time point at which a response frame to the corresponding signaling is received. In this case, the signaling for the TXOP sharing may or may not require an immediate response. In addition, in this case, the TXOP sharing stops earlier than an interval for which the TXOP configured by the MU-RTS frame is shared, and thus the non-AP STA may disregard the configured NAV only until the TXOP sharing ends.

In this case, the STA having configured the TXOP sharing may also transmit a frame, regardless of the NAV. In the embodiment of FIG. 27, a first STA (STA1) transmits an MU-RTS frame for a TXOP sharing configuration to a second STA (STA2). In this case, the first STA (STA1) may be an AP. The second STA (STA2) receives the MU-RTS frame for the TXOP sharing configuration, and transmits a CTS frame as a response to the MU-RTS frame for the TXOP sharing configuration. The second STA (STA2) performs frame exchanging within the shared TXOP. The second STA (STA1) may configure the NAV based on a frame transmitted by the second STA (STA2) or transmitted to the second STA (STA2). For example, the second STA (STA2) may perform frame exchanging with the third STA (STA3) within the shared TXOP. In this case, the first STA (STA1) may configure the NAV based on a frame transmitted to the second STA (STA2) by a third STA (STA3). In addition, the first STA (STA1) may configure the NAV based on a frame transmitted to the third STA (STA3) by the second STA (STA2). As such, when the first STA (STA1) has configured the NAV, it may be difficult to transmit a frame within a TXOP to which the shared TXOP is allocated. For example, when the first STA (STA1) attempts to transmit the frame after the shared TXOP ends, the frame may not be transmitted due to the NAV configured within the shared TXOP. Specifically, when the frame included in the PPDU transmitted within the shared TXOP does not correspond to a frame causing an immediate response from the first STA (STA1), the first STA (STA1) may not transmit the frame due to the configured NAV.

The STA having configured the TXOP sharing may transmit the frame within the TXOP acquired by the STA, regardless of the NAV. In another detailed embodiment, the STA having configured the TXOP sharing may transmit the frame within the TXOP acquired after the shared TXOP ends, regardless of the NAV. The STA having configured the TXOP sharing may be a TXOP holder or an STA having transmitted the MU-RTS frame for configuring the TXOP sharing.

In this case, as described above, the shared TXOP may end before an interval configured by the MU-RTS frame. That is, the STA having received the shared TXOP before an interval configured by the MU-RTS may transmit signaling for requesting stopping of the TXOP sharing within the shared TXOP, and stop the TXOP sharing. For example, when a non-AP STA has received a shared part or entirety of the TXOP from the AP and there is no PPDU to be transmitted (or PPDU in pending), the non-AP STA may transmit signaling for terminating the TXOP sharing to the AP to terminate the shared TXOP, and stop the TXOP sharing. A time point at which the TXOP sharing is stopped may be one of a time point at which a non-AP STA transmits signaling for requesting stopping of the TXOP sharing and a time point at which a response frame to the corresponding signaling is received. In this case, the signaling for the TXOP sharing may or may not require an immediate response. In addition, in this case, the TXOP sharing stops earlier than an interval for which the TXOP configured by the MU-RTS frame is shared, and thus the AP may disregard the NAV configured by the AP, based on the PPDU transmitted or received by the non-AP STA from the time point at which the TXOP sharing ends.

In the embodiments above, transmitting the frame by the STA having configured the TXOP sharing, regardless of the NAV, may indicate transmitting a frame based on a frame exchanged by the scheduled STA within the shared TXOP, regardless of the configured NAV. This is because frame exchanging of other STAs may be intervened when the STA having configured the TXOP sharing transmits a frame based on a frame not exchanged by the scheduled STA within the shared TXOP, regardless of the configured NAV. In addition, the STA may determine whether the frame corresponds to a frame exchanged by the scheduled STA within the shared TXOP, based on a MAC header of the frame. Specifically, the STA may determine whether the frame corresponds to a frame exchanged by the scheduled STA within the shared TXOP, based on an address field of the frame. The address field may include at least one of an RA field, a TA field, and a BSSID field. For example, when one of the address fields of the frame indicates a MAC address of the STA, the STA may determine the frame as a frame exchanged by the scheduled STA within the shared TXOP. In addition, the STA may determine whether the frame corresponds to a frame exchanged by the scheduled STA within the shared TXOP, based on a preamble of the PPDU including the frame. In addition, the STA may determine whether the frame corresponds to a frame exchanged by the scheduled STA within the shared TXOP, based on at least one of an STA ID and a BSS color included in a preamble of the PPDU including the frame. When the preamble of the PPDU includes a BBS color of a BSS to which the scheduled STA of the shared TXOP belongs, and the preamble of the PPDU includes an STA ID corresponding to the scheduled STA of the shared TXOP, the STA may determine the frame included in the PPDU as a frame exchanged by the scheduled STA. In this case, the STA ID may be a value configured based on an AID of the STA.

In another detailed embodiment, when transmitting the frame by the STA having configured the TXOP sharing, regardless of the NAV, only physical carrier sensing (CS), for example, CCA, may be used as CS. Accordingly, the STA may not perform virtual CS.

In the present specification, NAV setup may be interchangeably used with NAV updating. In addition, in the present specification, the NAV may include at least one an intra-BSS NAV and a basic NAV. In addition, unless the type of the NAV is not specially mentioned, the NAV may be referred to as an intra-BSS NAV. In addition, configuring a NAV by an STA on the basis a frame may include configuring a NAV based on a PPDU including a frame. Accordingly, in the present specification, not configuring a NAV by an STA based on a frame may include not configuring a NAV based on a PPDU including a frame.

An MU-RTS frame for configuring TXOP sharing may indicate a scheduled STA of a TXOP by using a MAC address, for example, an RA field or a user info field. Configuring a NAV based on duration information of a frame or a PPDU may indicate the most recently configured NAV based on duration information of a frame or a PPDU.

In another detailed embodiment, a TXOP of a PPDU including a frame or a duration/ID field of a frame transmitted within the shared TXOP may be configured based on the shared TXOP. Specifically, the TXOP of the PPDU including the frame or the duration/ID field of the frame transmitted within the shared TXOP may not be allowed to be configured exceeding the shared TXOP. Accordingly, a problem that the STA having configured the shared TXOP fails to transmit the frame even after the TXOP ends may be prevented.

That is, when the TXOP configured by the AP is shared to the STA through a trigger frame, duration information (for example, duration/ID field) included in the frame (for example, the PPDU) transmitted within the shared TXOP may be configured based on the shared TXOP. Specifically, the TXOP of the frame transmitted within the shared TXOP is not allowed to be configured exceeding the shared TXOP. Accordingly, the TXOP of the PPDU transmitted to the third STA for P2P communication or the AP having configured the TXOP within the shared TXOP needs to end earlier than or at the same time point as that of the shared TXOP. Accordingly, the end time point of duration indicated by duration information included in the PPDU may be earlier than or the same as the end time point of the shared TXOP. In other words, when a part or entirety of the TXOP configured by the AP is shared to a specific STA, the TXOP of the PPDU transmitted by the specific STA cannot exceed the shared TXOP and needs to be expired before the shared TXOP. Accordingly, the length (or the TXOP) of the PPDU transmitted to the third STA for P2P communication or the AP by the specific STA cannot be after the end time point of the shared TXOP and needs to be before then. In this case, the end time point of the length (or the TXOP) of the PPDU needs to be identical or earlier than the end time point of the shared TXOP, and thus a value indicated by duration information included in the PPDU may be configured based on the shared TXOP.

In another detailed embodiment, the STA having configured the shared TXOP may not configure the NAV based on a frame exchanged by the scheduled STA of the TXOP sharing.

The STA having configured the shared TXOP may not transmit a trigger frame within the shared TXOP. This is because a frame triggered by the trigger frame and exchanging of the frame of the scheduled STA may overlap when the STA having configured the shared TXOP transmits the trigger frame within the shared TXOP. In addition, when the STA having configured the shared TXOP transmits a trigger frame to the scheduled STA within the shared TXOP, the scheduled STA may need to transmit a response to the trigger frame. Accordingly, this may not be fit for the purpose of configuring the shared TXOP. In such embodiments, the trigger frame may include the MU-RTS frame for configuring the TXOP sharing. In such embodiments, after the shared TXOP ends, the STA having configured the shared TXOP may transmit the trigger frame.

In the embodiment described above, the trigger frame which cannot be transmitted by the STA having configured the shared TXOP may be a trigger frame remaining after excluding the trigger frame only for the scheduled STA of the TXOP sharing. Accordingly, the STA having configured the shared TXOP may transmit the trigger frame only for the scheduled STA of the TXOP sharing in the shared TXOP. For example, the STA having configured the shared TXOP may transmit the MU-RTS frame for configuring the TXOP sharing to extend the shared TXOP. In this case, the STA having received the MU-RTS frame for configuring the TXOP sharing may start frame exchanging without transmitting a CTS frame. Specifically, when frame exchanging with the STA having configured the TXOP sharing is allowed within the TXOP sharing, the STA having received the MU-RTS frame for configuring the TXOP sharing may start frame exchanging without transmitting the CTS frame.

In the present specification, an operation performed during the shared TXOP may be an operation in which the TXOP shared by the scheduled STA of the TXOP sharing is utilized. The operation performed during the shared TXOP may be transmitting a frame as a response to the MU-RTS frame for configuring the TXOP sharing by the scheduled STA of the TXOP sharing, or transmitting the frame within the shared TXOP by the scheduled STA of the TXOP sharing. In this case, a response frame for the MU-RTS frame for configuring the TXOP sharing may be a CTS frame.

Signaling for the TXOP sharing operation is described. The STA may signal whether to operate as the scheduled STA of the TXOP sharing. In this case, the STA may signal whether to operate as the scheduled STA of the TXOP sharing through an EHT capability element. In addition, the STA may transmit the signaling indicating whether to operate as the scheduled STA of the TXOP sharing, by using a (re)connection request frame or a probe request frame. The STA for configuring the TXOP sharing may only transmit the MU-RTS frame for configuring the TXOP sharing to the STA which has signaled that the STA may operate as the scheduled STA of the TXOP sharing. In addition, the STA for configuring the TXOP sharing may not transmit the MU-RTS frame for configuring the TXOP sharing to the STA which has signaled that the STA cannot operate as the scheduled STA of the TXOP sharing.

In addition, the MU-RTS frame may include information indicating whether the MU-RTS frame corresponds to the MU-RTS frame for configuring the TXOP sharing. In addition, when the MU-RTS frame corresponds to the MU-RTS frame for configuring the TXOP sharing, the MU-RTS frame may indicate a mode of the TXOP sharing. The mode of the TXOP sharing may indicate an STA to which the scheduled STA of the TXOP sharing may transmit the frame. For example, in a first mode, the scheduled STA of the TXOP sharing may transmit the frame only to the STA having configured the TXOP sharing. In addition, in a second mode, the scheduled STA of the TXOP sharing may transmit the frame to the STA having configured the TXOP sharing or may transmit a P2P frame. When a value of information indicating whether the MU-RTS frame is the MU-RTS frame for configuring the TXOP sharing is 1, it may indicate the first mode. In addition, when a value of information indicating whether the MU-RTS frame is the MU-RTS frame for configuring the TXOP sharing is 2, it may indicate the second mode. In addition, when a value of information indicating whether the MU-RTS frame is the MU-RTS frame for configuring the TXOP sharing is 0, it may indicate that the MU-RTS frame does not correspond to the MU-RTS frame for configuring the TXOP sharing.

In the embodiments above, a GI and HE-LTF type subfield may indicate whether the MU-RTS frame corresponds to the MU-RTS frame for configuring the TXOP sharing. When the MU-RTS frame corresponds to the MU-RTS frame for configuring the TXOP sharing, the GI and HE-LTF type subfield may indicate the mode of the TXOP sharing as described above. In this case, the GI and HE-LTF type subfield may be referred to as a TXOP sharing mode subfield. The TXOP sharing mode subfield may be a subfield including 21st bit (B20) to 22nd bit (B21) of the common info field in FIG. 16.

Figure 28:
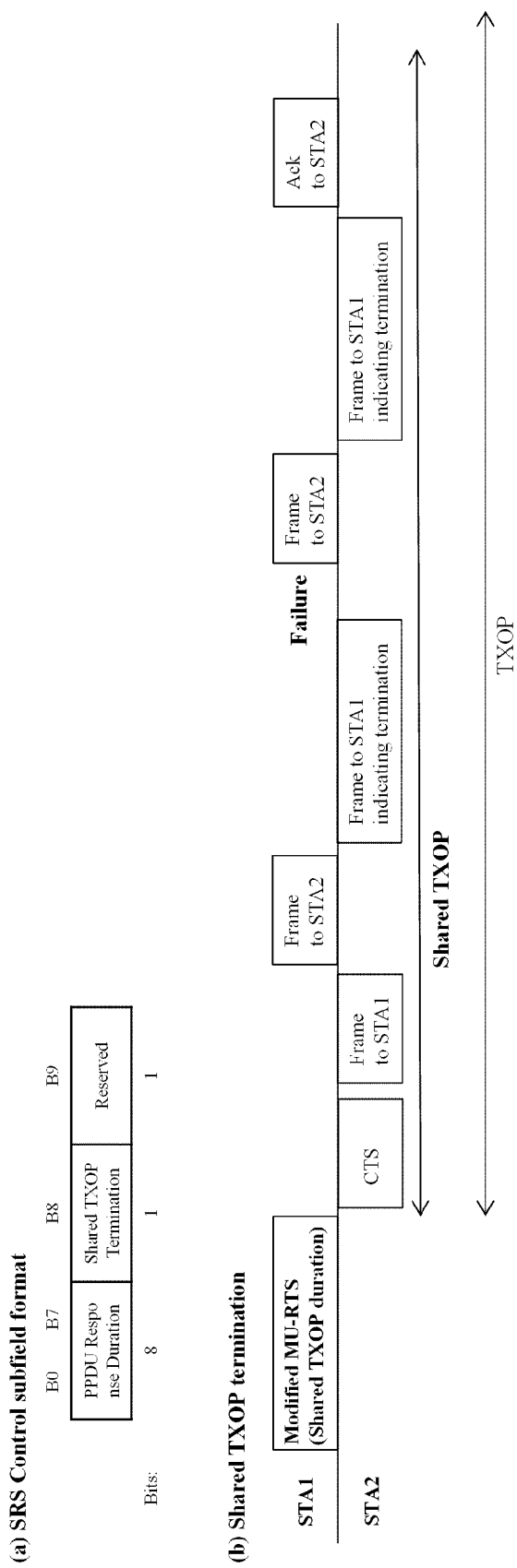
FIG. 28 illustrates termination of TXOP sharing by an STA according to an embodiment of the present invention.

A method for terminating TXOP sharing is described through FIG. 28.

FIG. 28 illustrates termination of TXOP sharing by an STA according to an embodiment of the present invention.

A scheduled STA of TXOP sharing may signal termination of the TXOP sharing. When an STA having configured the TXOP sharing receives signaling of the termination of the TXOP sharing, the STA having configured the TXOP sharing may be a TXOP holder. In addition, when the STA having configured the TXOP sharing receives signaling of the termination of the TXOP sharing, the STA having configured the TXOP sharing may transmit a frame or a PPDU. Specifically, when the STA having configured the TXOP sharing receives signaling of the termination of the TXOP sharing, the STA having configured the TXOP sharing may transmit the frame or the PPDU even within the shared TXOP. In addition, when the scheduled STA of the TXOP sharing signals the termination of the TXOP sharing, the scheduled STA of the TXOP sharing cannot transmit any frame or any PPDU within the remaining shared TXOP.

The scheduled STA of the TXOP sharing may signal the termination of the TXOP sharing by using an A-control subfield. Specifically, a single response scheduling (SRS) control subfield of the A-control subfield may signal the termination of the TXOP sharing. The STA having received the SRS control subfield may response to the frame including the SRS control subfield with a PPDU rather than a TB PPDU. In addition, the length of a response PPDU to the frame including the SRS control subfield may be determined based on the SRS control subfield. Specifically, the STA having received the SRS control subfield may configure the length of the response PPDU to the frame including the SRS control subfield, as the length indicated by the SRS control subfield.

FIG. 28(a) illustrates a format of an SRS control subfield. As described above, the SRS control subfield may include a field indicating the length of the PPDU corresponding to the response to a MAC frame including the SRS control subfield. In this case, a field may refer to a PPDU response duration field. The PPDU response duration field may indicate a 4 us unit time. The length of the PPDU indicated by the PPDU response duration field may be PPDU response duration field value×4 us. In addition, the PPDU response duration field may be an 8-bit field.

In addition, the STA may signal capability of the SRS control subfield. Specifically, the STA may signal whether the SRS control subfield may be received. In addition, the STA may signal whether to respond to the frame including the SRS control subfield. The STA may not be able to transmit the SRS control subfield to the STA having signaled that an operation for the SRS control subfield is not supported. The STA may transmit the SRS control subfield to the STA having signaled that an operation for the SRS control subfield is supported.

In addition, the SRS control field may include a field signaling the termination of the TXOP sharing. The field signaling the termination of the TXOP sharing may be referred to as a shared TXOP termination field. The shared TXOP termination field may be a 1-bit field. When a value of the shared TXOP termination field is 1, the shared TXOP termination field may indicate the TXOP sharing is terminated. When a value of the shared TXOP termination field is 0, the shared TXOP termination field may indicate the TXOP sharing is not terminated. When the STA has received a QoS data frame or a QoS null frame having the shared TXOP termination field value corresponding to 1, the STA may determine that the TXOP sharing is terminated.

In another detailed embodiment, a frame having a pre-designated configuration may signal the termination of the TXOP sharing. In this case, the frame having the pre-designated configuration may be a QoS null frame. Specifically, the frame having the pre-designated configuration may be a QoS null frame not including an A-control subfield. In addition, the frame having the pre-designated configuration may be a QoS null frame not including the SRS control subfield. The scheduled STA of the TXOP sharing may transmit the frame having the pre-designated configuration to signal the termination of the TXOP sharing. In addition, when the STA having configured the TXOP sharing receives the frame having the pre-designated configuration, the STA having configured the TXOP sharing may determine that the TXOP sharing is terminated.

Even though the scheduled STA of the TXOP sharing has transmitted signaling of the termination of the TXOP sharing, the STA having configured the TXOP sharing may not receive the signaling. In this case, the scheduled STA of the TXOP sharing may determine that the TXOP sharing is terminated, and may not transmit the frame. In addition, the STA having configured the TXOP sharing may determine that the TXOP sharing is not terminated, and may not transmit the frame.

In a detailed embodiment, when the scheduled STA of the TXOP sharing, signaled the termination of the TXOP sharing, receives a response to the signaling, the scheduled STA of the TXOP sharing may determine that the TXOP sharing is terminated. In this case, the scheduled STA of the TXOP sharing may determine that the TXOP sharing is terminated, and may not transmit the frame. The response to the signaling of the termination of the TXOP sharing may be an immediate response. In addition, the response to the signaling of the termination of the TXOP sharing may be an ACK. However, such an embodiment may be applied only when an ack policy of the signaling of the termination of the TXOP sharing is configured to require an immediate response. Specifically, when the ack policy of the signaling of the termination of the TXOP sharing requires an immediate response and the scheduled STA of the TXOP sharing, signaled the termination of the TXOP sharing, receives a response to the signaling, the scheduled STA of the TXOP sharing may determine that the TXOP sharing is terminated. When the ack policy of the signaling of the termination of the TXOP sharing requires no immediate response, for example, in case of No ACK, the scheduled STA of the TXOP sharing may determine that the TXOP sharing is terminated even though the scheduled STA of the TXOP sharing, signaled the termination of the TXOP sharing, does not receive a response to the signaling. In this case, when the scheduled STA of the TXOP sharing transmits the signaling of the termination of the TXOP sharing, the STA may determine that the TXOP sharing is terminated. In addition, when the signaling of the termination of the TXOP sharing has failed to be transmitted, an error recovery operation may be performed. Specifically, the scheduled STA of the TXOP sharing may perform the error recovery operation. In addition, the STA having configured the TXOP sharing may perform the error recovery operation.

In FIG. 28(b), a first STA (STA1) transmits an MU-RTS frame for configuring TXOP sharing to a second STA (STA2). In this case, the first STA (STA1) may be an AP. The second STA (STA2) receives the MU-RTS frame for configuring the TXOP sharing, and transmits a CTS frame as a response to the MU-RTS frame for configuring the TXOP sharing. The second STA (STA2) transmits signaling of termination (frame to STA1 indicating termination) of the TXOP sharing to the first STA (STA1) within a shared TXOP. The first STA (STA1) fails to receive the signaling of the termination (frame to STA1 indicating termination) of the TXOP sharing. In this case, the first STA (STA1) determines that the TXOP sharing is not terminated. As described above, the first STA (STA1) or the second STA (STA2) may perform an error recovery operation. After the error recovery operation, the second STA (STA2) transmits signaling of the terminal of the TXOP sharing (frame to STA1 indicating termination) to the first STA (STA1). The first STA (STA1) transmits an ACK (ack to STA2) to a response to the signaling of the termination (frame to STA1 indicating termination) of the TXOP sharing to the second STA (STA2). The second STA (STA2) having received the ACK (ack to STA2) determined that the TXOP sharing is terminated.

When the STA having configured the TXOP sharing has indicated the response even after the TXOP sharing is terminated, the scheduled STA of the TXOP sharing may transmit the frame.

As described above, the SRS control subfield may not be transmitted to the STA having signaled that an operation for the SRS control subfield is not supported. When the termination of the TXOP sharing is signaled through the SRS control subfield, the STA having signaled that the operation for the SRS control subfield is not supported may not be able to receive the signaling of the termination of the TXOP sharing. Accordingly, the scheduled STA of the TXOP sharing may also transmit the SRS control subfield signaling the termination of the TXOP sharing to the STA having signaled that the operation for the SRS control subfield is not supported. The SRS control subfield signaling the termination of the TXOP sharing may be an SRS control subfield having a TXOP termination subfield value corresponding to 1. The scheduled STA of the TXOP sharing cannot to transmit, to the STA having signaled that the operation for the SRS control subfield is not supported, the SRS subfield having a TXOP termination subfield value corresponding to 0. In addition, limitation that the SRS control subfield cannot be transmitted to the STA having signaled that the operation for the SRS control subfield is not supported may be applied only to a case where the SRS control subfield is transmitted outside the shared TXOP.

When the SRS control subfield signals the termination of the TXOP sharing, a PPDU response duration subfield may be configured as a reserved field. All bits of the reserved field may be configured as 0. When the SRS control subfield does not signal the termination of the TXOP sharing, the PPDU response duration subfield may indicate the length of the PPDU including the frame corresponding to a response to the frame including the SRS control subfield.

When the SRS control subfield signals the termination of the TXOP sharing, the STA having received the SRS control subfield may not transmit a response to the frame including the SRS control subfield. In another detailed embodiment, when the SRS control subfield signals the termination of the TXOP sharing, the STA having received the SRS control subfield may transmit a response to the frame including the SRS control subfield, regardless of information signaled by the SRS control field. In this case, the STA having received the SRS control subfield may transmit a response PPDU, regardless of the length of the response PPDU to the frame including the SRS control field, signaled by the SRS control subfield.

The STA having received the SRS control subfield within the shared TXOP may not transmit the response to the frame including the SRS control subfield. In another detailed embodiment, the STA having received the SRS control subfield within the shared TXOP may transmit the response to the frame including the SRS control subfield, regardless of the information signaled by the SRS control field. In this case, the STA having received the SRS control subfield may transmit a response PPDU, regardless of the length of the response PPDU to the frame including the SRS control subfield, signaled by the SRS control subfield.

Alternatively, the STA receiving the SRS control subfield within the shred TXOP may not respond based on duration information (a PPDU response duration subfield value) included in the SRS control subfield. For example, the STA receiving the SRS control subfield within the shared TXOP may respond, regardless of duration information (a PPDU response duration subfield value) included in the SRS control subfield.

According to an embodiment of the present invention, the modified MU-RTS frame may not be the first frame in the TXOP. For example, when a TXOP holder may not transmit the modified MU-RTS frame and may transmit another frame in order to acquire the TXOP. According to this, a NAV may be configured before an STA configures an NAV based on the modified MU-RTS frame. That is, the STA may configure a NAV based on a frame transmitted earlier than the modified MU-RTS frame in the TXOP. The NAV timeout operation described above may be performed when the NAV setup is performed based on the RTS frame or the MU-RTS frame, wherein transmission of a frame earlier than the modified MU-RTS frame in the TXOP is allowed, so that configuring the NAV based on the RTS frame or the MU-RTS frame occurs less. In addition, duration information included in the modified MU-RTS frame may not extend the TXOP.

Figure 29:
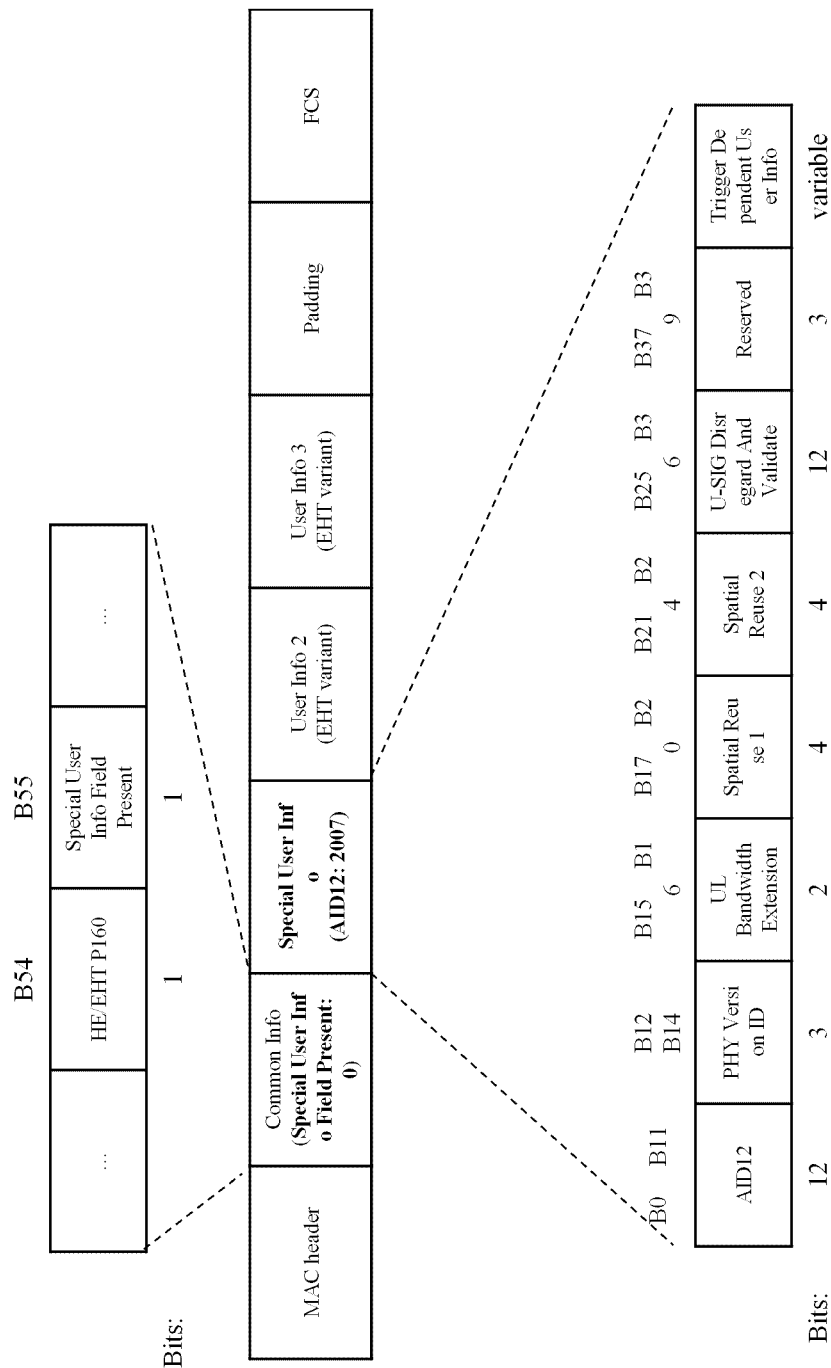
FIG. 29 illustrates a method for signaling a format of a TB PPDU responding to a trigger frame by using a common info field and a special user info field included in the trigger frame according to an embodiment of the present invention.

FIG. 29 illustrates a method for signaling a format of a TB PPDU responding to a trigger frame by using a common info field and a special user info field included in the trigger frame according to an embodiment of the present invention.

In an embodiment of the present invention, a station having received a trigger frame may determine a format of a TB PPDU based on a user info field included in the trigger frame. Specifically, a specific user info field included in the trigger frame may indicate a format of a TB PPDU to be transmitted as a response to the trigger frame. For convenience of description, in this case, the specific user info field is referred to as a special user info field.

An AID12 subfield of the special user info field may be configured with a pre-designated value. In this case, the pre-designated value may be 2007. In addition, the pre-designated value may be a value not allocated to an association ID (AID) by an AP. In addition, a format of the special user info field may be different from a format of a user info field rather than the special user info field. The format of the subfield included in the special user info field may be different from the format of the subfield included in the user info field rather than the special user info field. In this case, the format of the AID12 subfield included in the special user info field may be identical to the format of the AID12 subfield included in the user info field rather than the special user info field. Accordingly, the first 12 bits of the special user info field, i.e., a value of AID12, may be configured with a pre-designated value. Through this, a HE station may also parse the trigger frame including the special user info field without errors.

In addition, the trigger frame may include a subfield indicating whether the trigger frame includes the special user info field. For convenience of description, the subfield indicating whether the special user info field is included is referred to as a special user info field present field. Specifically, a common info field of the trigger frame may include the special user info field present subfield. In this case, the 56th bit of the common info field may be the special user info field present subfield. In a detailed embodiment, when a value of the special user info field present subfield is 1, the trigger frame may not include the special user info field. In addition, when a value of the special user info field present subfield is 0, the trigger frame may include the special user info field. This is because the 56th bit of the common info field of a legacy trigger frame is configured as 1 as default. The station receiving the trigger frame may determine whether the trigger frame includes the special user info field, based on the special user info field. When the value of the special user info field present subfield of the trigger frame received by the station is 1, the station may determine that the trigger frame does not include the special user info field. In addition, when the value of the special user info field present subfield of the trigger frame received by the station is 0, the station may determine that the trigger frame includes the special user info field. As described in the embodiments above, when the special user info field present subfield is included in the trigger frame, whether the special user info field is included in the trigger frame may be determined even though the station unassociated with the AP receives the trigger frame.

The trigger frame may include the special user info field before the user info field rather than the special user info field. Specially, the trigger frame may include the user info field immediately after the common info field. The station may determine the format of the TB PPDU corresponding to a response to the trigger frame, on the basis whether the trigger frame received by the station includes the special user info field. When the trigger frame received by the station includes the special user info field, the station may transmit an EHT TB PPDU as a response to the trigger frame. When the trigger frame received by the station does not include the special user info field, the station may transmit a HE TB PPDU as a response to the trigger frame. As described above, the trigger frame may include the special user info field present subfield. In this case, the station may determine the format of the TB PPDU corresponding to a response to the trigger frame based on the value of the special user info field present field of the trigger frame received by the station. When the value of the special user info field present field of the trigger frame received by the station is 0, the station may transmit the EHT TB PPDU as a response to the trigger frame. When the value of the special user info field present field of the trigger frame received by the station is 1, the station may transmit the HE TB PPDU as a response to the trigger frame.

When the trigger frame includes a user info field corresponding to an HET variant, the trigger frame may always include a special user info field. When the trigger frame does not include a special user info field, the trigger frame may not be allowed to include a user info field corresponding to an EHT variant.

A method for indicating an RU by a user info field corresponding to an EHT variant may be different from a method for indicating an RU by a user info field corresponding to a HE variant. Specially, a method for indicating an RU by an RU allocation subfield of a user info field corresponding to an EHT variant may be different from a method for indicating an RU by an RU allocation subfield of a user info field corresponding to a HE variant. For example, the RU allocation subfield of the user info field corresponding to the EHT variant may indicate an RU index for the user info field corresponding to the EHT variant. In addition, the RU allocation subfield of the user info field corresponding to the HE variant may indicate an RU index for the user info field corresponding to the HE variant. The user info field corresponding to the EHT variant may indicate an RU allocated to a station corresponding to the user info field by using the RU allocation subfield and a PS160 subfield.

The RU allocation subfield may be positioned immediately after the AID12 subfield, as described through FIG. 16. In addition, the RU allocation subfield may be an 8-bit field. The PS160 subfield may indicate a subchannel in which the RU indicated by the RU allocation subfield of the user info field including the PS160 subfield is positioned. In this case, a bandwidth of the subchannel may be 160 MHz. Specifically, the PS160 subfield may indicate whether the RU is positioned in a RU primary 160 MHz channel indicated by the RU allocation subfield of the user info field including the PS160 subfield, or is positioned in a secondary 160 MHz channel. In addition, the PS160 subfield may be positioned immediately before a trigger dependent user info subfield. The PS160 subfield may be a 1-bit field, and may be the 40th field (B39) of the RU allocation subfield.

The user info field corresponding to the HE variant may indicate an RU allocated to a station corresponding to the user info field by using the RU allocation subfield.

In the embodiment of FIG. 29, The station having received the trigger frame may determine a format of a subfield indicating the format of the TB PPDU transmitted as a response to a trigger frame in a pre-designated channel, and a format of a subfield indicating the format of the TB PPDU transmitted as a response to the trigger frame, based on the special user info field included in the trigger frame. In this case, the pre-designated channel may be the primary 160 MHz channel. For convenience of description, the subfield indicating the format of the TB PPDU transmitted as a response to the trigger frame is referred to as a HE/EHT P160 subfield. When the HE/EHT P160 subfield indicates the format of the TB PPDU transmitted as a response to the trigger frame in the primary 160 MHz channel, as the EHT TB PPDU, the station having received the trigger frame may transmit the EHT TB PPDU as a response to the trigger frame, regardless of the location of the RU allocated to the station. In this case, a value of the HE/EHT P160 subfield may be 0. In addition, when the HE/EHT P160 subfield indicates the format of the TB PPDU transmitted as a response to the trigger frame in the primary 160 MHz channel, as the EHT TB PPDU, the trigger frame may always include the special user info field.

When the HE/ETH P160 subfield indicates the format of the TB PPDU transmitted as a response to the trigger frame in the primary 160 MHz channel, as the HE TB PPDU, the station having received the trigger frame may determine the format of the TB PPDU transmitted as a response to the trigger frame, according to the location of the RU allocated to the station. In this case, a value of the HE/EHT P160 subfield may be 1. Specifically, when the HE/EHT P160 subfield indicates the format of the TB PPDU transmitted as a response to the trigger frame in the primary 160 MHz channel, as the HE TB PPDU, and the RU allocated to the station having received the trigger frame is not included in the primary 160 MHz channel, the station may transmit the EHT TB PPDU as a response to the trigger frame. In addition, when the HE/EHT P160 subfield indicates the format of the TB PPDU transmitted as a response to the trigger frame in the primary 160 MHz channel, as the HE TB PPDU, and the RU allocated to the station having received the trigger frame is included in the primary 160 MHz channel, the station may transmit the HE TB PPDU as a response to the trigger frame. In this case, the station may determine whether the RU allocated to the station is included in the primary 160 MHz channel, based on the value of the PS160 subfield.

The HE/EHT P160 subfield may be included in the common info field. Specifically, the HE/EHT P160 subfield may be the 56th bit (B55) of the common info field. In addition, the HE/EHT P160 subfield may be included in the common info field corresponding to the EHT variant, and the PS160 field may be included in the user info field corresponding to the EHT variant. Accordingly, when the trigger frame includes the special user info field, the trigger frame may include the HE/EHT P160 subfield and the PS160 field. FIG. 29 shows the common info field and the special info field to which such an embodiment is applied.

The EHT TB PPDU described above may be replaced with a NEXT TB PPDU. Accordingly, in the embodiments described above, when the EHT TB PPDU is indicated as the format of the TB PPDU, the NEXT TB PPDU or the EHT TB PPDU may be transmitted as the TB PPDU. In this case, the station having received the trigger frame may determine whether to transmit either the EHT TB PPDU or the NEXT TB PPDU as a response to the trigger frame, based on a format identifier subfield. Specifically, the station may transmit the TB PPDU according to the format of the TB PPDU indicated by the format identifier subfield.

The special user info field may include information required to transmit the EHT TB PPDU as a response to the trigger frame. Specifically, the special user info field may include information required to configure a signaling field of the PPDU of the EHT TB PPDU transmitted as a response to the trigger frame. In this case, the signaling field of the PPDU may be a U-SIG field. In FIG. 29, the special user info field may include an AID12 subfield, a PHY version ID subfield, a UL bandwidth extension subfield, a spatial reuse 1 subfield, a spatial reuse 2 subfield, a U-SIG disregard and validate subfield, a reserved subfield, and a trigger dependent user info field subfield. In this case, the AID12 subfield may be a 12-bit field. In addition, the PHY version ID subfield may be a 2-bit field. The UL bandwidth extension subfield may be a 2-bit field. In addition, the spatial reuse 1 subfield may be a 4-bit field. In addition, the spatial reuse 2 subfield may be a 4-bit field. In addition, the U-SIG disregard and validate subfield may be a 12-bit field. In addition, the reserved subfield may be a 3-bit field. In addition, the trigger dependent user info field subfield may have a variable length. The specific format of the special user info field may be as shown in FIG. 29.

The PHY version ID subfield may correspond to the above-described format identifier subfield, a PHY version identifier subfield, or a PHY version subfield. When a value of the PHY version ID subfield is configured as 0, the PHY version ID subfield may indicate an EHT physical layer. The station having received the trigger frame may configure a U-SIG field of the TB PPDU transmitted as a response to the trigger frame, based on the special user info field. Specifically, the station having received the trigger frame may configure a value of a subfield included in the special user info field with a value of the subfield of the U-SIG field of the TB PPDU. In this case, the subfield of the U-SIG field may include a PHY version ID subfield, a spatial reuse 1 subfield, a spatial reuse 2 subfield, and a U-SIG disregard and validate subfield. In addition, the station having received the trigger frame may configure a bandwidth (BW) subfield of the U-SIG field of the TB PPDU based on the UL bandwidth extension subfield of the special user info field and the UL BW subfield of the common info field.

In addition, the station having received the trigger frame may perform a spatial reuse (SR) operation based on the spatial reuse 1 subfield or the spatial reuse 2 subfield. Specifically, the station having received the trigger frame determines the trigger frame as an inter-BSS frame, the station may perform the SR operation. The SR operation may be a type of channel access. When the station performs the SR operation, the station may transmit a PPDU based on information included in the trigger frame and transmission power of the PPDU to be transmitted in the SR operation.

The UL bandwidth extension subfield may be a field used when the frequency bandwidth indicated by the trigger frame exceeds 160 MHz. The UL bandwidth extension subfield may indicate 320 MHz. The UL BW subfield of the common info field may indicate that a frequency bandwidth indicated by the trigger frame is one of 20 MHz, 40 MHz, 80 MHz, and 160 MHz. UL BW subfield values 0, 1, 2, and 3 may indicate 20 MHz, 40 MHz, 80 MHz, and 160 MHz, respectively.

In addition, the trigger frame may indicate the frequency bandwidth by using the UL BW subfield of the common info field and the UL bandwidth extension subfield of the special user info field. Accordingly, the station receiving the trigger frame may determine the frequency bandwidth indicated by the trigger frame, based on the UL BW subfield of the common info field and the UL bandwidth extension subfield of the special user info field. The UL BW subfield of the common info field and the UL bandwidth extension subfield of the special user info field may indicate 20 MHz, 40 MHz, 80 MHz, 160 MHz, and 320 MHz. In this case, the 320 MHz frequency bands of the UL BW subfield and the UL bandwidth extension subfield may be divided into 320-1 MHz and 320-2 MHz and indicated according to a channel center frequency or a staring frequency. When only the UL bandwidth field is used without the UL bandwidth extension subfield, a value of the UL bandwidth extension subfield indicating 160 MHz may indicate one of 160 MHz, 320 MHz-1, and 320 MHz-2 with the UL bandwidth extension subfield. Specifically, when only the UL BW subfield is used without the UL BW subfield value and the UL bandwidth extension subfield, the frequency bandwidth indicated by the UL BW subfield, the value of the UL bandwidth extension subfield value, and the frequency bandwidth indicated by both the UL BW subfield and the UL bandwidth extension subfield are as in table 2 below.

TABLE 2

| UL Bandwidth | Single signaling | UL Bandwidth Extension | Combined signaling |
| --- | --- | --- | --- |
| 0 | 20 | 0 | 20 |
| 0 | 20 | 1 | Reserved |
| 0 | 20 | 2 | Reserved |
| 0 | 20 | 3 | Reserved |
| 1 | 40 | 0 | 40 |
| 1 | 40 | 1 | Reserved |
| 1 | 40 | 2 | Reserved |
| 1 | 40 | 3 | Reserved |
| 2 | 80 | 0 | 80 |
| 2 | 80 | 1 | Reserved |
| 2 | 80 | 2 | Reserved |
| 2 | 80 | 3 | Reserved |
| 3 | 160 | 0 | Reserved |
| 3 | 160 | 1 | 160 |
| 3 | 160 | 2 | 320-1 |
| 3 | 160 | 3 | 320-2 |

In the embodiments described above, the frequency bandwidth indicated by the trigger frame may indicate a frequency bandwidth used in the transmission sequence, the frame, the TB PPDU transmitted based on the trigger frame.

Whether there is a trigger dependent user info subfield included in the special user info field and the length of the trigger dependent user info subfield may be determined based on the type of the trigger frame. That is, whether there is a trigger dependent user info subfield included in the special user info field and the length of the trigger dependent user info subfield may be determined based on a variant to which the trigger frame corresponds. The type of the trigger frame may be indicated by a trigger type subfield included in the common info field. The value of the trigger type subfield may be configured as 0 to 7. In this case, the trigger type subfield values 0 to 7 may indicate a basic trigger frame, a beamforming report poll (BFRP) frame, an MU-BAR frame, an MU-RTS frame, a buffer status report poll (BSRP) frame, a GCR MU-BAR frame, a bandwidth query report poll (BQRP) frame, and an NDP feedback report poll (NFRP) frame, respectively.

In the embodiments described above, a HE station transmitting a TB PPDU based on an RA-RU of the trigger frame may transmit the HE TB PPDU based on the RA-RU even though the trigger frame includes the special user info field. A method for resolving this is described below.

The station may determine the format of the TB PPDU transmitted as a response to the trigger frame according to a variant of the user info field corresponding to the station. Specifically, in the trigger frame, when the user info field corresponding to the station is a HE variant, the station may transmit the HE TB PPDU as a response to the trigger frame. In addition, in the trigger frame, when the user info field corresponding to the station is the EHT variant, the station may transmit the EHT TB PPDU as a response to the trigger frame. In addition, in the trigger frame, when the user info field corresponding to the station is the NEXT variant, the station may transmit the NEXT TB PPDU as a response to the trigger frame.

When the HE/EHT P160 subfield indicates the format of the TB PPDU transmitted as a response to the trigger frame in the primary 160 MHz channel, as the EHT TB PPDU, the user info field corresponding to the station may be the EHT variant. In addition, when the HE/EHT P160 subfield indicates the format of the TB PPDU transmitted as a response to the trigger frame in the primary 160 MHz channel, as the HE TB PPDU, and the RU allocated to the station having received the trigger frame is not included in the primary 160 MHz channel, the user info field corresponding to the station may be the EHT variant. In addition, when the HE/EHT P160 subfield indicates the format of the TB PPDU transmitted as a response to the trigger frame in the primary 160 MHz channel, as the HE TB PPDU, and the RU allocated to the station having received the trigger frame is included in the primary 160 MHz, the user info field corresponding to the station may be the HE variant.

An MU-RTS frame may include the special user info field described above. Specifically, a modified MU-RTS frame may include the special user info field. The MU-RTS frame may indicate the bandwidth in which the MU-RTS frame is transmitted. In addition, the modified MU-RTS frame may allocate a shared TXOP as described above. The modified MU-RTS frame may indicate a frequency bandwidth used in the shared TXOP. When the frequency bandwidth exceeding 160 MHz is used in the shared TXOP, the modified MU-RTS frame may indicate the frequency bandwidth exceeding 160 MHz by using the special user info field. Specifically, according to the embodiment described through FIG. 29, the special user info field may indicate the frequency band exceeding 160 MHz. In such an embodiment, a field remaining after excluding the UL bandwidth extension field of the special user info field may be configured as a reserved field. Specifically, a value of the field remaining after excluding the UL bandwidth extension field of the special user info field may be configured as 0. In addition, the UL bandwidth extension field of the special user info field may be configured according to the embodiments described through FIG. 29 above.

Figure 30:
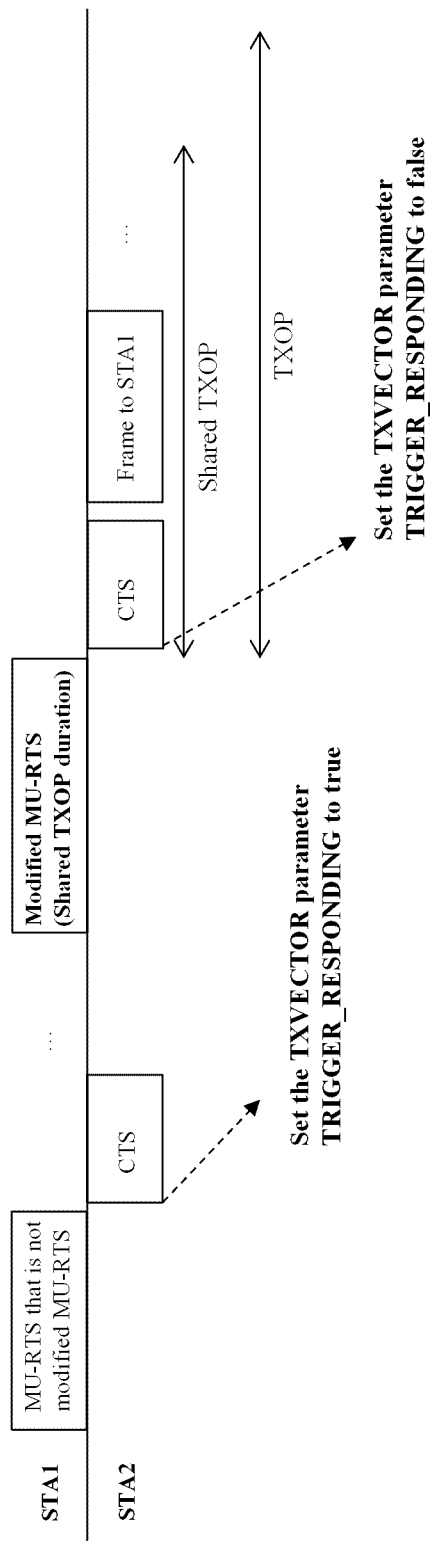
FIG. 30 illustrates a method for configuring a TXVECTOR parameter when a station transmits a frame as a response to a modified MU-RTS frame according to an embodiment of the present invention.

FIG. 30 illustrates a method for configuring a TXVECTOR parameter when a station transmits a frame as a response to a modified MU-RTS frame according to an embodiment of the present invention.

A method for configuring a TXVECTOR parameter when a station responds to a modified MU-RTS frame may be different from a method for configuring a TXVECTOR parameter when the station responds to an MU-RTS frame other than the modified MU-RTS frame. In this case, the TXVECTOR parameter may include TRIGGER_RESPONDING. The TRIGGER_RESPONDING is configured as true or false. The TXVECTOR parameter may be a parameter transmitted from a MAC layer to a physical layer. Specifically, when the station performs transmission, the station transfers TXVECTOR configured in the MAC layer to the physical layer. An RXVECTOR parameter may be a parameter transmitted from the physical layer to the MAC layer. Specifically, when the station performs reception, a value of the RXVECTOR parameter is configured in the physical layer, and the RXVECTOR parameter is transferred from the physical layer to the MAC layer.

The TRIGGER_RESPONDING of the TXVECTOR parameter may be configured when a non-HT PPDU or a non-HT duplicate PPDU is transmitted. Accordingly, an embodiment relating to the TRIGGER_RESPONDING configuration among the embodiments of the present invention may be applied when the non-HT PPDU or the non-HT duplicate PPDU is transmitted.

The station may configure the TRIGGER_RESPONDING of the TXVECTOR parameter based on whether a PPDU is transmitted as a response to the MU-RTS frame. For example, when the station transmits a PPDU as a response to the MU-RTS frame, the station may configure the TRIGGER_RESPONDING of the TXVECTOR parameter as true. When the station does not transmit a PPDU as a response to the MU-RTS frame, the station may configure the TRIGGER_RESPONDING of the TXVECTOR parameter as false.

In addition, a transmission condition of the station may vary according to a value of the TRIGGER_RESPONDING of the TXVECTOR parameter. For example, when the TRIGGER_RESPONDING of the TXVECTOR parameter is configured as true, the station may perform transmission according to a pre-designated transmission condition. When the TRIGGER_RESPONDING of the TXVECTOR parameter is configured as false, the station may perform transmission according to a transmission condition more tempered than the pre-designated transmission condition, or regardless of the pre-designated transmission condition. Accordingly, the transmission condition to be followed by the station may vary according to whether the station transmits a TB PPDU. Specifically, when the station transmits the TB PPDU, the station may perform transmission according to the pre-designated condition. In addition, when the station transmits a PPDU rather than the TB PPDU, the station may perform transmission according to a transmission condition more tempered than the pre-designated condition, or regardless of the pre-designated condition. When the station transmits the non-HT (duplicate) PPDU or the TB PPDU as a response to the MU-RTS frame, multiple stations may simultaneously transmit the PPDU. Accordingly, according to transmission parameter configurations of the multiple stations, the station receiving the PPDU may fail to receive the PPDU. In addition, transmissions of the multiple PPDUs may not be synchronized, and interference between the multiple PPDU transmissions may occur. In addition, a difference between multiple PPDU transmission power levels may increase.

The pre-designated transmission condition may include pre-correction accuracy requirements. In addition, the pre-designated transmission condition may include a pre-corrected transmission time, a pre-corrected transmission frequency and transmission sampling symbol clock, and pre-corrected transmission power. In this case, the pre-corrected transmission frequency and transmission sampling symbol clock condition may prevent inter-carrier interference. In addition, the pre-corrected transmission power condition may adjust inter-PPDU interference. In addition, the pre-designated condition may include a per chain power condition. In addition, the pre-designated transmission condition may include an error vector magnitude (EVM) condition and a spectral mask condition. In addition, the pre-designated condition may include an absolute transmission power accuracy condition (accuracy of achieving specified transmit power), an RSSI measurement accuracy condition (the difference between the RSSI and the received power), and a relative transmission power accuracy condition (accuracy of achieving a change in transmit power for consecutive PPDUs). In addition, the pre-designated condition may include correction of a carrier frequency offset (CFO) error and a symbol clock error. The carrier frequency offset correction condition may correspond to a condition in which a carrier frequency offset error does not exceed a pre-configured level after the carrier frequency correction.

Specifically, the station may correct the carrier frequency offset (CFO) error and the symbol clock error when transmitting a PPDU below according to a triggering PPDU, i.e., a PPDU including trigger information. In this case, the trigger information may include a trigger frame and a TRS control field.

HE TB PPDU or EHT TB PPDU

Non-HT PPDU or non-HT duplicate PPDU having TRIGGER_RESPONDING of TXVECTOR parameter, configured as true After the correction, when 10% of a complementary cumulative distribution function (CCDF) of the carrier frequency offset error of the AWGN in the −60 dBM reception power in the primary 20 MHz is measured, an absolute value of the remaining carrier frequency offset corresponding to the triggering PPDU should not exceed the levels below.

350 Hz for data subcarrier of HE TB PPDU or EHT TB PPDU 2 kHz for non-HT PPDU or non-HT duplicate PPDU Measurement of the remaining carrier frequency offset error of the EHT TB PPDU should be performed after a HE-SIG-A field or a U-SIG field.

Measurement of the remaining carrier frequency offset error of the non-HT PPDU or the non-HT duplicate PPDU should be performed after an L-STF field. As many ppm symbol clock errors as the carrier frequency offset errors should be corrected.

The station transmitting the HE TB PPDU, the EHT TB PPDU, the non-HT PPDU, or the non-HT duplicate PPDU as a response to the triggering PPDU should guarantee that a transmission starting time of the HE TB PPDU, the EHT TB PPDU, the non-HT PPDU, or the non-HT duplicate PPDU in a transmission antenna connector of the station is within +−0.4 us+16 us from the end of the last OFDM symbol of the triggering PPDU or the end of the PE field of the triggering PPDU.

However, a single station may transmit a response to the modified MU-RTS frame. Accordingly, for the transmission of the response to the modified MU-RTS frame, the above-described pre-designated transmission condition is not required, or a tempered pre-designated transmission condition may be applied.

The station may configure TRIGGER_RESPONDING of the TXVECTOR differently for a case where the response to the modified MU-RTS frame is transmitted and a case where a response to the MU-RTS frame rather than the modified MU-RTS frame is transmitted. Specifically, when the station transmits the response to the modified MU-RTS frame, the station may configure the value of TRIGGER_RESPONDING of the TXVECTOR parameter as false. In addition, when the station transmits the response to the MU-RTS frame rather than the modified MU-RTS frame, the station may configure the value of TRIGGER_RESPONDING of the TXVECTOR parameter as true. Such an embodiment may be applied when the station transmits the non-HT PPDU or the non-HT duplicate PPDU as described above.

In the embodiment of FIG. 30, a first station (STA1) transmits the MU-RTS frame rather than the modified MU-RTS frame. A second station (STA2) transmits a CTS frame as a response to the MU-RTS frame rather than the modified MU-RTS frame. As in the embodiment described above, the second station transmits a CTS frame by configuring the value of TRIGGER_RESPONDING of the TXVECTOR parameter as true. The first station (STA1) transmits the modified MU-RTS frame. The second station (STA2) transmits the response to the modified MU-RTS frame to the first station (STA1). In this case, the second station transmits the response to the modified MU-RTS frame by configuring the value of TRIGGER_RESPONDING of the TXVECTOR parameter as false.

For convenience of description, the modified MU-RTS frame is referred to as an MU-RTS TXOP sharing (TXS) trigger frame.

Figure 31:
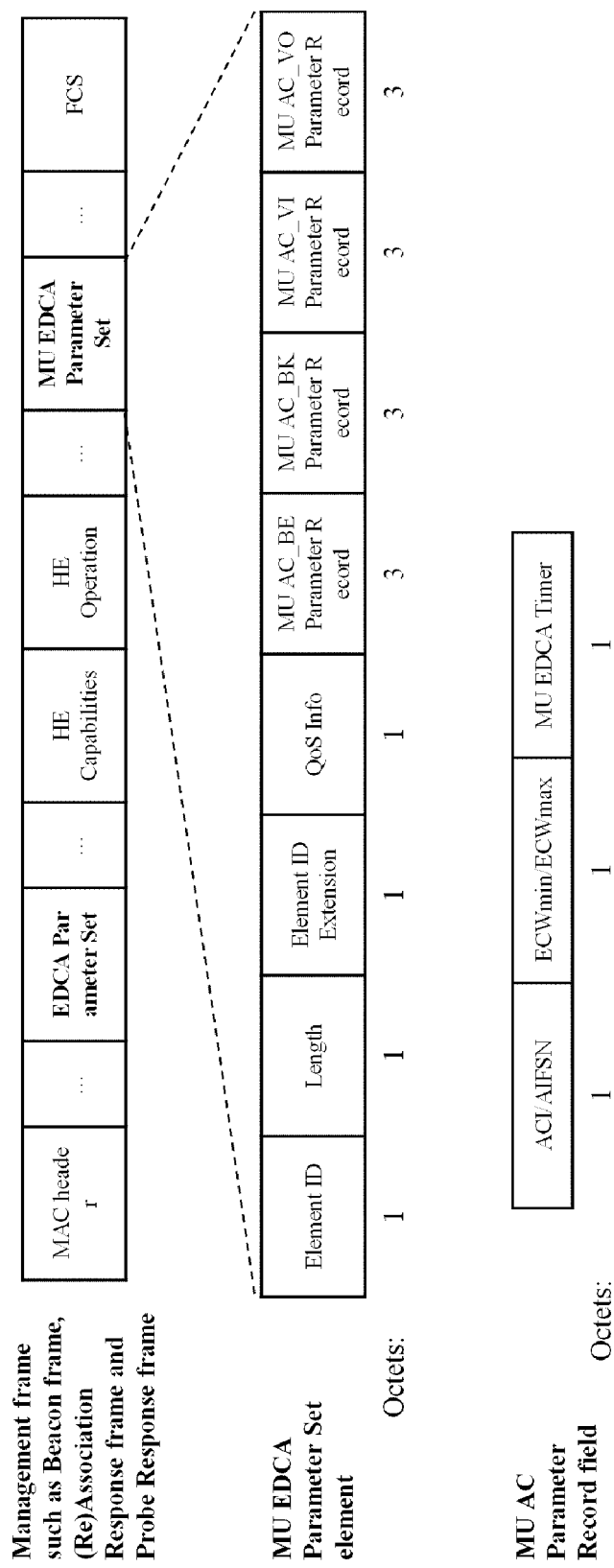
FIG. 31 illustrates a management frame configuration and an MU EDCA parameter set element according to an embodiment of the present invention.

FIG. 31 illustrates a management frame configuration and an MU EDCA parameter set element according to an embodiment of the present invention.

A station may perform channel access based on multiple EDCA parameter sets. The channel access may include an enhanced distributed channel access (EDCA). The EDCA parameter set may include an EDCA parameter set for each access category (AC). In addition, the EDCA parameter sets for respective AC, included in one EDCA parameter set, may have different parameter values. In addition, when the multiple EDCA parameter sets are divided into a first EDCA parameter set and a second EDCA parameter set, an EDCA parameter value of the first EDCA parameter set for one AC may be different from an EDCA parameter value of the second EDCA parameter set. In addition, the AC may include AC_best effort (BE), AC_background (BK), AC_video (VI), and AC_voice (VO).

The EDCA provides CSMA/CA access according to a priority of each traffic, specifically, the AC. In addition, the multiple EDCA parameter sets may include a legacy EDCA parameter set and an MU EDCA parameter set. Specifically, the multiple EDCA parameter sets may be divided into the legacy EDCA parameter set and the MU EDCA parameter set. The legacy EDCA parameter set may be stored in dot 11EDCATable, and the MU EDCA parameter set may be stored in dot 11MUEDCATable. The ECDA parameter set may include CWmin, CWmax, AIFSN, TXOP limit, and an MSDU lifetime. In addition, the MU EDCA parameter set may include CWmin, CWmax, AIFSN, and MUEDCA-Timer. The EDCA parameter set may include a parameter value for each AC as described above.

Accordingly, the EDCA parameter set may be displayed as CWmin[AC], CWmax[AC], AIFSN[AC], TXOP limit [AC], and MSDU lifetime[AC]. In addition, the MC EDCA parameter set may be displayed as CWmin[AC], CWmax [AC], AIFSN[AC], and MUEDCATimer[AC].

According to an embodiment, a contention window (CW) may be determined based on CWmin or CWmax. In addition, a backoff procedure is invoked or a backoff counter is reset or is newly picked, based on the CW. For example, a number randomly selected from among 0 to integers of the CW may be used for the backoff counter. In addition, when the CW is initialized, the initialization may be performed by using CWmin. In addition, the smallest value that the CW may have may be CWmin. The largest value that the CW may have may be CWmax.

The AIFS described through FIG. 6 may be determined based on an arbitration interframe space number (AIFSN). For example, the AIFS may be AIFSN*(slot time (aSlot-Time))+SIFS (aSIFSTime). Specifically, the AIFS may be a standby time when the station performs channel access again after detecting that the channel is busy. In addition, the AIFS may determine a slot boundary used when the station performs channel access again after detecting that the channel is busy.

The station having acquired a transmission opportunity (TXOP) may determine an ending time point of a transmission sequence based on a TXOP limit. Specifically, the station may terminate, in principle, the transmission sequence within the TXOP limit, but in some exceptional cases, the transmission sequence may be performed for duration exceeding the TXOP limit.

The station may receive an element indicating values of parameters of the EDCA parameter set from an associated AP, and may configure the EDCA parameter set according to the values of the parameters of the EDCA parameter set, indicated by the received element. In addition, when the station has failed to receive the element indicating the values of the parameters of the EDCA parameter set from the associated AP, the station may configure the values of the parameters of the EDCA parameter set as default values.

The AP may transmit a management frame including the element indicating the values of the parameters of the EDCA parameter set. In this case, the management frame may include a beacon frame, an associated response frame, a re-associated response frame, and a probe response frame. In addition, the management frame may include multiple elements indicating parameter sets of each of the multiple EDCA parameter sets. An element indicating values of parameters of the legacy EDCA parameter set may be an EDCA parameter set element. In addition, an element indicating values of parameters of the MU EDCA parameter set may be an MU EDCA parameter set element.

In FIG. 31, the management frame includes an EDCA parameter set element, a capability element, an operation element, an MU EDCA parameter set element. In the capability element and the operation element, elements for a HT station, a VHT station, a HE station, and an EHT station may be separately defined.

The element may be identified by an element ID field or an element ID extension field included in the element. The element ID field and the element ID extension field of the EDCA parameter set element indicate the EDCA parameter set element. In addition, the element ID field and the element ID extension field of the MU EDCA parameter set indicate the MU EDCA parameter set element.

The EDCA parameter set element and the MU EDCA parameter set element may include a parameter record field corresponding to each AC. The EDCA parameter set element may include the parameter record field for each AC. In addition, the MU EDCA parameter set element may include the MU parameter record field for each AC. The parameter record field may include a subfield and an ACI field (AC index) indicating an AC to which each parameter record field belongs.

In addition, the parameter record field may include a subfield indicating CWmin, an ECWmin field, a subfield indicating CWmax, and an ECWmax field. In this case, the values of CWmin and CWmax may be as follows. In this case, ECWmin indicates a value of the ECWmin subfield, and ECWmax indicates a value of the ECWmax subfield.

$$CWmin = 2^{ECWmin} - 1$$

$$CWmax = 2^{ECWmax} - 1$$

In addition, the parameter record field may include a TXOP limit subfield or an MU EDCA timer subfield. Specifically, the parameter record field may include the TXOP limit subfield. The TXOP limit subfield may indicate a TXOP limit. The MU parameter record field may include the MU EDCA timer subfield. The MU EDCA timer subfield may indicate the MU EDCA timer.

When a non-AP station has successfully performed transmission triggered by an AP while the non-AP station performs channel access by using the first EDCA parameter set, the non-AP station may perform channel access by using the second EDCA parameter set. The performing of the channel access by using the EDCA parameter set may be updating an EDCA parameter, for example, CWmin, CWmax, AIFSN, and an MU EDCA timer, according to values of parameters of the EDCA parameter set. In this case, the first EDCA parameter set may be the legacy EDCA parameter set, and the second EDCA parameter set may be the MU EDCA parameter set. In this case, when the second EDCA parameter set is used, the non-AP station may configure a timer indicating remaining duration to which the second parameter set is applied. The value of the timer regularly reduces as time passes, and the non-AP station may use the second EDCA parameter set until the value of the timer becomes 0. When the value of the timer is 0, the non-AP station may perform channel access by using the first EDCA parameter set. In addition, when the non-AP station receives the element indicating the reset of the EDCA parameter set, the non-AP station may configure the value of the timer as 0. In this case, the timer may be the MU EDCA timer. In the present specification, for convenience of description, when the value of the timer is configured as a value other than 0, it is described that the timer is configured, wherein the EDCA timer indicating the remaining duration to which the second parameter set is applied is referred to as a timer for the application of the second parameter set. In this case, the value other than 0 may be a default value included in the EDCA parameter set.

In addition, the parameter value of the first EDCA parameter set may be smaller than the parameter value of the second EDCA parameter. In this case, the probability of success in channel access using the second EDCA parameter set may be lower than the probability of success in channel access using the first EDCA parameter set. Through this, fairness of the channel access between stations may be adjusted.

A case where the non-AP station has successfully performed the transmission triggered by the AP may indicate a case where the non-AP station has successfully performed transmission solicited by the basic trigger frame. In addition, the case where the non-AP station has successfully performed transmission solicited by the basic trigger frame may be limited to a case where the non-AP station has successfully performed transmission of the QoS data frame, solicited by the basic trigger frame. A case where the non-AP station has successfully performed the QoS data frame may be defined below. In a case where the QoS data frame requires an immediate response, when the non-AP station has received the immediate response to the QoS data frame, it may be considered that the non-AP station has successfully transmitted the QoS data frame. In addition, in a case where the QoS data frame does not request an immediate response, when the non-AP station has transmitted the QoS data frame, it may be considered that the non-AP station has successfully transmitted the QoS data frame. Accordingly, when the non-AP station has transmitted the QoS data frame requesting an immediate response and has received an immediate response to the QoS data frame, the non-AP station may update the EDCA parameter according to the second EDCA parameter set. In addition, when the non-AP station has transmitted the QoS data frame not requesting an immediate response, the non-AP station may update the EDCA parameter according to second EDCA parameter set. In this case, the non-AP station may update the EDCA parameter corresponding to the AC of the QoS data frame according to the second EDCA parameter set. In addition, when the non-AP station has transmitted the QoS data frame requesting an immediate response and has received the immediate response to the QoS data frame, the non-AP station may configure a timer for the application of the second EDCA parameter set. In this case, the EDCA timer may start at the end of the PPDU including the immediate response. In addition, when the non-AP station has transmitted the QoS data frame not requesting an immediate response, the non-AP station may configure a timer for the application of the second EDCA parameter set. In this case, the timer for the application of the second EDCA parameter set may start at the end of the PPDU including the QoS data frame.

Figure 32:
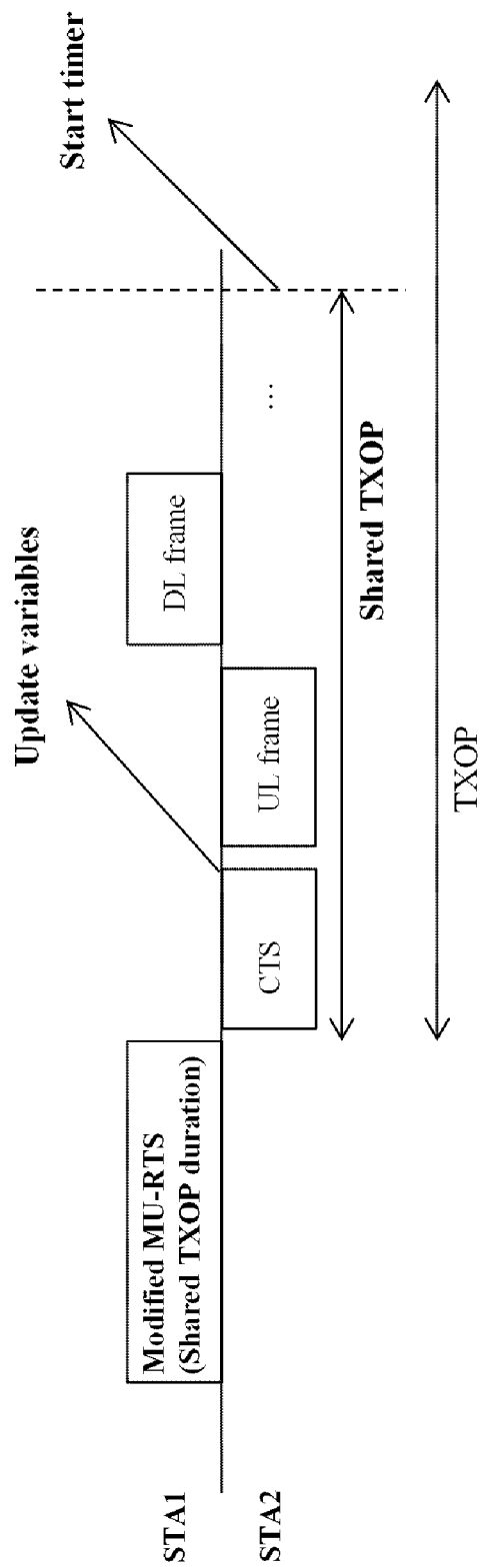
FIG. 32 illustrates a method for configuring an MU EDCA parameter set by a station to which a shared TXOP is allocated according to an embodiment of the present invention.

FIG. 32 illustrates a method for configuring an MU EDCA parameter set by a station to which a shared TXOP is allocated according to an embodiment of the present invention.

A first EDCA parameter set and a second EDCA parameter set in an embodiment described through FIG. 32 may be identical to the first EDCA parameter set and the second EDCA parameter set in the embodiment described through FIG. 31.

A station to which a shared TXOP is allocated may perform channel access by using the above-described second EDCA parameter set. In this case, the second EDCA parameter set may be the above-described MU EDCA parameter set. In another detailed embodiment, the second EDCA parameter set may be an EDCA parameter set having a lower priority than the above-described legacy EDCA parameter set. Through such an embodiment, the fairness of channel access may be adjusted between the station to which the shared TXOP is allocated and the station to which the shared TXOP is not allocated. For convenience of description, the station which has allocated the shared TXOP is referred to as a shared TXOP allocator, and a holder of the shared TXOP is referred to as a shared TXOP holder.

When a station having received a MU-RTS TXS trigger frame transmits a response to the MU-RTS TXS trigger frame, the station may switch the EDCA parameter used for channel access from the first EDCA parameter set to the second EDCA parameter set. A response frame to the MU-RTS TXS trigger frame may be a CTS frame. Accordingly, the response to the MU-RTS TXS trigger frame may indicate a CTS frame or a PPDU including the CTS frame. When the station having received the MU-RTS TXS trigger frame transmits a response to the MU-RTS TXS trigger frame, the station may perform channel access by using the second EDCA parameter set within the shared TXOP. Such an embodiment may be limited to a case where the MU-RTS TXS trigger frame only allows the shared TXOP holder to perform transmission to one station, for example, an AP. That is, when the MU-RTS TXS trigger frame allows the shared TXOP holder to perform transmission to multiple stations, for example, an AP and other non-AP stations, such an embodiment may not be applied.

In another embodiment, when the station to which the shared TXOP is allocated transmits at least one frame to the shared TXOP allocator, the station may switch the EDCA parameter used for channel access from the first EDCA parameter set to the second EDCA parameter set.

In addition, the station to which the shared TXOP is allocated may configure a timer for the application of the second EDCA parameter set at the ending time point of the shared TXOP. In another detailed embodiment, the station to which the shared TXOP is allocated may configure a timer for the application of the second EDCA parameter set at a time point at which a response corresponding to signaling for termination of the shared TXOP is received. In another detailed embodiment, the station to which the shared TXOP is allocated may configure a timer for the application of the second EDCA parameter set at an earlier time point between the ending time point of the shared TXOP and the time point at which a response corresponding to signaling for termination of the shared TXOP is received. In this case, configuring the timer for the application of the second EDCA parameter set may correspond to configuring a value of the timer for the application of the second EDCA parameter set as a value greater than 0.

In the embodiment of FIG. 32, a first station (STA1) transmits an MU-RTS TXS trigger frame to a second station (STA2) to allocate a shared TXOP to the second station (STA2). In this case, the second station (STA2) transmits a CTS frame to the first station (STA1). As described above, when the second station (STA2) transmits the CTS frame to the first station (STA1), the second station (STA2) switches the first EDCA parameter set to the second EDCA parameter set to perform channel access by using the second EDCA parameter set. In addition, the second station (STA2) may configure a timer for application of the second EDCA parameter set at the ending time point of the shared TXOP. This is for preventing the value of the timer from being continuously reduced even though the shared TXOP holder does not perform the channel access, in a case where the shared TXOP holder configures the timer for the application of the second EDCA parameter when performing switching to the second EDCA parameter set. Accordingly, the fairness with other stations can be secured.

Through FIG. 32, or the like, embodiments in which after the shared TXOP holder transmits a frame in the shared TXOP, the shared TXOP holder switches the EDCA parameter used for channel access from the first parameter set, for example, the legacy EDCA parameter set, to the second parameter set, for example, the MU EDCA parameter set, are described. Such embodiments may be limited to a case where the shared TXOP holder has successfully transmitted the frame. Accordingly, when the shared TXOP holder has successfully transmitted the frame, the shared TXOP holder may switch the EDCA parameter used for channel access from the first parameter set to the second parameter set. In addition, such embodiments may be limited to a case where the shared TXOP holder has successfully transmitted the QoS data frame. In addition, when the shared TXOP holder has successfully transmitted the QoS data frame, the shared TXOP holder may switch the EDCA parameter used for the channel access from the first parameter set to the second parameter set. When the QoS data frame requires an immediate response, successful transmission of the QoS data frame may correspond to transmission of the QoS data frame and reception of an ACK to the transmitted QoS data frame. In addition, when the QoS data frame does not require an immediate response, successful transmission of the QoS data frame may correspond to transmission of the QoS data frame. When the shared TXOP holder has successfully transmitted the QoS data frame to the shared TXOP allocator in the shared TXOP, the shared TXOP holder configures a value of the timer for the application of the second parameter set, for example, an MU EDCA timer, as a value other than 0.

Accordingly, when the QoS data frame requires an immediate response, the shared TXOP holder may transmit the QoS data frame to the shared TXOP allocator in the shared TXOP, and configure the EDCA timer for the application of the second parameter set at the end of the PPDU including the immediate response to the QoS data frame from the shared TXOP allocator. When the QoS data frame does not requires an immediate response, the EDCA timer for the application of the second parameter set may be configured at the end of the PPDU including the QoS data frame transmitted to the shared TXOP allocator in the shared TXOP.

In the above-described embodiments, it is described that the embodiment in which the shared TXOP holder switches the EDCA parameter used for channel access from the first EDCA parameter set to the second EDCA parameter set after the shared TXOP holder transmits the frame in the shared TXOP may be applied only in the first shared TXOP mode. This is because it may be difficult for the shared TXOP allocator to monitor the frame exchanging between the shared TXOP holder and other stations. In addition, this is because it may be difficult to say that the shared TXOP holder gets more benefits than other stations in the frame exchanging when the shared TXOP holder does not perform the frame exchanging with the shared TXOP allocator.

Figure 33:
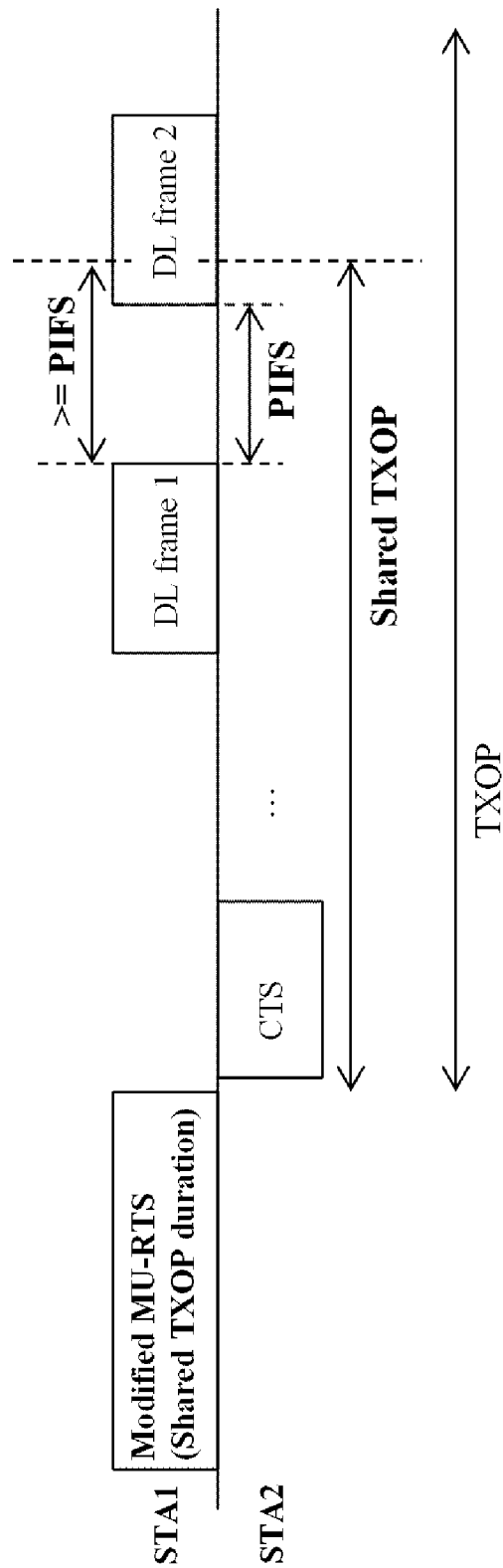
FIG. 33 illustrates a TXOP recovery operation after a station allocates a shared TXOP according to an embodiment of the present invention.

FIG. 33 illustrates a TXOP recovery operation after a station allocates a shared TXOP according to an embodiment of the present invention.

A shared TXOP allocator may perform transmission in a shared TXOP only when a pre-designated condition is satisfied. The pre-designated condition may include at least one of transmitting, by the shared TXOP allocator, an immediate response to transmission of the shared TXOP holder in the shared TXOP, and a TXOP recovery operation. In this case, the TXOP recovery operation may be performed when frame exchanging is not performed in the shared TXOP. When transmission or reception is not performed for a predetermined time or longer in the shared TXOP, a station may determine that the frame exchanging is not performed. In addition, when transmission failure occurs in the shared TXOP, the station may determine that the frame exchanging is not performed. In this case, when an immediate response to the transmitted frame is not performed, the station may determine that the transmission has failed.

In addition, when the station receives a frame not requesting an immediate response, the station may determine that the frame exchanging is not performed. Specifically, when the station has received an A-MPDU only including an MPDU not requesting an immediate response, the station may determine that the frame exchanging is not performed. When the station has failed to successfully receive all MPDUs of the A-MPDU, the station may not determine whether the A-MPDU includes only an MPDU not requesting an immediate response. Accordingly, when the station has failed to successfully receive all MPDUs of the A-MPDU, the station cannot perform the TXOP recovery.

As described above, when transmission or reception is not performed for a predetermined time or longer in the shared TXOP, the station may determine that the frame exchanging is not performed. Specifically, when a channel in which the TXOP sharing is performed for a predetermined time or longer in the shared TXOP is idle, the station may determine that the frame exchanging is not performed. In this case, the predetermined time may be a PIFS. In addition, when a channel is idle, a carrier sensing (CS) result of the channel may indicate an idle state. In this case, the CS may be energy detection (ED). When the station detects energy of a signal having a value equal to or greater than an ED threshold value or greater in the ED, the station may determine that the corresponding medium is not idle (is busy). In addition, when the station detects energy of a signal having a value smaller than the ED threshold value in the ED, the station may determine that the corresponding medium is idle.

In the present specification, a case where a channel is idle at the TxPIFS slot boundary may be considered as a case where a CS result indicates an idle state for a PIFS or a case where a channel is idle for the PIFS. In addition, in the present specification, when transmission starts at a specific time point, specifically, after the PIFS from the end of the PPDU, it may be described on the assumption that the channel is idle for the PIFS. In addition, in the specification, when transmission cannot start at a specific time point, specifically, after the PIFS from the end of the PPDU, it may be described on the assumption that the channel is busy for the PIFS.

In addition, the PIFS may be a time interval acquired by summating an SIFS (aSIFSTime) and a slot time (aSlotTime). In addition, the TxPIFS slot boundary may be a time point aRxTxTurnaroundTime earlier than a time point later by the PIFS from a time point at which the channel is switched to the idle state. Accordingly, the TxPIFS slot boundary may be TxSIFS slot boundary+aSlotTime. The TxSIFS may be a time point aRxTxTurnaroundTime earlier than a time point later by the SIFS from a time point at which the channel is switched to the idle state. The aRxTxTurnaroundTime may be a value determined based on a time required for the state of the station is changed from a reception state to a transmission state. Specifically, the aRxTxTurnaroundTime may be a time required for the state of the station is changed from a reception state to a transmission state. In another detailed embodiment, the aRxTxTurnaroundTime may be a maximum time required for the state of the station is changed from a reception state to a transmission state. The SIFS may be 16 us, the slot time may be 9 us, and the PIFS may be 25 us. Specifically, when the frame exchanging is performed in a 5 GHz band or a 6 GHz band, the SIFS may be 16 us, the slot time may be 9 us, and the PIFS may be 25 us. In addition, the SIFS may be 10 us, the slot time may be 9 us, and the PIFS may be 19 us. Specifically, when the frame exchanging is performed in a 2.4 GHz band, the SIFS may be 10 us, the slot time may be 9 us, and the PIFS may be 19 us.

In addition, the above-described embodiments of performing TXOP recovery may be applied only in the first shared TXOP mode. Specifically, the embodiments may be applied only when the shared TXOP holder is not allowed to transmit a P2P frame in the shared TXOP.

In addition, the above-described TXOP recovery may be limited to a case where the shared TXOP holder has received or transmitted the last frame before the PIFS from the ending time point of the shared TXOP. In this case, when the shared TXOP holder has received or transmitted the last frame after a time point earlier by the PIFS from the ending time point of the shared TXOP, the station may perform channel access after the shared TXOP.

In addition, in the above-described embodiments, it is described that the TXOP recovery is performed by the shared TXOP allocator, but the shared TXOP holder may perform the TXOP recovery according to the above-described embodiments.

In the embodiment of FIG. 33, a first station (STA1) transmits an MU-RTS TXS trigger frame to a second station (STA2) to allocate a shared TXOP to the second station (STA2). In this case, the second station (STA2) transmits a CTS frame to the first station (STA1). The first station (STA1) transmits a frame (DL frame 1) to the second station (STA2) in the shared TXOP, and determines that the channel is idle for a PIFS. When the first station (STA1) determines that the channel is idle for the PIFS, the first station (STA1) transmits a frame (DL frame 2) as a TXOP recovery operation.

Through FIG. 33, a method for recovering a TXOP in a shared TXOP is described. When the shared TXOP is terminated, the TXOP acquired by the shared TXOP allocator may not end. In this case, a method for recovering the TXOP by the shared TXOP allocator may be required. Such a method is described through FIG. 34.

Figure 34:
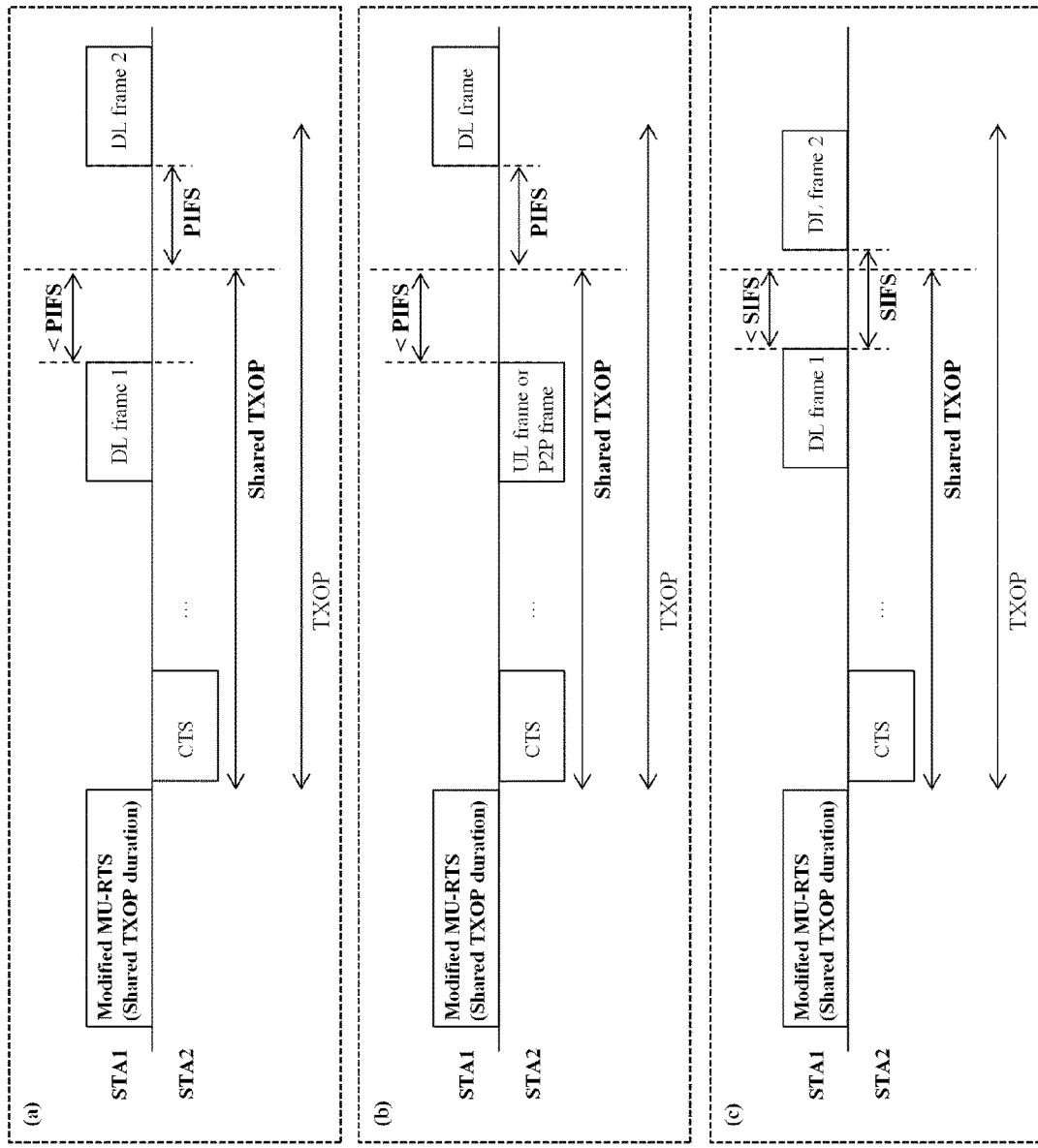
FIG. 34 illustrates performing TXOP recovery by a shared TXOP allocator after termination of a shared TXOP according to an embodiment of the present invention.

FIG. 34 illustrates performing TXOP recovery by a shared TXOP allocator after termination of a shared TXOP according to an embodiment of the present invention.

First, a shared TXOP allocator may perform transmission in a shared TXOP according to the following conditions.

When the shared TXOP allocator having transmitted an MU-RTS TXS trigger frame in a first shared TXOP mode receives a CTS frame from a shared TXOP holder, the shared TXOP allocator may initiate transmission in the shared TXOP only in the following cases.

When the shared TXOP allocator has received a PPDU requesting an immediate response from the shared TXOP holder in the shared TXOP, the shared TXOP allocator may initiate transmission in the shared TXOP. In addition, when a channel is idle at the TxPIFS slot boundary from the end of transmission of an immediate response lastly transmitted to the station in the first shared TXOP mode, or transmission of a frame not requesting an immediate response lastly received from the TXOP holder, the shared TXOP allocator may initiate transmission in the shared TXOP.

When the shared TXOP allocator having transmitted the MU-RTS TXS trigger frame in a second shared TXOP mode receives a CTS frame from the shared TXOP holder, the shared TXOP allocator may initiate transmission in the shared TXOP only in the following cases.

When the shared TXOP allocator receives a PPDU requesting an immediate response from the shared TXOP holder in the shared TXOP, the shared TXOP allocator may initiate transmission in the shared TXOP.

In addition, when a TXNAV timer expires, that is, when the TXOP acquired by the shared TXOP holder expires, the shared TXOP allocator cannot transmit any PPDU if not performing a new backoff procedure.

When the TXOP does not end after the shared TXOP ends, the shared TXOP allocator may start transmission when at least one of pre-designated conditions is satisfied.

First condition: The shared TXOP allocator may determine that a channel is idle for a PIFS by performing CS at the end of the shared TXOP. In this case, the shared TXOP allocator may transmit a PPDU at a time point later by the PIFS from the end of the shared TXOP.

Second condition: The transmission of the PPDU by the shared TXOP allocator may end after a time point earlier by the SIFS from the end of the shared TXOP. In this case, the shared TXOP allocator may transmit the PPDU at a time point later by the SIFS from the end of the PPDU transmitted by the shared TXOP allocator. Specifically, the shared TXOP allocator may transmit the PPDU after the SIFS from the end of the PPDU transmitted by the shared TXOP allocator by not performing the CS.

Third condition: The shared TXOP allocator may determine that the channel is not idle by performing the CS at the end of the shared TXOP. In this case, when the shared TXOP allocator may transmit the PPDU when the channel is idle, that is, when the channel is idle at the TxPIFS slot boundary.

Fourth condition: The shared TXOP allocator may acquire a TXOP by performing a backoff procedure for acquiring the TXOP. In this case, the shared TXOP allocator may also transmit a PPDU.

In an embodiment of FIG. 34, a first station (STA1) transmits an MU-RTS TXS trigger frame to a second station (STA2) to allocate a shared TXOP to the second station (STA2). In this case, the second station (STA2) transmits a CTS frame to the first station (STA1).

In an embodiment of FIG. 34(*a*), when the first station (STA1) has transmitted a first frame (DL frame 1) in the shared TXOP, there is a remaining time interval shorter than the PIFS and longer than the SIFS by the end of the shared TXOP. In this case, the first station (STA1) determines that the channel is idle for the PIFS by performing the CS at the end of the shared TXOP. Accordingly, the first station (STA1) may transmit a second frame (DL frame 2) at a time point later by the PIFS from the end of the shared TXOP. However, an interval between the first frame (DL frame 1) and the second frame (DL frame 2) is longer than 25 us. Accordingly, this may violate the conventional regulation. Specifically, this may violate a regulation by which an interval between frames is not allowed to be longer than 25 us when the station acquired the TXOP performs frame exchanging in the wireless LAN standard.

In an embodiment of FIG. 34(b), when the second station (STA1) transmits a frame (UL frame or P2P frame) in the shared TXOP, there is a remaining time interval shorter than the PIFS and longer than SIFS by the end of the shared TXOP. In this case, the first station (STA1) determines that the channel is idle for the PIFS by performing the CS at the end of the shared TXOP. Accordingly, the first station (STA1) may transmit a frame (DL frame) at a time point later by the PIFS from the end of the shared TXOP. In this case, an interval between PPDUs transmitted by the first station (STA1) may be longer than 25 us. In addition, an interval between a PPDU transmitted by the second station (STA2) and a PPDU transmitted by the first station (STA1) may be longer than 25 us. Accordingly, this may also violate the above-described regulation relating to the transmission interval in the TXOP.

In addition, when the first station fails to detect all the frame exchanging in the shared TXOP and performs the CS at the end of the shared TXOP, or when the frame exchanging is terminated at the end of the shared TXOP, the interval between the PPDUs is also longer than 25 us. This is the same even in a case where the PPDU transmission is performed according to condition 3. An interval between a PPDU lastly transmitted in the shared TXOP and a PPDU transmitted first by the first station (STA1) after the shared TXOP is longer than 25 us. This may also violate the above-described regulation relating to the transmission interval in the TXOP.

In the embodiment of FIG. 34(c), the transmission of the first frame (DL frame 1) of the first station (STA1) ends after a time point earlier by the SIFS at the end of the shared TXOP. In this case, the first station (STA1) may transmit the second frame (DL frame 2) after the SIFS from the end of the PPDU including the first frame (DL frame 1).

Figure 35:
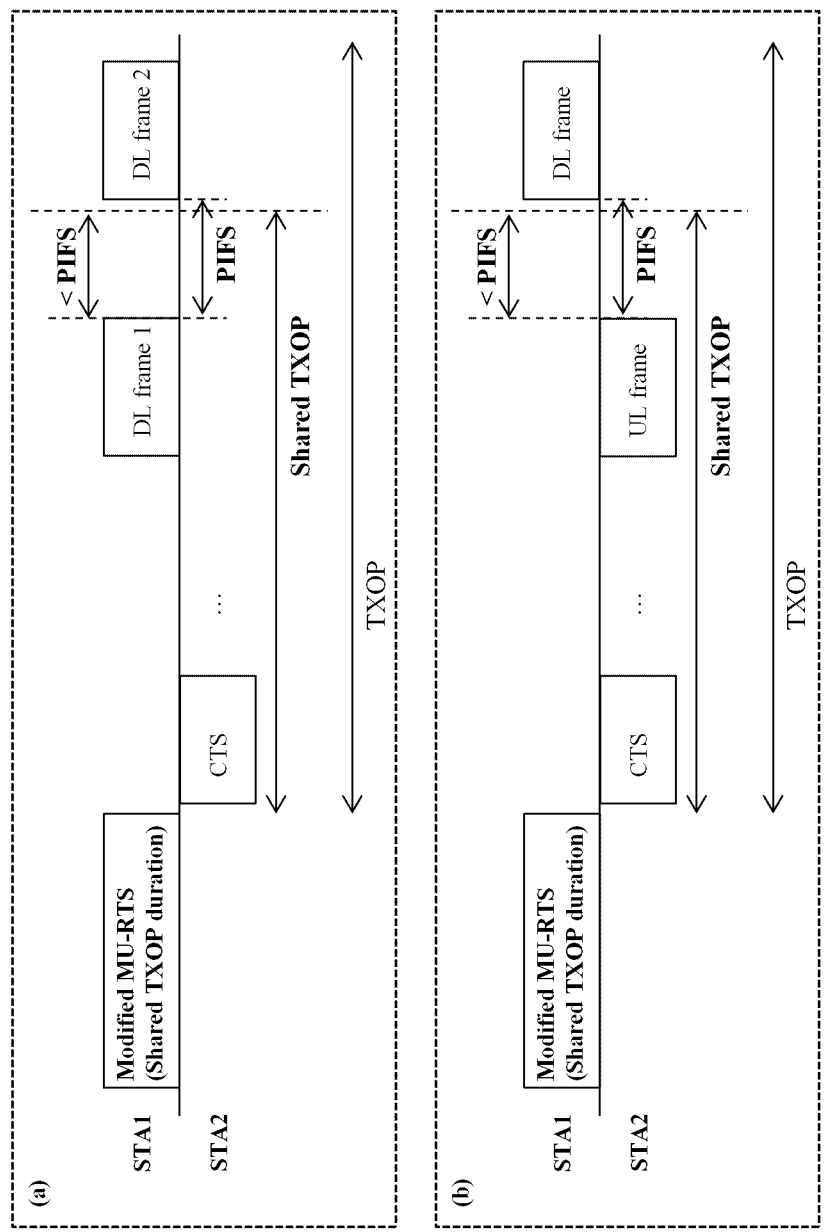
FIG. 35 illustrates performing TXOP recovery by a shared TXOP allocator after termination of a shared TXOP according to another embodiment of the present invention.

The TXOP recovery after the termination of the shared TXOP, which does not violate the regulation relating to the interval between PPDUs transmitted in the TXOP, is described through FIG. 35.

FIG. 35 illustrates performing TXOP recovery by a shared TXOP allocator after termination of a shared TXOP according to another embodiment of the present invention.

The first condition described through FIG. 34 may be modified as follows. The end of the last PPDU of the shared TXOP may be after a time point the PIFS earlier than the end of the shared TXOP. In this case, when the channel is idle for the PIFS from the end of the PPDU lastly transmitted in the shared TXOP, the shared TXOP allocator may transmit a PPDU at a time point later by the PIFS from the end of the PPDU lastly transmitted in the shared TXOP. Such an embodiment may be applied only when the shared TXOP holder is not allowed to perform transmission to the station other than the shared TXOP allocator in the shared TXOP. In the present specification, a PPDU transmitted in the shared TXOP may only refer to a PPDU transmitted by the shared TXOP holder in the shared TXOP, and a PPDU transmitted as a response to the PPDU transmitted by the shared TXOP holder. For convenience of description, the PPDU lastly transmitted in the shared TXOP is referred to as the last PPDU of the shared TXOP. In addition, a case where the shared TXOP holder is not allowed to perform transmission to the station other than the shared TXOP allocator in the shared TXOP is referred to as a first TXOP sharing mode. In addition, a case where the shared TXOP holder is allowed to perform transmission to the station other than the shared TXOP allocator in the shared TXOP is referred to as a second TXOP sharing mode.

In this case, the last PPDU of the shared TXOP may be the PPDU transmitted by the shared TXOP holder. In this case, only for a case where the corresponding PPDU does not include the frame requesting an immediate response, the shared TXOP allocator may perform TXOP recovery according to the above-described embodiment.

In the embodiment of FIG. 35, the first station (STA1) transmits an MU-RTS TXS trigger frame to the second station (STA2) to allocate a shared TXOP to the second station (STA2). In this case, the second station (STA2) transmits a CTS frame to the first station (STA1).

In the embodiment of FIG. 35(a), when the first station (STA1) transmits the first frame (DL frame 1) in the shared TXOP, there is a remaining time interval shorter than the PIFS and longer than the SIFS by the end of the shared TXOP. In this case, the first station (STA1) determines that the channel is idle for the PIFS by performing the CS at the end of the first frame (DL frame 1). Accordingly, the first station (STA1) may transmit the second frame (DL frame 2) at a time point later by the PIFS from the end of the first frame (DL frame 1). Accordingly, the interval between the first frame (DL frame 1) and the second frame (DL frame 2) is shorter than 25 us.

In the embodiment of FIG. 35(b), when the second station (STA1) transmits a frame (UL frame) with the shared TXOP, there is a remaining time interval shorter than the PIFS and longer than the SIFS by the end of the shared TXOP. In this case, the first station (STA1) determines that the channel is idle for the PIFS by performing the CS at the end of the PPDU including the frame (UL frame). Accordingly, the first station (STA1) may transmit a frame (DL frame) at a time point later by the PIFS from the end of the PPDU including the frame (UL frame). In this case, the interval between the PPDU transmitted by the second station (STA2) and the PPDU transmitted by the first station (STA1) is shorter than 25 us.

In another detailed embodiment, when duration of the remaining shared TXOP is shorter than the PIFS, the shared TXOP holder is not allowed to start transmission. When duration of the remaining shared TXOP is shorter than the PIFS, the shared TXOP allocator may transmit the PPDU at a time point later by the SIFS from the end of the PPDU transmitted as the last PPDU of the shared TXOP. In this case, the shared TXOP allocator may transmit the PPDU at a time point later by the SIFS from the end of the PPDU transmitted as the last PPDU of the shared TXOP, without performing the CS. This is because it is guaranteed that the shared TXOP holder does not perform transmission since the duration of the remaining shared TXOP is shorter than the PIFS. In such embodiments, the last PPDU of the shared TXOP is a PPDU transmitted by the shared TXOP allocator and duration of the remaining shared TXOP is shorter than the SIFS, the station having received the allocation may transmit the PPDU according to the second condition described through FIG. 34.

When the duration of the remaining shared TXOP is shorter than the PIFS, the shared TXOP holder and the station having allocated the TXOP may not be allowed to start transmission. Specifically, when the duration of the remaining shared TXOP is shorter than the PIFS and longer than the SIFS, the shared TXOP holder and the station having allocated the TXOP may not be allowed to start the transmission.

In addition, when the TXOP does not end after the shared TXOP ends, the condition below may be added as a condition for starting the transmission by the shared TXOP allocator.

Fifth condition: The shared TXOP allocator may receive a frame requesting an immediate response from the shared TXOP holder. In this case, the shared TXOP allocator may transmit the PPDU at a time point later by the SIFS from the end of the PPDU including the frame requesting an immediate response. In this case, an interval between the end of the PPDU including the frame requesting an immediate response by the station to which the TXOP is allocated and the end of the shared TXOP may have a value equal to or smaller than a pre-designated value. The pre-designated value may be the SIFS. The pre-designated value may be 0.

As described above, the embodiments described through FIG. 35 may be applied to the first shared TXOP mode. The TXOP recovery after the termination of the shared TXOP in the second shared TXOP mode is described through FIG. 36.

Figure 36:
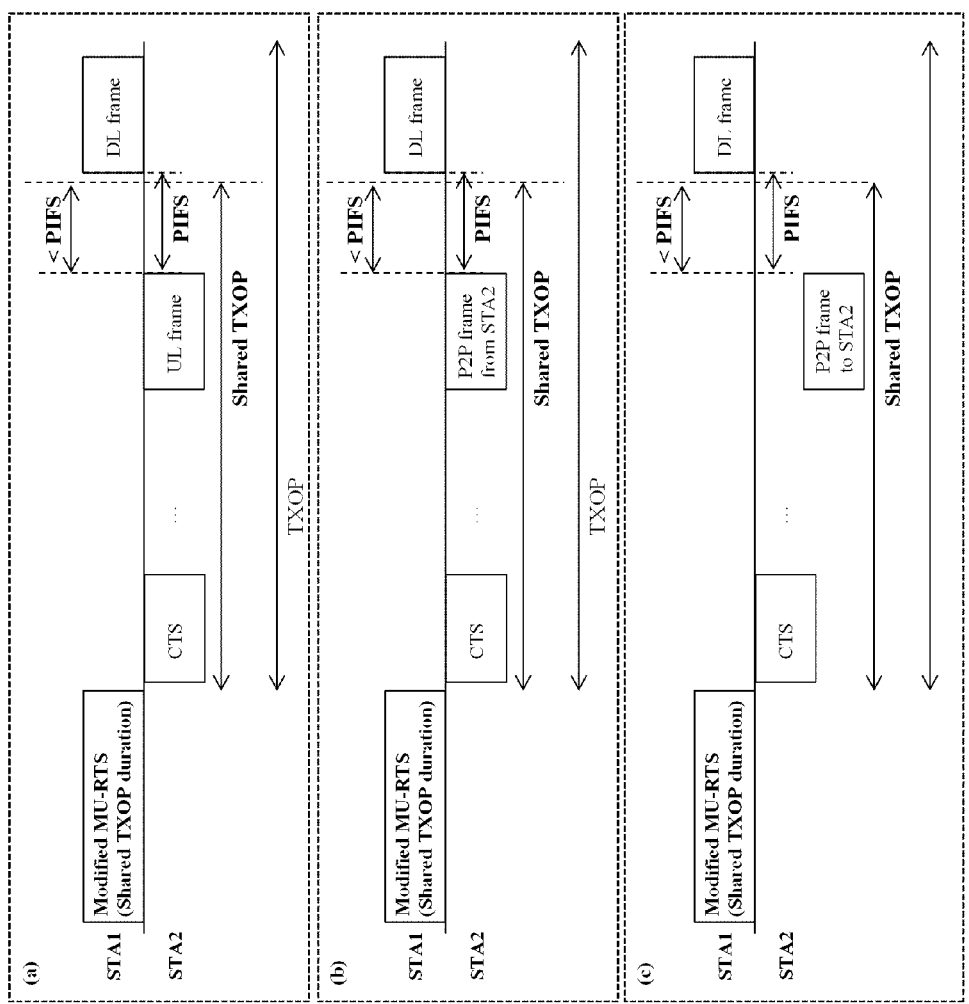
FIG. 36 illustrates performing TXOP recovery by a shared TXOP allocator after termination of a shared TXOP according to another embodiment of the present invention.

FIG. 36 illustrates performing TXOP recovery by a shared TXOP allocator after termination of a shared TXOP according to another embodiment of the present invention.

The embodiments described through FIG. 35 may be applied also in a second shared TXOP mode. However, only for a case where the last PPDU of the shared TXOP includes a frame having an intended receiver corresponding to the shared TXOP allocator, the embodiments described through FIG. 35 may be applied also in the second shared TXOP mode.

Accordingly, in the second shared TXOP mode, the last PPDU of the shared TXOP may include a frame having an intended receiver corresponding to the shared TXOP allocator, and the end of the last PPDU of the shared TXOP may be after a time point a PIFS earlier than the end of the shared TXOP. In this case, when a channel is idle for the PIFS from the end of the last PPDU of the shared TXOP, the shared TXOP allocator may transmit a PPDU at a time point later by the PIFS from the end of the last PPDU of the shared TXOP. Such an embodiment may be applied only in a case where the last PPDU of the shared TXOP does not include a frame requesting an immediate response.

In addition, when duration of the remaining shared TXOP is shorter than the PIFS, a shared TXOP holder may not be allowed to start transmission. When the duration of the remaining shared TXOP is shorter than the PIFS, the shared TXOP allocator may transmit a PPDU at a time point later by the SIFS from the end of the last PPDU of the shared TXOP. In this case, the shared TXOP allocator may transmit the PPDU at a time point later by the SIFS from the end of the last PPDU of the shared TXOP, without performing CS.

In another detailed embodiment, when the duration of the remaining shared TXOP is shorter than the PIFS, the shared TXOP holder and a station having allocated a TXOP may not be allowed to start transmission. Specifically, when the duration of the remaining shared TXOP is shorter than the PIFS and longer than the SIFS, the shared TXOP holder and the station having allocated the TXOP may not be allowed to start transmission.

However, unlike the embodiment of FIG. 36, the shared TXOP allocator needs to determine whether the last PPDU of the shared TXOP includes a frame having an intended receiver corresponding to the shared TXOP allocator. Specifically, the shared TXOP allocator may determine whether a frame included in the last PPDU of the shared TXOP is a frame transmitted to the shared TXOP allocator by the shared TXOP holder.

In the embodiment of FIG. 36, a first station (STA1) transmits an MU-RTS TXS trigger frame to a second station (STA2) to allocate a shared TXOP to the second station (STA2). In this case, the second station (STA2) transmits a CTS frame to the first station (STA1). In the embodiment of FIG. 36(a). when the second station (STA2) transmits a UL frame in the shared TXOP, there is a remaining time interval shorter than the PIFS and longer than the SIFS by the end of the shared TXOP. In this case, the first station (STA1) determines that the channel is idle during the PIFS by performing CS at the end of the UL frame. Accordingly, the first station (STA1) may transmit a DL frame at a time point later by the PIFS from the end of the UL frame. Accordingly, an interval between the UL frame and the DL frame (DL frame 2) is shorter than 25 us.

When an intended receiver of the frame included in the last PPDU of the shared TXOP corresponds to the shared TXOP holder, the shared TXOP allocator may be allowed to perform TXOP recovery according to the embodiments through FIG. 36(a).

When a transmitter of a frame included in the last PPDU of the shared TXOP corresponds to a station to which the TXOP is allocated and an intended receiver is a station other than the shared TXOP allocator, the shared TXOP allocator may perform TXOP recovery on the basis whether the last PPDU of the shared TXOP includes a frame requesting an immediate response. When the transmitter of the frame included in the last PPDU of the shared TXOP is the station to which the TXOP is allocated, the intended receiver is a station other than the shared TXOP allocator, and the last PPDU of the shared TXOP includes a frame requesting an immediate response, the shared TXOP allocator may not be allowed to perform TXOP recovery according to the embodiments described in FIG. 36(a). This is because it may be difficult for the shared TXOP allocator to receive a response frame transmitted by a P2P peer system in the shared TXOP. When the channel is idle for the PIFS from the PPDU including an immediate response to the above-described frame requesting the immediate response, the station having allocated the TXOP may start transmission at a time point later by the PIFS from the PPDU including the immediate response. In another detailed embodiment, the station having allocated the TXOP may start transmission at a time point later by the SIFS from the PPDU including an immediate response.

In FIG. 36(b), when the second station (STA2) transmits a P2P frame in the shared TXOP, there is a remaining time interval shorter than the PIFS and longer than the SIFS by the end of the shared TXOP. In this case, the P2P frame does not require an immediate response. The first station (STA1) determines that the channel is idle for the PIFS by performing CS at the end of the P2P frame. Accordingly, the first station (STA1) may transmit a DL frame at a time point later by the PIFS from the end of the P2P frame. Accordingly, an interval between the P2P frame and a DL frame (DL frame 2) is shorter than 25 us.

In FIG. 36(c), when the second station (STA2) transmits a P2P frame in the shared TXOP, there is a remaining time interval shorter than the PIFS and longer than the SIFS by the end of the shared TXOP. The first station (STA1) determines that the channel is idle for the PIFS by performing CS at the end of the P2P frame. Accordingly, the first station (STA1) may transmit a DL frame at a time point later by the PIFS from the end of a UL frame. Accordingly, an interval between a UL frame and a DL frame (DL frame 2) is shorter than 25 us.

In the embodiments described above, the station having allocated the TXOP may determine a receiver address of the received frame, for example, an intended receiver of the received frame based on an RA field. Specifically, the station having allocated the TXOP may determine a station indicated by the receiver address of the received station, as an intended receiver. In addition, the station having allocated the TXOP may determine a transmitter address of the received frame, for example, a transmitter of the received frame based on a TA field. Specifically, the station having allocated the TXOP may determine the station indicated by the transmitter address of the received station, as a transmitter. In addition, the station having allocated the TXOP may determine an intended receiver of the frame included in the received PPDU based on an STA-ID field of a signaling field of the received PPDU. In addition, the station having allocated the TXOP may determine an intended receiver of the frame included in the received PPDU based on a BSS color field and an STA-ID field of a signaling field of the received PPDU. In addition, the station having allocated the TXOP may determine an intended receiver of the frame included in the received PPDU based on a UL/DL field, a BSS color filed, and an STA-ID field of a signaling filed of the received PPDU. In this case, the STA-ID field indicates an ID of the station corresponding to the intended receiver of the frame included in the PPDU. In addition, the BSS color indicates a BSS color of a BSS from which the PPDU is transmitted. In addition, the UL/DL field indicates whether the PPDU is an uplink transmission PPDU or a downlink transmission PPDU.

When the channel is busy at the ending time point of the shared TXOP, even within the TXOP including the shared TXOP and acquired by the shared TXOP allocator, the shared TXOP allocator may not be allowed to initiate frame exchanging without performing a backoff procedure for acquiring the TXOP. A situation where the station allowed to perform transmission in the shared TXOP cannot perform transmission may occur. In this case, even though the shared TXOP allocator starts transmission immediately after the shared TXOP ends, an interval between the PPDU transmitted by the shared TXOP allocator and the PPDU transmitted within the shared TXOP may be longer than 25 us. Accordingly, the shared TXOP allocator may perform again the backoff procedure for acquiring the TXOP.

In addition, the frame included in the last PPDU of the shared TXOP has failed to be successfully received, or the frame included in the last PPDU of the shared TXOP may not be included in the frame exchanging of the shared TXOP holder. In this case, even within the TXOP including the shared TXOP and acquired to the share TXOP allocator, the shared TXOP allocator may not be allowed to initiate frame exchanging without performing the backoff procedure for acquiring the TXOP. A case where the frame included in the last PPDU of the shared TXOP is not included in the frame exchanging of the shared TXOP holder may correspond to a case where a receiver of the frame included in the last PPDU of the shared TXOP is not the shared TXOP holder and a transmitter of the frame included in the last PPDU of the shared TXOP is not the shared TXOP holder. This is because it is not guaranteed that an interval between the PPDU transmitted by the shared TXOP allocator and the PPDU transmitted within the shared TXOP is within 25 us when the frame included in the last PPDU of the shared TXOP has failed to be successfully received or the frame included in the last PPDU of the shared TXOP is not included in the frame exchanging of the shared TXOP holder.

In another detailed embodiment, even within the TXOP including the shared TXOP and acquired by the shared TXOP allocator after the termination of the shared TXOP corresponding to the second shared TXOP mode, the shared TXOP allocator may not be allowed to initiate frame exchanging without a backoff procedure for acquiring the TXOP.

In addition, the third condition described through FIG. 34 may be modified as follows.

The shared TXOP allocator may determine that the channel is not idle by performing CS at the end of the shared TXOP. In addition, the transmission occupying the channel at the end of the TXOP may be frame exchanging of the shared TXOP holder. In such a case, when the channel is idle, the shared TXOP allocator may transmit the PPDU when the channel is idle, that is, when the channel is idle in the TxPIFS slot boundary.

The transmission occupying the channel at the end of the TXOP may not the frame exchanging of the shared TXOP holder. In such a case, even within the TXOP including the shared TXOP and acquired by the shared TXOP allocator after the termination of the TXOP, the shared TXOP allocator may not be allowed to initiate the frame exchanging without a backoff procedure for acquiring the TXOP. This is because an interval between the last PPDU of the shared TXOP and the PPDU transmitted by the shared TXOP allocator after the shared TXOP may be longer than 25 us when the channel is occupied due to the transmission other than the frame exchanging of the shared TXOP holder and the shared TXOP allocator performs transmission according to the conventional third condition. Accordingly, the embodiment in which an application condition of the third condition is modified may be applied to the second shared TXOP mode and may not be applied to the first shared TXOP mode.

In the embodiments described in relation to the TXOP recovery, in relation to the condition performing the TXOP recovery operation, a time interval indicated by a time point after a time point earlier than the PIFS from the ending time point of the shared TXOP may include a time point earlier by the PIFS from the ending time point of the shared TXOP. In addition, a case where a termination time of the remaining shared TXOP shorter than the PIFS may include a case where the termination time of the remaining shared TXOP is the PIFS. In addition, the time interval indicated by a time point before a time point earlier than the SIFS from the ending time point of the shared TXOP may include a time point earlier by the SIFS from the ending time point of the shared TXOP. In addition, a case where the termination time of the remaining shared TXOP is longer than the SIFS, the termination time of the remaining shared TXOP is the SIFS.

FIG. 37 illustrates a format of a frame according to an embodiment of the present invention.

FIG. 37(*a*) illustrates a format of a MAC frame. The MAC frame includes a MAC header, a frame body, and an FCS field. In addition, the MAC header may include a frame control field, a duration/ID field, a MAC address field, a sequence control field, a QoS control field, and an HT control field. The frame control field indicates a type and a subtype of each frame through a type subfield and a subtype subfield. In addition, the frame control field may indicate whether the frame includes the HT control field through a +HTC subfield. The duration/ID field may indicate duration of the frame. When the frame including the duration/ID field is not a PS-poll frame, the duration/ID field may indicate the duration of the frame. In addition, the station may configure a network allocation vector (NAV) based on the duration of the frame, indicated by the duration/ID field of the received frame. When the frame including the duration/ID field is a PS-poll frame, the duration/ID field may indicate an ID, for example, an AID. In addition, the MAC address may include one or more address fields. The address field may indicate a MAC address. In addition, the address field may include at least one of a basic service set identifier (BSSID) field, a source address (SA) field, a destination address (DA) field, a transmitting STA address or transmitter address (TA) field, and a receiving STA address or receiver address (RA) field. In addition, the sequence control field may indicate a fragment number or a sequence number. In addition, the QoS control field may include at least one of a TID of traffic included in the frame, an ACK policy for the frame, a TXOP limit of the frame exchanging including the frame, a buffer state of the station having transmitted the frame, and a queue size of the station having transmitted the frame. In addition, the QoS control field may include the above-described RDG/more PPDU subfield and AC constraint subfield. For example, the QoS control field included in a DMG PPDU may include the above-described RDG/more PPDU subfield and AC constraint subfield.

The HT control field may include the above-described RDG/more PPDU subfield and AC constraint subfield. As described above, the RDG/more PPDU subfield may signal whether the frame includes the RDG or signal whether there is a PPDU following the frame. In addition, the AC constraint subfield may indicate whether a TID or AC of a response (RD data frame) for the RDG is limited. The HT control field may include four octets, i.e., 32 bits.

The length of a MAC header and a field including the MAC header may be configured according to a pre-designated value.

The frame body field includes a content of a frame. The frame body field may include the type of a frame and information on a subtype of the frame.

The frame check sequence (FCS) field may include an FCS. A value of the FCS field may be configured based on a value of a MAC header field and a value of a frame body field. The station having received the MAC frame may calculate the FCS by using the values of the MAC header field and the frame body field, and compare the calculated value with a value of the FSC field. Accordingly, the station having received the MAC frame may determine whether the MAC frame has been successfully received.

FIG. 37(b) illustrates a format of a HT control field. As described above, the HT control field may include an AC constraint subfield and an RDG/more PPDU subfield.

For example, the HT control field may include 32 bits (B0 to B31). In this case, the 31st bit (B30) and the 32nd bit (B31) may be the AC constraint subfield and the RDG/more PPDU subfield, respectively. This may be a case where the HT control field corresponds to an HT variant or a VHT variant. The HT control field may have multiple forms or variants. For example, the HT control field may be an HT variant, a VHT variant, a HE variant, an EHT variant, or a variant of the standard after the EHT. In the present specification, a description of an embodiment applied to the HE variant may be equally applied to a variant defined in the standard after the HE. In addition, the HT control field may include signaling indicating a variant corresponding to the HT control field. For example, some bits of the HT control field may indicate a variant corresponding to the HT control field. For example, when a value of the first bit (B0) is 0, the HT control field may be the HT variant. In addition, when a value of the first bit (B0) is 1, the HT control field may be the VHT variant, the HE variant, or the EHT variant. In addition, when a value of the first bit (B0) is 1 and a value of the second bit (B1) is 0, the HT control field may be the VHT variant. In addition, when a value of the first bit (B0) is 1 and a value of the second bit (B1) is 1, the HT control field may be the HE variant or the EHT variant. Alternatively, when a value of the first bit (B0) is 1 and a value of the second bit (B1) is 1, the HT control field may be the HE variant, the EHT variant, or the variant of the standard after the ETH.

When the HT control field corresponds to the HE variant, the EHT variant, or the variant of the standard after the EHT, the HT control field may include an A-control subfield. The A-control subfield includes one or more control information pieces. For example, the third bit (B2) to the 32nd bit (B31) of the HT control field may be A-control subfields.

FIG. 37(c) illustrates a format of an A-control subfield. In FIG. 37(c), the A-control subfield includes a control list subfield and a padding subfield. The control list subfield may include one or more control information pieces. In addition, the control list subfield may include one or more control subfields. In addition, the A-control field may selectively include the padding subfield. For example, the length remaining after excluding the length of the control list subfield from the length of the pre-configured A-control subfield may be the length of the padding subfield. A value of the padding subfield may be configured as a pre-designated value. Alternatively, a value of the first bit of the padding subfield may be configured as a pre-designated value.

FIG. 37(d) illustrates a format of a control subfield. In FIG. 37(d), the control subfield includes a control ID subfield and a control information subfield. The control ID subfield may indicate a content to be included in the control information subfield, or control information included in the control subfield including the control ID subfield. In addition, the length of the control information subfield may be determined based on a value of the control ID subfield. The length of the control ID subfield may be 4 bits. Information which can be included in the control subfield may be the above-described triggered response scheduling (TRS) control field. The TRS control field indicates TRS information triggering transmission of the station having received the TRS control field. A control ID of the TRS control field may be 0. In addition, the control subfield may be an operating mode (OM) control field. The OM control field may indicate information on an OM. A control ID of the OM field may be 1. In addition, the control subfield may be a link adaptation control field. The link adaptation control field may indicate information on the link adaptation. The control ID of the link adaptation control field may be 2. In addition, the control subfield may be a BSR control field. The BSR control field may indicate information on a buffer state. A control ID of the BSR control field may be 3. In addition, the control subfield may be a UL power headroom control field. The UL power control field may indicate information on an uplink transmission power headroom. The information on the UL power headroom may be a value indicating a spare amount of transmittable power, or a value used for power pre-correction. A control ID for the UL power headroom field may be 4. In addition, the control subfield may be a bandwidth query report (BQR) control field. The BQR control field may indicate a BQR corresponding to signaling indicating the state of the subchannel. A control ID of the BQR control field may be 5. For example, the BQR may indicate whether the subchannel is available. In addition, the control subfield may be a command and status (CAS) control field. The CAS control field may indicate information on a CAS. A control ID of the CAS control field may be 6.

FIG. 37(e) illustrates an OM control field. In FIG. 37(e), an OM control subfield may include an Rx NSS subfield, a channel width subfield, a UL MU disable subfield, a Tx NSTS subfield, an ER SU disable subfield, a DL MU-MIMO resound recommendation subfield, and a UL MU data disable subfield. The Rx NSS subfield, the channel width subfield, the UL MU disable subfield, the Tx NSTS subfield, the ER SU disable subfield, the DL MU-MIMO resound recommendation subfield, and the UL MU data disable subfield may be a 3-bit field, a 2-bit field, a 1-bit field, a 3-bit field, a 1-bit field, a 1-bit field, and a 1-bit field, respectively. In addition, specific formats of the fields may be as shown in FIG. 37(e).

The information on the OM may include information on a transmission management mode or information on a reception management mode. A station having received the information on the OM may transmit an ACK to the received information on the OM. The station having received the information on the OM may transmit a frame or a PPDU to the station having transmitted the information on the OM, based on the received information on the OM. For example, the information on the OM may include information on a maximum transmittable or receivable capability, and the station having received the information on the OM may transmit a frame or a PPDU with a capability equal to or less than the maximum capability indicated by the information on the OM. The information on the OM may include information on whether a specific mode is enabled, disabled, or suspended. When the specific mode is disabled, the station having received the information on the OM may not transmit the frame or the PPDU by using the corresponding mode. When the specific mode is disabled, the station having received the information on the OM may not request to use the corresponding mode. In this case, the specific mode may be a mode relating to a UL MU operation. Specifically, the mode relating to the UL MU operation may correspond to information indicated by at least one of a UL MU data disable subfield and a UL MU disable subfield.

FIG. 38 illustrates a method for decoding a UL MU disable subfield and a UL MU data disable subfield of an OM control field by an AP according to an embodiment of the present invention.

The UL MU disable subfield may indicate whether an operation of responding to a triggering frame is enabled. In this case, the triggering frame includes a trigger frame and a frame including a TRS control field. An operation of responding to the triggering frame may be an operation of performing UL MU transmission or an operation related to UL MU transmission. The station having received the triggering frame may transmit a TB PPDU as a response to the triggering frame. When the triggering frame is an MU-RTS frame, the station having received the MU-RTS frame may transmit a CTS frame as a response to the triggering frame. An interval between the triggering frame and a response frame to the triggering frame may be an SIFS.

Indicating that the UL MU transmission operation is disabled by the UL MU disable subfield transmitted by the station may be signaling that the station cannot transmit a response to the triggering frame. In this case, the response to the triggering frame may be the above-described TB PPDU and CTS frame. The station having received the UL MU disable subfield may transmit an ACK to the UL MU disable subfield.

In addition, the station having received the UL MU disable subfield indicated that the UL MU transmission is disabled may not transmit the triggering frame to the station having transmitted the UL MU disable subfield. Indicating that the UL MU transmission operation is enabled by the UL MU disable subfield transmitted by the station may be signaling that the station can transmit a response to the triggering frame. In addition, the station having received the UL MU disable subfield indicated that the UL MU transmission is enabled may transmit the triggering frame to the station having transmitted the UL MU disable subfield.

The UL MU data disable subfield may indicate whether an operation of receiving the triggering frame and transmitting a data frame as a response to the triggering frame by the station having transmitted the UL MU data disable subfield is enabled. Specifically, the UL MU data disable subfield may indicate whether the station having transmitted the UL MU data disable subfield may receive a basic trigger frame and transmit a data frame as a response to the basic trigger frame.

Indicating that the UL MU data transmission operation is disabled by the UL MU data disable subfield transmitted by the station may be signaling that the station cannot transmit a data frame as a response to the triggering frame. The station having received the UL MU data disable subfield may transmit an ACK to the UL MU data disable subfield. Even though the UL MU data disable subfield transmitted by the station indicates that the UL MU data transmission operation is disabled, the station may transmit a control frame or a management frame as a response to the triggering frame. In addition, even though the UL MU data disable subfield indicates that the UL MU data transmission operation is disabled, the station may transmit a response to the trigger frame other than the basic trigger frame. In this case, the UL MU disable field transmitted by the station may indicate that the UL MU transmission operation is enabled. In addition, the station having received the UL MU data disable subfield indicating that the UL MU data transmission is disabled may transmit a triggering frame to the station having transmitted the UL MU data disable subfield. However, the station having received the UL MU data disable subfield indicating that the UL MU data transmission is disabled may not expect that a data frame is transmitted as a response to the triggering frame to the station having transmitted the UL MU data disable subfield.

Indicating that the UL MU data transmission operation is enabled by the UL MU data disable subfield transmitted by the station may be signaling that the station can transmit a data frame as a response to the triggering frame. Only when the UL MU disable subfield of the station indicates that the UL MU transmission is activated, the UL MU data disable subfield may indicate that the UL MU data transmission operation is enabled. In addition, the station having received the UL MU data disable subfield indicating that the UL MU data transmission is enabled may transmit the triggering frame to the station having transmitted the UL MU data disable subfield. The station having received the UL MU data disable subfield indicating that the UL MU data transmission is disabled may expect that a response data frame to the triggering frame is transmitted to the station having transmitted the UL MU data disable subfield.

In addition, the station may operate based on information on the most recently transmitted or received OM. In addition, a non-AP station transmits the UL MU disable subfield and the UL MU data disable subfield, and an AP receives the UL MU disable subfield and the UL MU data disable subfield.

As shown in the table in FIG. 38, when a value of the UL MU disable subfield is 1, the UL MU disable subfield may indicate that the UL MU transmission operation is disabled. In addition, when a value of the UL MU disable subfield is 0, the UL MU disable subfield may indicate that the UL MU transmission operation is enabled. In addition, when a value of the UL MU data disable subfield is 1, the UL MU data disable subfield may indicate that the UL MU data transmission operation is disabled. In addition, when the UL MU data disable subfield is 0, the UL MU data disable subfield may indicate that the UL MU transmission operation is enabled. However, when a value of the UL MU disable subfield is 1, the UL MU data disable subfield may indicate that the UL MU data transmission is disabled even though a value of the UL MU data disable subfield is 0. In addition, when a value of the UL MU disable subfield is 1 and a value of the UL MU data disable subfield is 1, it may indicate that a reserved state.

The AP may signal the capability of decoding of the UL MU data disable subfield. Specifically, the AP may signal whether the UL MU data disable subfield can be decoded by using an EHT capability element. When the AP signals that the UL MU data disable subfield can be decoded, the AP may determine a UL MU transmission operation mode by combining a value of the UL MU disable subfield transmitted by the station and a value of the UL MU data disable subfield. When the AP signals that the UL MU data disable subfield cannot be decoded, the AP may determine a UL MU data transmission operation mode of the station by only using a value of the UL MU disable subfield transmitted by the station. In addition, when the AP signals that the UL MU data disable subfield cannot be decoded, the station may not be allowed to configure the value of the UL MU data disable subfield as 1. In addition, when the AP signals that the UL MU data disable subfield cannot be decoded, the station may only configure a mode in which all trigger-based operations are enabled or a mode in which all trigger-based operations are disabled.

An operation of a shared TXOP may not be included in the UL MU operation indicated by the UL MU disable subfield and the UL MU data disable subfield.

FIG. 39 illustrates a method for configuring an MU EDCA parameter set by a station based on a UL MU disable subfield and a UL MU data subfield.

When the station has disabled an operation of UL MU transmission, the station may configure a value of the above-described MU EDCA timer as 0. In this case, the station may configure a value of the MU EDCA timer corresponding all ACs as 0. Specifically, when the station has transmitted the UL MU disable subfield configured as 1 and received an ACK to the UL MU disable subfield, the station may configure a value of the MU EDCA timer for all ACs as 0. In addition, when the station has transmitted the UL MU data disable subfield configured as 1 and received an ACK to the UL MU data disable subfield, the station may configure a value of the MU EDCA timer for all ACs as 0.

In FIG. 39(a), a second station (STA2) configures a value of the UL MU disable subfield as 1 and transmits an OM control field to a first station (STA1). The first station (STA1) transmits an ACK to the OM control field to the second station (STA2). When the second station (STA2) receives the ACK, the second station (STA2) configures a value of the MU EDCA timer for all ACs as 0.

In FIG. 39(b), the second station (STA2) transmits, to the first station (STA1), an OM control field having a UL MU disable subfield value configured as 0 and having a UL MU data disable subfield value configured 1. The first station (STA1) transmits an ACK to the OM control field to the second station (STA2). When the second station (STA2) receives the ACK, the second station (STA2) configures a value of the MU EDCA timer for all ACs as 0.

FIG. 40 illustrates a method for decoding a UL MU disable subfield and a UL MU data disable subfield of an OM control field by an AP according to another embodiment of the present invention.

There may be an issue relating to whether enabling of a shared TXOP operation is included in a UL MU transmission operation indicated by a UL MU disable subfield and a UL MU data disable subfield. In this case, disabling of the shared TXOP operation may indicate that an operation of responding to an MU-RTS TXS frame or performing transmission within a shared TXOP by a station is disabled. When the station indicates disabling of the shared TXOP operation, an AP may not transmit the MU-RTS TXS frame to the station.

In the first embodiment of the shared TXOP operation disabling signaling, the shared TXOP operation may not be included in the disabling of the UL MU transmission operation indicated by the UL MU disable subfield and the UL MU data disable subfield. In this case, even though the UL MU disable subfield indicates that the UL MU transmission operation is disabled or the UL MU data disable subfield indicates that the UL MU data transmission operation is disabled, it may not indicate that the shared TXOP operation is disabled.

In the second embodiment of the shared TXOP operation disabling signaling, when the UL MU disable subfield signals that the UL MU transmission operation of the station is disabled, the UL MU disable subfield may signal that the shared TXOP operation of the station is disabled. However, when the UL MU data disable subfield signals that the UL MU data transmission operation of the station is disabled, the UL MU data disable subfield may fail to signal whether the shared TXOP operation of the station is disabled. FIG. 40(a) illustrates a meaning of a UL MU disable subfield and a UL MU data disable subfield when such an embodiment is applied.

In the third embodiment of the shared TXOP operation disabling signaling, when the UL MU disable subfield signals that the UL MU transmission operation of the station is disabled, the UL MU disable subfield may signal that the shared TXOP operation of the station is disabled. In addition, when the UL MU data disable subfield signals that the UL MU data transmission operation of the station is disabled, the UL MU data disable subfield may signal that the shared TXOP operation of the station is disabled. FIG. 40(b) illustrates a meaning of the UL MU disable subfield and the UL MU data disable subfield when such an embodiment is applied.

In the fourth embodiment of the shared TXOP operation disabling signaling, only when the UL MU disable subfield signals that the UL MU transmission operation is disabled and the UL MU data disable subfield signals that the UL MU data transmission operation of the station is disabled, the UL MU disable subfield and the UL MU data disable subfield may signal that the shared TXOP operation of the station is disabled. In this case, the UL MU disable subfield and the UL MU data disable subfield may signal that all trigger-based operations of the station are disabled. FIG. 40(c)

illustrates a meaning of the UL MU disable subfield and the UL MU data disable subfield when such an embodiment is applied.

In another detailed embodiment, in this case, the station may indicate whether the shared TXOP operation is disabled by using a separate signaling field other than the UL MU disable subfield and the UL MU data disable subfield. In addition, the station may signal operation information by using a separate control subfield other than the OM control subfield, for example, an EHT OM control subfield. The EHT OM control subfield may be a type of a control subfield included in an A-control field. In addition, a control ID of the EHT OM control subfield may be 7.

The EHT OM control subfield may include an Rx NSS extension subfield, a channel width extension subfield, and a Tx NSTS extension subfield. In addition, a control information subfield of the EHT OM control subfield may be a 6-bit field. The Rx NSS extension subfield, the channel width extension subfield, and the Tx NSTS extension subfield may be all a 1-bit field. In addition, the Rx NSS extension subfield, the channel width extension subfield, and the Tx NSTS extension subfield may be located at the first bit, the second bit, and the third bit of the EHT OM control subfield, respectively. Information included in the EHT OM control subfield may be construed together with information included in the OM control subfield. For example, the Rx NSS extension subfield may indicate the number of maximum spatial streams receivable by the station, and may be used to indicate, when the number of maximum spatial streams receivable by the station has a value exceeding 8, the value. In addition, the Tx NSTS extension subfield may indicate the number of maximum space-time streams transmittable by the station, and may be used to indicate, when the number of maximum space-time streams transmittable by the station has a value exceeding 8, the value. In addition, the channel width extension subfield may indicate an operating channel width transmittable or receivable by the station, and when the operating channel width transmittable or receivable by the station has a value exceeding 160 MHz, for example, 320 MHZ, the channel width extension subfield may be used to indicate the exceeding value.

The EHT OM control subfield may include signaling indicating whether the shared TXOP operation of the station is disabled. The signaling indicating whether the shared TXOP operation is disabled may be a 1-bit field. Specifically, the fourth bit (B3) of the control information subfield of the EHT OM control subfield may perform signaling indicating whether the shared TXOP operation of the station is disabled. When the station performs signaling indicating whether the shared TXOP operation of the station is disabled, the station having received the signaling may not be allowed to transmit the MU-RTS TXS frame to the station having transmitted to the signaling.

In another detailed embodiment, the signaling indicating whether the shared TXOP operation of the station is disabled may be included in the EHT capabilities. An EHT capability element may be included in a beacon frame, a probe request frame, a probe response frame, an association request frame, an association response frame, and a re-association response frame, and a re-association request frame.

Performing transmission within the shared TXOP by the station limits an operation of the station, and thus the station may disable such an operation. In addition, participating in the shared TXOP by the station may not have a large restriction compared to transmitting a TB PPDU in response to the triggering frame, or transmitting a CTS frame. Accordingly, as described in some embodiments, disabling the shared TXOP operation may be required separately from the conventional trigger-based operation.

Figure 41:
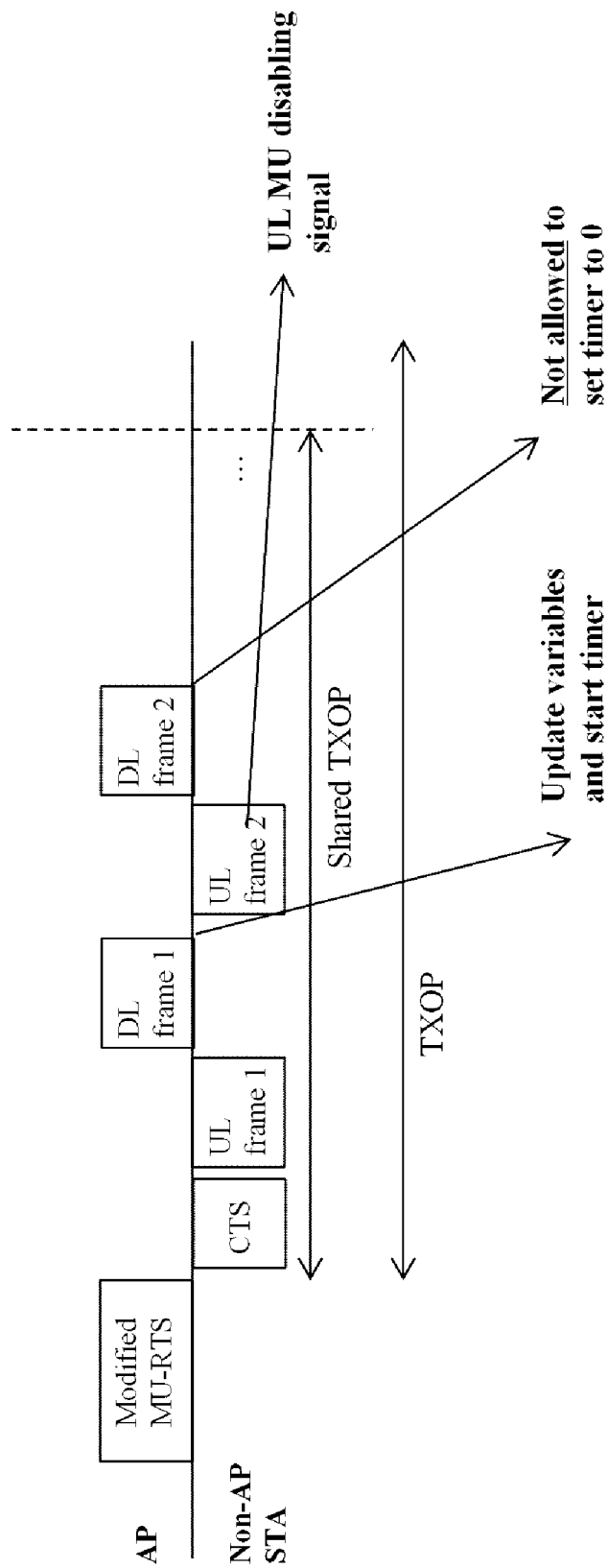
FIG. 41 illustrates an operation of configuring an MU EDCA parameter set by a station based on a shared TXOP operation according to an embodiment of the present invention.

FIG. 41 illustrates an operation of configuring an MU EDCA parameter set by a station based on a shared TXOP operation according to an embodiment of the present invention.

As described above, when disabling a UL MU transmission operation, a station may configure an MU EDCA timer as 0. However, when the MU EDAC parameter set is configured based on the MU-RTS TXS trigger frame, the station may not configure the MU EDCA timer as 0 based on the operation of disabling the UL MU transmission operation. In this case, the operation of disabling the UL MU transmission operation may follow the embodiments described through FIGS. 37 to 40 above. Specifically, when the MU EDCA parameter set is configured based on the MU-RTS TXS trigger frame, the station may not configure the MU EDCA timer as 0 based on signaling for disabling the UL MU transmission operation. Accordingly, even though the station successfully transmits the signaling for disabling the UL MU operation within the shared TXOP, the station may not configure the MU EDCA timer as 0. In this case, when the MU EDCA timer is configured based on the MU-RTS TXS trigger frame and the station has successfully transmitted the signaling for disabling the UL MU operation out of the shared TXOP, the station may configure the MU EDCA timer as 0.

In another detailed embodiment, when the MU EDCA timer is configured based on the MU-RTS TXS trigger frame and the station has successfully signaled disabling the UL MU transmission operation within the shared TXOP, the station may configure a value of the MU EDCA timer as 0 at a time point at which the shared TXOP is terminated or a time point at which the shared TXOP use is terminated.

In the above-described embodiments, disabling of the UL MU transmission operation may be limited to UL MU operation disabling in which the shared TXOP operation is not disabled. In addition, the signaling for disabling the UL MU operation may be limited to signaling in which the shared TXOP operation is not disabled. Accordingly, even though the UL MU data transmission operation or the UL MU transmission operation is disabled, the embodiments described above may be applied only when the shared TXOP operation is not disabled. When the TXOP operation is disabled, the station may configure the MU EDCA timer as 0. Specifically, when the station has successfully transmitted signaling for disabling the TXOP operation, the station may configure the MU EDCA timer as 0.

In the above-described embodiments, the MU EDCA parameter set may be replaced with a legacy EDCA parameter set and other parameter sets. In addition, the above-described UL MU transmission operation may be replaced with the UL MU data transmission operation.

In FIG. 41, an AP transmits an MU-RTS TXS trigger frame to a non-AP station to allocate a shared TXOP to the non-AP station. The non-AP station transmits a CTS frame to the AP. The non-AP station transmits a UL frame (UL frame 1) to the AP within the shared TXOP. The non-AP station receives a DL frame (DL frame 1) including a response to an uplink transmission frame (UL frame 1). The non-AP station configures an EDCA parameter set according to the MU EDCA parameter set. The non-AP station transmits a UL frame (UL frame 2) including signaling for disabling the UL MU transmission operation. In this case, signaling for disabling the UL MU transmission operation does not disable the shared TXOP operation. Even though the non-AP station has successfully transmitted the UL frame (UL frame 2), the non-AP station does not configure the MU EDCA timer as 0.

In another detailed embodiment, when disabling the UL MU transmission operation, the station may configure the MU EDCA timer as 0, regardless of the shared TXOP operation.

In the above-described embodiments, when a frame including the signaling requests an immediate response, successful transmission of the signaling may be reception of an ACK to the frame including the signaling. In addition, when the frame including the signaling requires no immediate response, successful transmission of the signaling may be transmission of the signaling.

Figure 42:
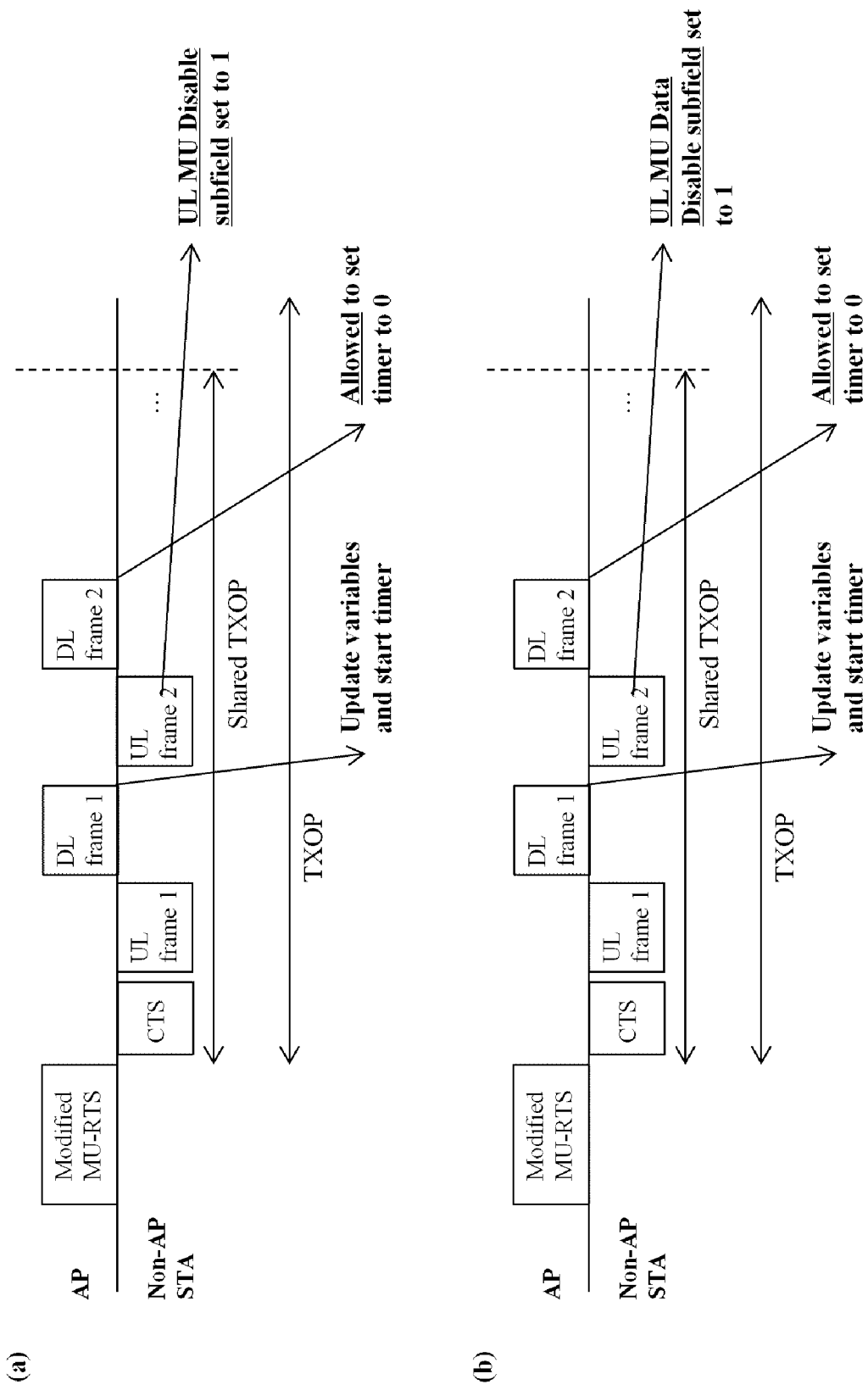
FIG. 42 illustrates an operation of configuring an MU EDCA parameter set by a station based on a shared TXOP operation according to an embodiment of the present invention.

FIG. 42 illustrates an operation of configuring an MU EDCA parameter set by a station based on a shared TXOP operation according to an embodiment of the present invention.

In the embodiment described through FIG. 41, when signaling for disabling the UL MU transmission operation or the UL MU data transmission operation disables the shared TXOP operation, the station may configure a value of the MU EDCA timer as 0 even though the MU EDCA parameter set is configured based on the MU-RTS TXS trigger frame. In this case, the signaling for disabling the UL MU operation may be configured according to the embodiments through FIGS. 37 to 40.

For example, when the station signals the UL MU transmission operation disabling, the shared TXOP operation may be disabled. In this case, when the station signals the UL MU transmission operation disabling, the station may configure a value of the MU EDCA timer as 0 even though the MU EDCA parameter set is configured based on the MU-RTS TXS trigger frame.

In addition, the shared TXOP operation may not be disabled even though the station signals the UL MU transmission operation disabling. However, when the station signals the UL MU data transmission operation disabling, the shared TXOP operation may be disabled. In this case, when the station signals the UL MU data transmission disabling, the station may configure a value of the MU EDCA timer as 0 even though the MU EDCA parameter set is configured based on the MU-RTS TXS trigger frame.

In FIG. 42, an AP transmits an MU-RTS TXS trigger frame to a non-AP station to allocate a shared TXOP to the non-AP station. The non-AP station transmits a CTS frame to the AP. The non-AP station transmits a UL frame (UL frame 1) to the AP within the shared TXOP. The non-AP station receives a DL frame (DL frame 1) including a response to the uplink transmission frame (UL frame 1). In this case, the non-AP station configures an EDCA parameter set according to an MU EDCA parameter set. In FIG. 42(a), the non-AP station transmits a UL frame (UL frame 2) including signaling for the disabling the UL MU transmission operation. In addition, in FIG. 42(b), the non-AP station transmits the UL frame (UL frame 2) including the signaling for the disabling the UL MU data transmission operation. In this case, the signaling for disabling the UL MU transmission operation disables the shared TXOP operation. In addition, the signaling for disabling the UL MU data transmission operation disables the shared TXOP operation. Accordingly, when the non-AP station receives a response to the UL frame (UL frame 2), the non-AP station configures the MU EDCA timer as 0.

In the embodiments described through FIGS. 41, 42, and the like, configuring the MU EDCA timer based on the MU-RTS TXS trigger frame may correspond to configuring the MU EDCA timer corresponding to all ACs based on the MU-RTS TXS trigger frame. When the MU EDCA timer is configured without being based on the MU-RTS TXS trigger frame, the MU EDCA timer corresponding to at least one AC is configured without being based on the MU-RTS TXS trigger frame. When the MU EDCA timer corresponding to at least one AC is configured without being based on the MU-RTS TXS trigger frame and the UL MU transmission operation is disabled, the station may configure a value of the MU EDCA timer corresponding to all ACs as 0. When the MU EDCA timer corresponding to all ACs is configured based on the MU-RTS TXS trigger frame and the UL MU transmission operation is disabled, the station cannot configure a value of the MU EDCA timer corresponding to all ACs as 0.

When the MU EDCA timer is configured based on the MU-RTS TXS trigger frame, the MU-EDCA timer corresponding to at least one AC is configured based on the MU-RTS TXS trigger frame. When the MU EDCA timer is configured without being based on the MU-RTS TXS trigger frame, the MU EDCA timer corresponding to all ACs is configured without being based on the MU-RTS TXS trigger frame. When the MU EDCA timer corresponding to all ACs is configured without being based on the MU-RTS TXS trigger frame and the UL MU transmission operation is disabled, the station may configure a value of the MU EDCA timer corresponding to all ACs as 0. When the MU EDCA timer corresponding to at least one AC is configured based on the MU-RTS TXS trigger frame and the UL MU transmission operation is disabled, the station cannot configure a value of the MU EDCA timer corresponding to all ACs as 0.

In another detailed embodiment, when the station configures the MU EDCA timer as 0 on the basis that the UL MU transmission operation is disabled, the MU EDCA timer corresponding to all ACs may be configured as 0, regardless of the configuration made based on the MU-RTS TXS trigger frame. In addition, when the station configures the MU EDCA timer as 0 based on that the UL MU transmission operation is disabled, only the MU EDCA timer which is not configured based on the MU-RTS TXS trigger frame is configured as 0.

In addition, the above-described MU EDCA timer corresponding to all ACs may correspond to all MU EDCA timers each having a value other than 0.

In another detailed embodiment, the station supporting the shared TXOP operation may not be allowed to configure the MU EDCA timer as 0 based on disabling UL MU transmission. That is, even though the station supporting the shared TXOP operation has successfully transmitted the signaling for disabling the UL MU transmission, the station supporting the shared TXOP operation may not be allowed to configure the MU EDCA timer as 0, regardless of the configuration of the MU EDCA timer based on the MU RTS TXS frame. In such an embodiment, the station not supporting the shared TXOP operation may configure the MU EDCA timer as 0 based on the disabling the UL MU transmission. In addition, the station supporting the shared TXOP operation cannot configure the MU EDCA timer as 0 based on the disabling the UL MU transmission.

In addition, in the above-described embodiments, when a value of the MU EDCA timer is configured as 0, a value of the MU EDCA timer for all ACs is configured as 0. In another detailed embodiment, when a value of the MU EDCA timer as 0, a value of the MU EDCA timer for an AC corresponding to the successfully transmitted frame may configured as 0. In addition, the operation of using or not using the MU EDCA parameter set in the above-described embodiments may be an operation of using or not using the MU EDCA parameter set for all ACs. In another detailed embodiment, the operation of using or not using the MU EDCA parameter set may be an operation of using or not using the MU EDCA parameter set by the EDCA parameter set for the AC corresponding to the successfully transmitted frame.

According to an embodiment of the present invention, as described above, multiple EDCA parameter sets may be used. For example, three or more EDCA parameter sets may be used. In addition, multiple EDCA parameter sets may be divided into sets included in a first group and sets included in a second group. For example, the first group may include a legacy EDCA parameter set. In addition, the second group may include an MU EDCA parameter set not based on a modified MU-RTS frame and based on transmission of a TB PPDU, and an MU EDCA parameter set based on the modified MU-RTS frame. The EDCA parameter set included in the second group may include a timer. For example, when there is an EDCA parameter set having a timer configured as 0, among the EDCA parameter sets included in the second group, an EDCA parameter set corresponding to a timer having a value other than 0 may be used. However, when multiple timers among the EDCA parameter sets included in the second group have values other than 0, a preconfigured rule-based EDCA parameter may be used. According to an embodiment, the largest value among the parameters corresponding to the EDCA parameter set having a timer value other than 0 may be used. For example, when there are multiple CWmin[AC] values corresponding to the EDCA parameter set having a timer value other than 0, channel access can be performed by using the largest CWmin[AC] value. This may the same for CWmax[AC], AIFSN[AC], and TXOPLimit[AC], in addition to the CWmin[AC]. According to another embodiment, the smallest value among the parameters corresponding to the EDCA parameter set having a timer value other than 0 may be used. The described embodiment may correspond to a description of a specific AC. For example, when multiple EDCA parameter sets each having a timer value other than 0, it may mean that there are multiple EDCA parameter sets in which a timer corresponding to a specific AC is not 0. In addition, when all the timers of the EDCA parameter sets included in the second group are 0, the EDCA parameter set included in the first group may be used.

Although the present invention is described by using wireless LAN communication as an example, the present invention is not limited thereto and may be equally applied to other communication systems such as cellular communication. In addition, while the method, device, and system of the present invention are described in relation to specific embodiments thereof, some or all of the elements or operations of the present invention may be implemented using a computer system having a general-purpose hardware architecture.

The features, structures, and effects described in the above embodiments are included in at least one embodiment of the present invention and are not necessarily limited to one embodiment. Furthermore, features, structures, and effects shown in each embodiment may be combined or modified in other embodiments by those skilled in the art. Therefore, it should be interpreted that contents relating to such combination and modification are included in the range of the present invention.

The present invention is described mainly based on the above embodiments but the embodiments are merely provided as examples and it is not intended to limit the present invention. It will be understood by those skilled in the art that various changes and modifications are made without departing from the essential characteristics of the present invention. For example, each element specifically shown in the embodiments may be modified and implemented. It should be interpreted that differences relating to such modifications and application are included in the scope of the present invention defined in the appended claims.

The invention claimed is:

1. A station in a wireless communication system, the station comprising:
   a transceiver; and
   a processor configured to control the transceiver,
   wherein the processor is configured to:
   receive a trigger frame from an access point (AP), wherein the trigger frame allocates, to the station, a part of a transmission opportunity (TXOP) acquired by the AP, as a shared TXOP,
   transmit a CTS frame as a response to the trigger frame,
   transmit a non-trigger based (TB) physical layer protocol data unit (PPDU) within the shared TXOP, and
   switch a first enhanced distributed channel access (EDCA) parameter set used for channel access to a second EDCA parameter set based on a transmission of a quality of service (QoS) data frame included in the non-TB PPDU.

2. The station of claim 1, wherein the processor is configured to switch the first EDCA parameter set to the second EDCA parameter set when the QoS data frame has been successfully transmitted to the AP within the shared TXOP.

3. The station of claim 2, wherein the processor is configured to switch the first EDCA parameter set to the second EDCA parameter set when the station has transmitted a QoS data frame requiring an immediate response to the AP through the non-TB PPDU and received a response to the QoS data frame requiring the immediate response within the shared TXOP.

4. The station of claim 2, wherein the processor is configured to switch the first EDCA parameter set to the second EDCA parameter set when the station has transmitted the non-TB PPDU including a QoS data frame requiring no immediate response to the AP within the shared TXOP.

5. The station of claim 2, wherein a timer value for remaining duration, which is applied to the second EDCA parameter set is configured as a value greater than 0 when the QoS data frame has been successfully transmitted to the AP.

6. The station of claim 5, wherein even though the station has successfully transmitted signaling for disabling a UL MU transmission operation to the AP within the shared TXOP, the processor is configured not to set the timer value as 0.

7. The station of claim 5, wherein when the station has successfully transmitted signaling for disabling an operation of the shared TXOP to the AP, the processor is configured to set the timer value as 0.

8. The station of claim 1, wherein the second EDCA parameter set is used instead of the first EDCA parameter set based on whether UL multiuser (MU) transmission has been successfully performed.

9. The station of claim 1, when a duration of remaining of the shared TXOP is shorter than a point coordination function (PCF) inter-frame space (PIFS), a transmission of the AP is not allowed except one or more predetermined transmissions, wherein the one or more predetermined transmissions are performed by the AP after short inter-frame space (SIFS) from an end of a transmission of a last PPDU transmitted from the station within the shared TXOP, wherein the last PPDU does not require an immediate response.

10. A method for operating a station in a wireless communication system, the method comprising:
receiving a trigger frame for triggering uplink transmission from an access point (AP), wherein the trigger frame allocates, to the station, a part of a transmission opportunity (TXOP) acquired by the AP, as a shared TXOP;
transmitting a CTS frame as a response to the trigger frame;
transmit a non-trigger based (TB) physical layer protocol data unit (PPDU) within the shared TXOP; and
switching a first enhanced distributed channel access (EDCA) parameter set used for channel access to a second EDCA parameter set based on a transmission of quality of service (QoS) data frame included in the non-TB PPDU.

11. The method of claim 10, wherein the switching the first EDCA parameter set used for channel access to the second EDCA parameter set comprises switching the first EDCA parameter set to the second EDCA parameter set when the station has successfully transmitted the QoS data frame to the AP within the shared TXOP.

12. The method of claim 11, wherein the switching the first EDCA parameter set to the second EDCA parameter set when the station has successfully transmitted the QoS data frame to the AP within the shared TXOP comprises switching the first EDCA parameter set to the second EDCA parameter set when the station has transmitted a QoS data frame requiring an immediate response to the AP through the non-TB PPDU and received a response to the QoS data frame requiring the immediate response within the shared TXOP.

13. The method of claim 11, wherein the switching the first EDCA parameter set to the second EDCA parameter set when the station has successfully transmitted the QoS data frame to the AP within the shared TXOP comprises switching the first EDCA parameter set to the second EDCA parameter set when the station has transmitted the non-TB PPDU including a QoS data frame requiring no immediate response to the AP within the shared TXOP.

14. The method of claim 11, wherein the switching the first EDCA parameter set to the second EDCA parameter set comprises setting a timer value for remaining duration which is applied to the second EDCA parameter set as a value greater than 0 when the QoS data frame has been successfully transmitted to the AP.

15. The method of claim 14, wherein the setting the timer value for remaining duration which is applied to the second EDCA parameter set as a value greater than 0 comprises not setting the timer value as 0 even though the station has successfully transmitted signaling for disabling a UL MU transmission operation to the AP within the shared TXOP.

16. The method of claim 14, wherein the setting the timer value for remaining duration which is applied to the second EDCA parameter set as a value greater than 0 comprises setting the timer value as 0 when the station has successfully transmitted signaling for disabling an operation of the shared TXOP to the AP.

17. The method of claim 10, wherein the second EDCA parameter set is used instead of the first EDCA parameter set based on whether UL multiuser (MU) transmission has been successfully performed.

18. The method of claim 10, when a duration of remaining of the shared TXOP is shorter than a point coordination function (PCF) inter-frame space (PIFS), a transmission of the AP is not allowed except one or more predetermined transmissions, wherein the one or more predetermined transmissions are performed by the AP after short inter-frame space (SIFS) from an end of a transmission of a last PPDU transmitted from the station within the shared TXOP, wherein the last PPDU does not require an immediate response.

* * * * *